(12) United States Patent
Mochizuki et al.

(10) Patent No.: US 9,317,066 B2
(45) Date of Patent: Apr. 19, 2016

(54) PORTABLE TERMINAL

(71) Applicant: PANASONIC CORPORATION, Osaka (JP)

(72) Inventors: Kenichi Mochizuki, Fukuoka (JP); Yasuji Wakiyama, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 102 days.

(21) Appl. No.: 14/165,926

(22) Filed: Jan. 28, 2014

(65) Prior Publication Data

US 2014/0226292 A1 Aug. 14, 2014

(30) Foreign Application Priority Data

Feb. 14, 2013 (JP) ................. 2013-026765
May 24, 2013 (JP) ................. 2013-109981

(51) Int. Cl.
*H05K 5/00* (2006.01)
*G06F 1/16* (2006.01)
(Continued)

(52) U.S. Cl.
CPC ............ *G06F 1/1626* (2013.01); *G06F 1/1632* (2013.01); *G06F 1/1635* (2013.01); *G06F 1/1639* (2013.01); *G06F 1/1658* (2013.01); *H04M 1/0262* (2013.01); *H04M 1/0277* (2013.01); *H04M 1/185* (2013.01);
(Continued)

(58) Field of Classification Search
CPC ... G06F 1/1601; G06F 1/1607; G06F 1/1613; G06F 1/1616; G06F 1/1626; G06F 1/1632; G06F 1/1633; G06F 1/1635; G06F 1/1639; G06F 1/1641; G06F 1/1656; G06F 1/1658; H04M 1/0277; H04M 1/0262; H04M 1/21; H04M 1/185; H04M 1/72527; H04M 2250/54
USPC ............... 361/679.02, 679.09–679.2, 679.21, 361/679.22, 679.26, 679.27, 679.29, 361/679.3–679.44, 679.55–679.61, 752
See application file for complete search history.

(56) References Cited

U.S. PATENT DOCUMENTS 5,602,456 A * 2/1997 Cargin et al. ................. 320/112
6,144,552 A * 11/2000 Whitcher et al. .......... 361/679.3
(Continued)

FOREIGN PATENT DOCUMENTS

JP 05-41242 U 6/1993
JP 06-268548 * 9/1994 ............... H04B 1/38
(Continued)

*Primary Examiner* — Hoa C Nguyen
*Assistant Examiner* — Sagar Shrestha
(74) *Attorney, Agent, or Firm* — Seed IP Law Group PLLC

(57) ABSTRACT

A portable terminal includes: a casing; a circuit board; a display device; and a fixing portion which fixes the circuit board to the casing to allow the circuit board to move within a given range along a surface direction of the circuit board. The portable terminal further includes: a battery housing portion provided at a position in the casing located along a thickness direction of the circuit board; a battery pack housed in the battery housing portion through a battery opening provided in the casing; a board-side connecting portion provided at the circuit board; a battery-side connecting portion provided at the battery pack and connected to the board-side connecting portion; and a restraining member which restrains a movement of the battery pack with respect to the circuit board along a surface direction of the circuit board.

6 Claims, 52 Drawing Sheets

(51) Int. Cl.
*H04M 1/02* (2006.01)
*H04M 1/18* (2006.01)
*H04M 1/21* (2006.01)
*H04M 1/725* (2006.01)

(52) U.S. Cl.
CPC ............ *H04M 1/21* (2013.01); *H04M 1/72527* (2013.01); *H04M 2250/54* (2013.01)

(56) References Cited

U.S. PATENT DOCUMENTS

| | | | |
|---|---|---|---|
| 6,195,141 B1* | 2/2001 | Kawano et al. | 349/58 |
| 6,285,159 B1* | 9/2001 | Ki et al. | 320/112 |
| 6,424,842 B1* | 7/2002 | Winstead | 455/557 |
| 6,554,640 B1 | 4/2003 | Koike et al. | |
| 8,004,857 B2* | 8/2011 | Kerner | 361/796 |
| 2001/0043293 A1* | 11/2001 | Inoue | 349/58 |
| 2003/0223184 A1* | 12/2003 | Nakamura | 361/679 |
| 2008/0037770 A1* | 2/2008 | Emmert | 379/433.01 |
| 2008/0094787 A1* | 4/2008 | Kabeya | 361/681 |
| 2008/0259536 A1* | 10/2008 | Law et al. | 361/679 |
| 2009/0257189 A1* | 10/2009 | Wang et al. | 361/679.56 |
| 2010/0142166 A1* | 6/2010 | Chang et al. | 361/759 |
| 2012/0028679 A1* | 2/2012 | Ozasa | 455/556.1 |
| 2012/0127639 A1* | 5/2012 | Lai | 361/679.01 |
| 2013/0215559 A1* | 8/2013 | Kim et al. | 361/679.01 |

FOREIGN PATENT DOCUMENTS

| | | |
|---|---|---|
| JP | 08-9448 A | 1/1996 |
| JP | 10-308201 A | 11/1998 |
| JP | 2000349875 A | 12/2000 |
| JP | 2002-075309 A | 3/2002 |
| JP | 2002-299859 A | 10/2002 |
| JP | 2006-153108 A | 6/2006 |
| JP | 2009-065428 A | 3/2009 |

* cited by examiner

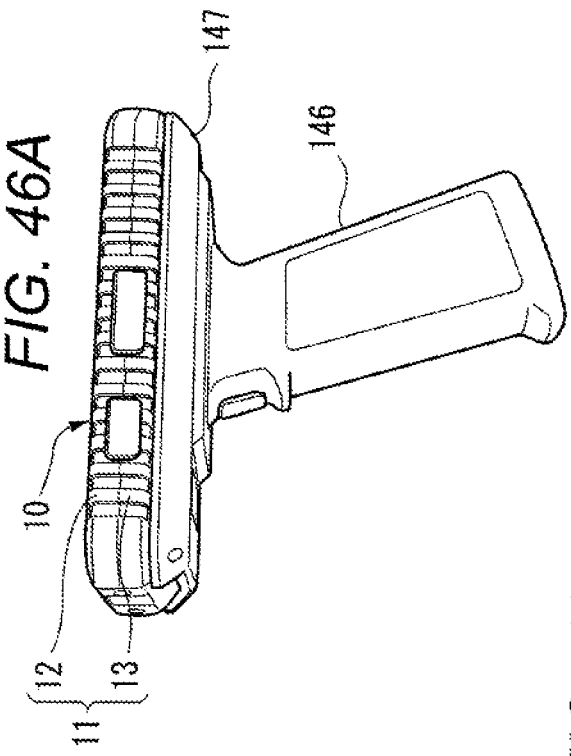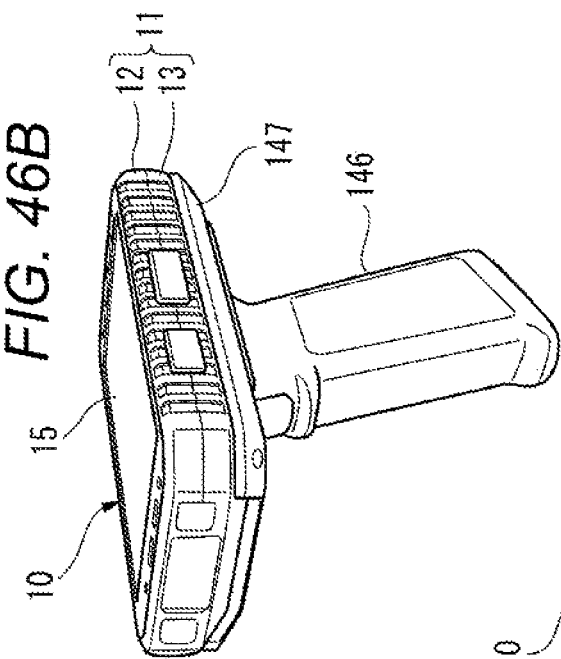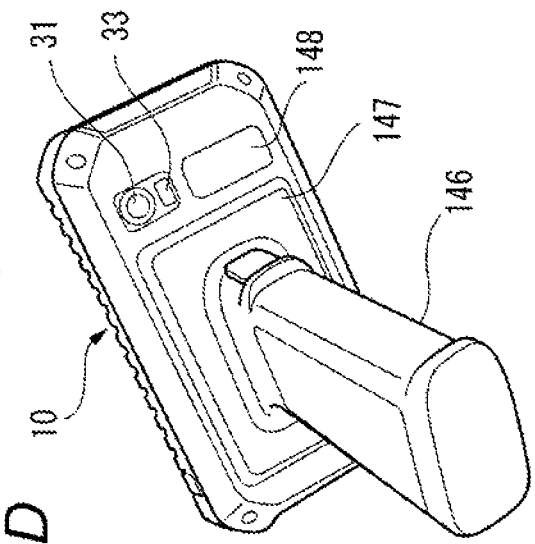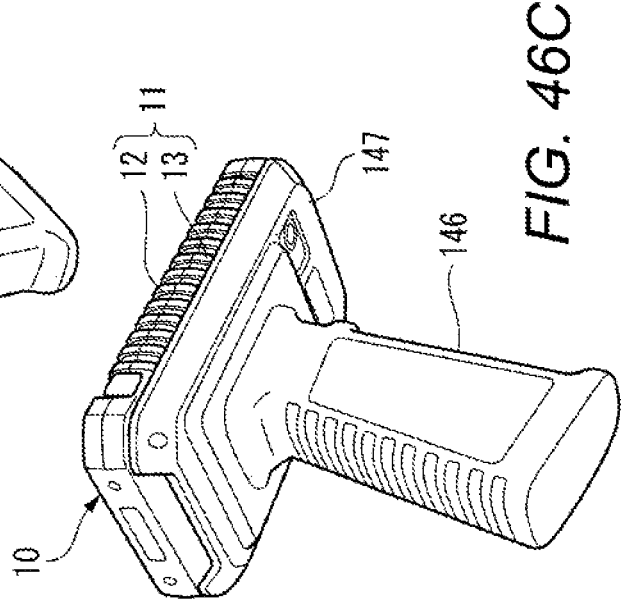

PORTABLE TERMINAL

BACKGROUND

1. Technical Field

The present invention relates to a portable terminal in which a battery pack is housed in a battery housing portion, thereby connecting a battery-side connecting portion of the battery pack to a board-side connecting portion of a circuit board.

2. Description of Related Art

In a portable terminal, a circuit board is fixed in a casing, and a battery pack is housed in a battery housing concave portion of the casing, whereby a battery-side connecting portion of the battery pack is connected to a board-side connecting portion of the circuit board. The battery pack housed in the battery housing concave portion is covered with a lid body. The battery pack is housed in the battery housing concave portion, thereby being retained while fixed in the battery housing concave portion (see JP-A-2000-349875, paragraph 0013 and FIG. 2).

SUMMARY

In recent years, in order to prevent breakage of the circuit board, it has been proposed that the circuit board is attached in a floating state to the casing. Because the circuit board is attached in a floating state to the casing in such a portable terminal, the circuit board can be prevented from being damaged by fail or the like of a portable terminal. However, if the circuit board is attached in the floating state to the casing in the portable terminal, the battery pack cannot follow the circuit board that moves with respect to the casing when an impact is applied to the portable terminal. Thus, damage on the board-side connecting portion and the battery-side connecting portion, and instantaneous disconnection therebetween may occur.

The present invention is made in view of the above circumstances, and an object thereof is to provide a portable terminal which is not damaged and in which the damage on and the instantaneous disconnection between the circuit-board-side connecting portion and the battery-side connecting portion and do not occur even when an impact is applied to the circuit board.

In an aspect of the present invention, a portable terminal includes: a casing a circuit board housed in the casing; a display device arranged parallel to the circuit board in the casing and exposed on an outside of the casing; a fixing portion which fixes the circuit board to the casing to allow the circuit board to move within a given range along a surface direction of the circuit board; a battery housing portion provided at a position in the casing located along a thickness direction of the circuit board; a battery pack housed in the battery housing portion through a battery opening provided in the casing; a board-side connecting portion provided at the circuit board; a battery-side connecting portion provided at the battery pack and connected to the board-side connecting portion; and a restraining member which restrains a movement of the battery pack with respect to the circuit board along a surface direction of the circuit board.

The circuit board is fixed by the fixing portion to the casing to be movable within a given range in a surface direction of the circuit board. Consequently, the circuit board can be fixed in a floating state to the casing. Accordingly, even if an impact of the fall or the like of the portable terminal is applied thereto, the circuit board is not damaged.

Moreover, the restraining member restrains the movement of the battery pack with respect to the circuit board in the surface direction of the circuit board is restrained by. Thus, the relative positions of the circuit board and the battery pack can be maintained. Consequently, the board-side connecting portion and the battery-side connecting portion are not damaged, and instantaneous disconnection therebetween is not caused. Accordingly, the connection of the battery pack to the circuit board can be assured.

The portable terminal may further include: a chassis which holds the circuit board, and the restraining member may be fixed to the chassis.

The circuit board and the restraining member can be formed integrally with each other via the chassis by fixing the restraining member to the chassis which holds the circuit board. Consequently, if an impact of the fall or the like of the portable terminal is applied thereto, the battery pack can be made to follow the circuit board attached in a floating state to the casing. Thus the relative positions of the circuit board and the battery packs can reliably be maintained.

In the portable terminal, the chassis may include a first surface and a second surface opposite to the first surface, the first surface being closer to the battery pack than the second surface, the portable terminal may further include: a board fixing screw which is screwed to the chassis and which fixes the circuit board to a first surface of the chassis, the battery pack being arranged on a first surface side; and a restraining member fixing screw which is screwed to the chassis and which fixes the restraining member to the first surface of the chassis, the display device may be arranged on a second surface of the chassis opposite to the first surface, and a tip end of one of the board fixing screw and the restraining member fixing screw may not contact the display device.

The tip end of one of the board fixing screw and the restraining member fixing screw does not contact the display device. Consequently, the display device is not damaged by the board fixing screw or the restraining member fixing screw. In addition, the thickness of the portable terminal can be reduced.

The portable terminal may further includes: a fixing buffer member interposed between the circuit board and the chassis, and the fixing buffer member may be penetrated by the board fixing screw.

The fixing buffer member is interposed between the circuit board and the chassis. Thus, an impact due to fall or the like of the portable terminal, which is applied to the circuit board from the chassis, can be absorbed by interposing the fixing buffer member between the circuit board and the chassis.

In addition, the board fixing screw penetrates through the fixing buffer member. Thus, the fixing buffer member can be interposed between the circuit board and the board fixing screw. Consequently, if a horizontal impact is applied to the circuit board, transmission of the impact from the chassis via the board fixing screw to the circuit board can be alleviated by the fixing buffer member.

The portable terminal may further include: a chassis which holds the circuit board; and a chassis buffer member which is provided at a plane angle portion and which contacts an inner surface of the casing.

The chassis buffer member is provided at the plane angle portion of the chassis and contacts the inner surface of the casing. Consequently, if an impact due to the fall or the like of the portable terminal is applied thereto, influence of the impact on the circuit board mounted on the chassis can be absorbed by the chassis buffer member.

Moreover, the shape of the chassis buffer member can be minimized by providing the chassis buffer member only at a plane angle portion of the chassis.

In the portable terminal, the casing may be formed by two-color molding so as to expose a hard resin on an inner surface of the casing and so as to expose a soft resin to an outer surface of the casing, and a display device buffer member may be interposed between an end surface of the display device and the inner surface of the casing.

The display device buffer member is interposed between the end surface of the display device and the inner surface of the casing. Thus, if an impact due to the fall or the like of the portable terminal is applied to the casing, influence of the impact from the casing to the display device can be alleviated by the display device buffer member.

In another aspect of the present invention, a portable terminal includes: a casing; a circuit board housed in the casing so as to be movable with respect to the casing a display device arranged parallel to the circuit board in the casing and exposed on an outside of the casing; a battery housing portion profile data position in the casing located along a thickness direction of the circuit board; a battery pack housed in the battery housing portion through a battery opening provided in the casing; a board-side connecting portion connected via a wiring portion to the circuit board; and a battery-side connecting portion provided on the battery pack and connected to the board-side connecting portion.

The circuit board is housed in the casing to be movable with respect to the casing. The board-side connecting portion is connected to the circuit board via the wiring member. The battery-side connecting portion of the battery pack is connected to the board-side connecting portion. The circuit board is movable with respect to the casing. Consequently, if an impact is applied to the portable terminal, the impact can be absorbed by moving the circuit board.

Here, the board-side connecting portion is connected to the circuit board via the wiring member. The wiring member is a deformable member. Consequently, the movement of the circuit board is absorbed by the deformation of the wiring member Accordingly, a state of connecting the board-side connecting portion to the battery-side connecting portion can be maintained.

The portable terminal may further include a chassis housed in the casing to support the circuit board, and the chassis may be movable with respect to the casing.

The circuit board is supported by the chassis. The chassis is moved to the casing. Thus, if the circuit board is moved due to the impact, the circuit board can be protected by the chassis.

In the portable terminal, the board-side connecting portion may be held on a side of the casing.

The board-side connecting portion is held on the side of the casing. Thus, the board-side connecting portion can be positioned at a position corresponding to the battery-side connecting portion of the battery pack. Consequently, when the battery pack is housed in the battery housing portion of the casing, the battery-side connecting portion can be connected to the board-side connecting portion.

In the portable terminal, the board-side connecting portion may include a plurality of electrically-conductive plate members arranged at given intervals along a thickness direction, and the battery-side connecting portion may include a plurality of spring contacts which individually support the respective electrically-conductive members by sandwiching in a thickness direction.

The electrically-conductive plate members are individually supported by the spring contacts of the battery-side connecting portion by sandwiching in a thickness direction. Thus, the battery-side connecting portion can reliably be connected to each electrically-conductive plate member.

According to the aspects of the present invention, the circuit board is fixed to be movable within a given range in a surface direction of the circuit board. Consequently, the circuit board is not damaged due to an impact of the fall or the like of the portable terminal. Moreover, movement of a battery pack is restrained by a restraining member, whereby relative positions of the circuit board and the battery pack can be maintained. Consequently, damage on and instantaneous disconnection between a board-side connecting portion and a battery-side connecting portion do not occur. Accordingly, the connection of the battery pack to the circuit board can be assured.

BRIEF DESCRIPTION OF THE DRAWINGS

FIG. 46A is a side view illustrating a state in which the handgrip of FIG. 45 is attached to the portable terminal, FIG. 46B is a perspective view illustrating a state of the handgrip and the portable terminal, which are viewed from Obliquely above, FIG. 46C is a perspective view illustrating a state of the handgrip and the portable terminal, which are viewed from obliquely below, and FIG. 46D is a perspective view illustrating a state of the handgrip and the portable terminal, which are viewed from below;

DETAILED DESCRIPTION

Figure 1:
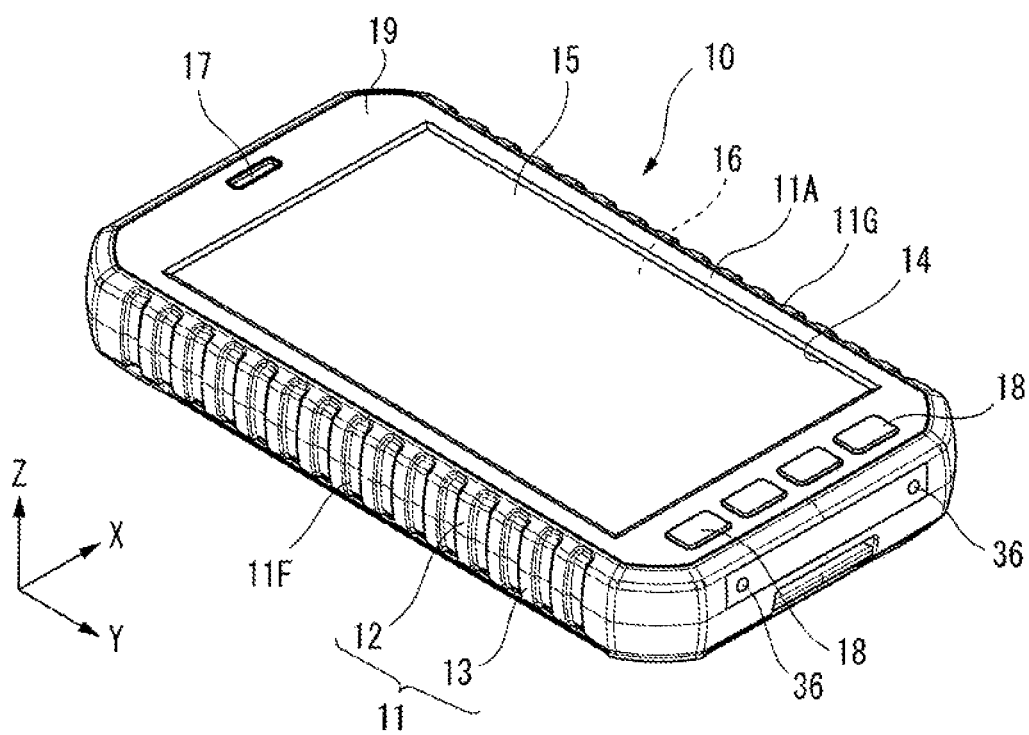
FIG. 1 is a perspective view illustrating a state of a portable terminal of a first embodiment according to the invention.

Hereinafter, a portable terminal according to an embodiment of the invention is described with reference to the accompanying-drawings.

In the drawings, X-axis represents a lateral direction of a casing 11, Y-axis represents a longitudinal direction or an up-down direction, a positive direction of Z-axis represents a direction of a front surface 11A of the casing 11, and a negative direction of Z-axis represents a direction of a rear-surface 1.1B of the casing 11.

(First Embodiment)

Figure 2:
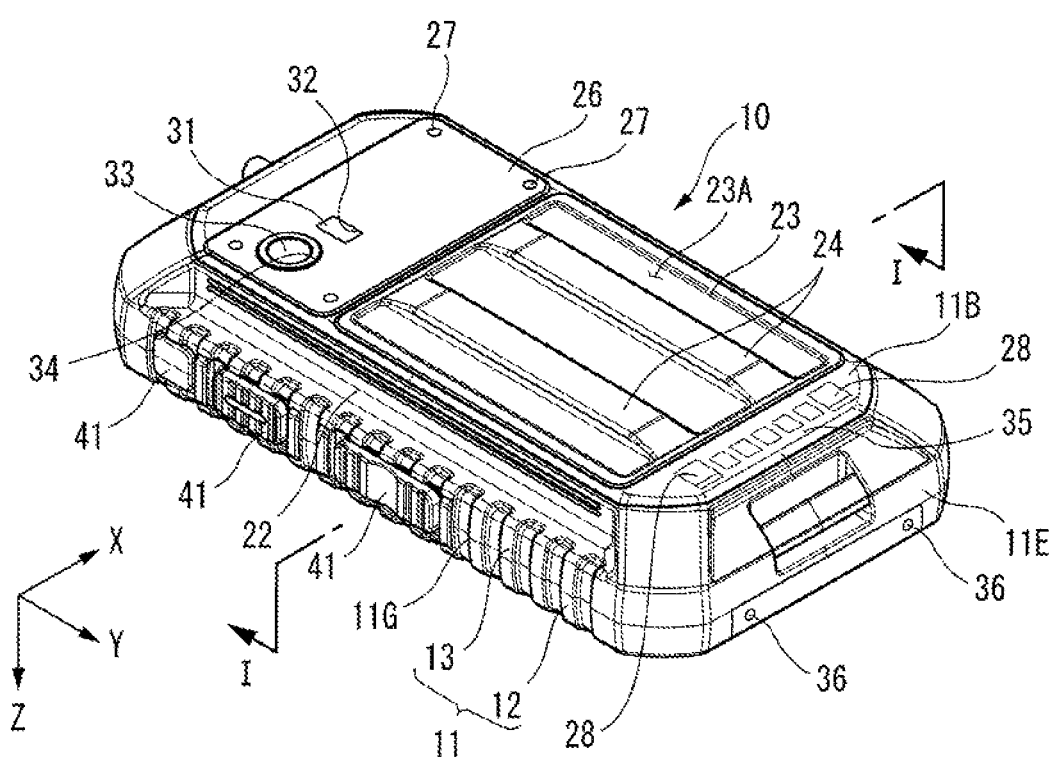
FIG. 2 is a perspective view illustrating a state of the portable terminal of FIG. 1, which is viewed from a rear surface side.

As illustrated in FIGS. 1 and 2, a portable terminal 10 includes the casing 11 formed substantially like a rectangular parallelepiped, to which a front case 12 and a rear case 13 are assembled.

A side-part of the casing 11, which corresponds to the front surface 11A is configured by the front case 12. The other side-part of the casing 11 which corresponds to the rear surface 11B, is configured by the rear case 13.

A substantially-rectangular frame member 19 is provided on the front surface 11A of the casing 11. An opening portion 14 is formed by the frame member 19. The opening portion 14 is covered with an operating panel 15. A display device 16 is incorporated in the casing 11 is covered by the operating panel 15. Moreover, a receiver tone-hole 17 is formed in a part of the front surface 11A of the casing 11, which part is at an upper side of the operating panel 15. An operating key 18 is provided in the neighborhood of the operating panel 15.

Figure 3:
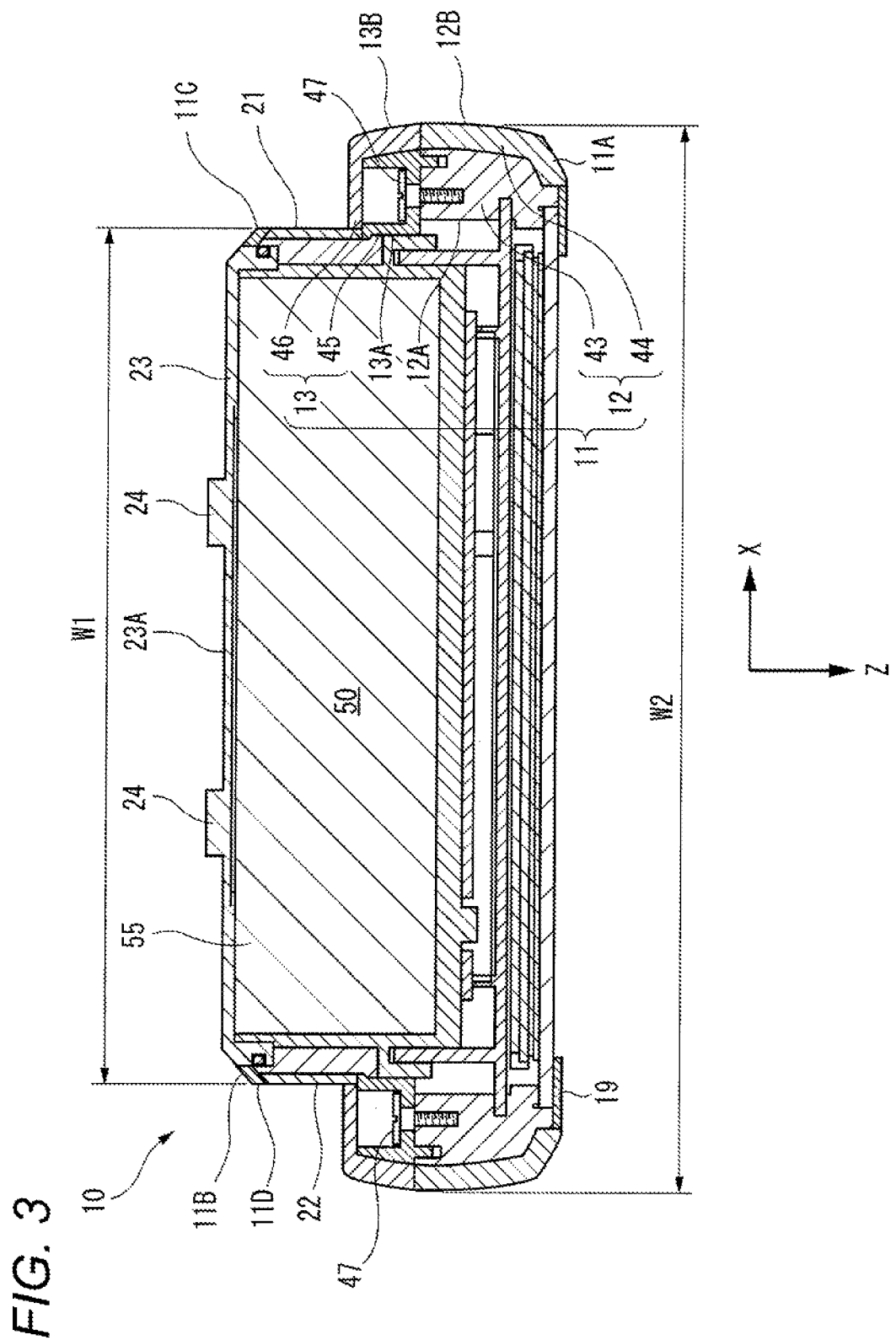
FIG. 3 is a cross-sectional view taken along line I-I of FIG. 2.

As illustrated in FIG. 3, a left-hand recess-portion 21 is formed along a left-hand side 11C of the rear surface 11B of the casing 11, while a right-hand recess-portion 22 is formed along a right-hand side 11D of the rear surface 11B of the casing 11. Thus, in a state in which the rear surface 11B of the casing 11 is raised, a width dimension W1 of the rear surface 11B can be suppressed so as to be less than a full width dimension W2 of the casing 11.

A high-capacity battery pack 55 can be loaded by raising the rear surface 11B of the casing 11. In addition, by decreasing the width dimension WI of the rear surface 11B, a user can hold the portable terminal 10 with a feeling of holding the battery pack 55 by hand by hooking his fingers on the left-hand recess-portion 21 and the right-hand recess-portion 22. Thus, the user can stably handle the portable terminal.

Referring back to FIG. 2, a battery lid 23 is detachably attached to the rear surface 11B of the casing 11. Plural convex portions 24 are formed on a surface 23A of the battery lid 23. The formation of the plural convex portions 24 on the surface 23A facilitates a user to hook fingers on the battery lid 23. Thus the treatment of the battery lid 23 is facilitated.

A gadget's lid 26 is attached with bolts 27 on the battery lid 23. A USB connector (electrical signal connector) 111 is exposed (see FIG. 16) by removing the gadget's lid 26 from the battery lid 23. A lens aperture 32 of a camera lens 31 is formed in the gadget's lid 26. A light aperture 34 of a camera light 33 is provided adjacent to the lens aperture 32. An electrical signal connector 35 is provided at a lower side of the battery lid 23. Operating switches 28 for catching the battery lid 23 are provided on both sides of the electrical signal connector 35. Incidentally, a microphone tone-hole and an air-pressure-sensor's hole are opened in the front surface 11A of the casing 11.

Furthermore, screw holes 36 for fixing a card reader 115 (see FIG. 22) are formed in a bottom part 11E of the casing 11. Convexo-concaves are formed on a left-side wall 11F of the casing 11. Similarly, convexo-concaves are formed on a right-side wall 11G of the casing 11. The treatment of the casing 11 is facilitated by forming convexo-concaves on the left-side wall 11F and the right-side wall 11G A side key 41 for operating a side switch 39 (see FIG. 5) is provided on the right-side wall 11G.

As illustrated in FIG. 3, the front case 12 is two-color molded by forming, with a hard resin, an inner layer 43 configuring an inner surface 12A, and also forming with a soft resin such as an elastomer, an outer layer 44 configuring an outer surface 12B. Thus, the hard resin is exposed on the inner surface 12A of the front case 12, while the soft resin is exposed on the outer surface 12B. Similarly to the front case 12, the rear case 13 is two-color molded by forming, with a hard resin, an inner layer 45 configuring an inner surface 13A, and also forming, with a soft resin, an outer layer 46 configuring an outer surface 13B. Thus, the hard resin is exposed on the inner surface 13A of the rear case 13, while the soft resin is exposed on the outer surface 13B. The inner layer 43 of the front case 12, and the inner layer 45 of the rear case 13 are assembled to each other by case fixing screws 47. Here, in order to integrally assemble the inner layers 43 and 45 to each other by the case fixing screws 47, the outer layer 46 of the rear case 13 is partly cut out.

Hereinafter, component members housed in an inside 50 of the casing 11 of the portable terminal 10 are described.

Figure 4:
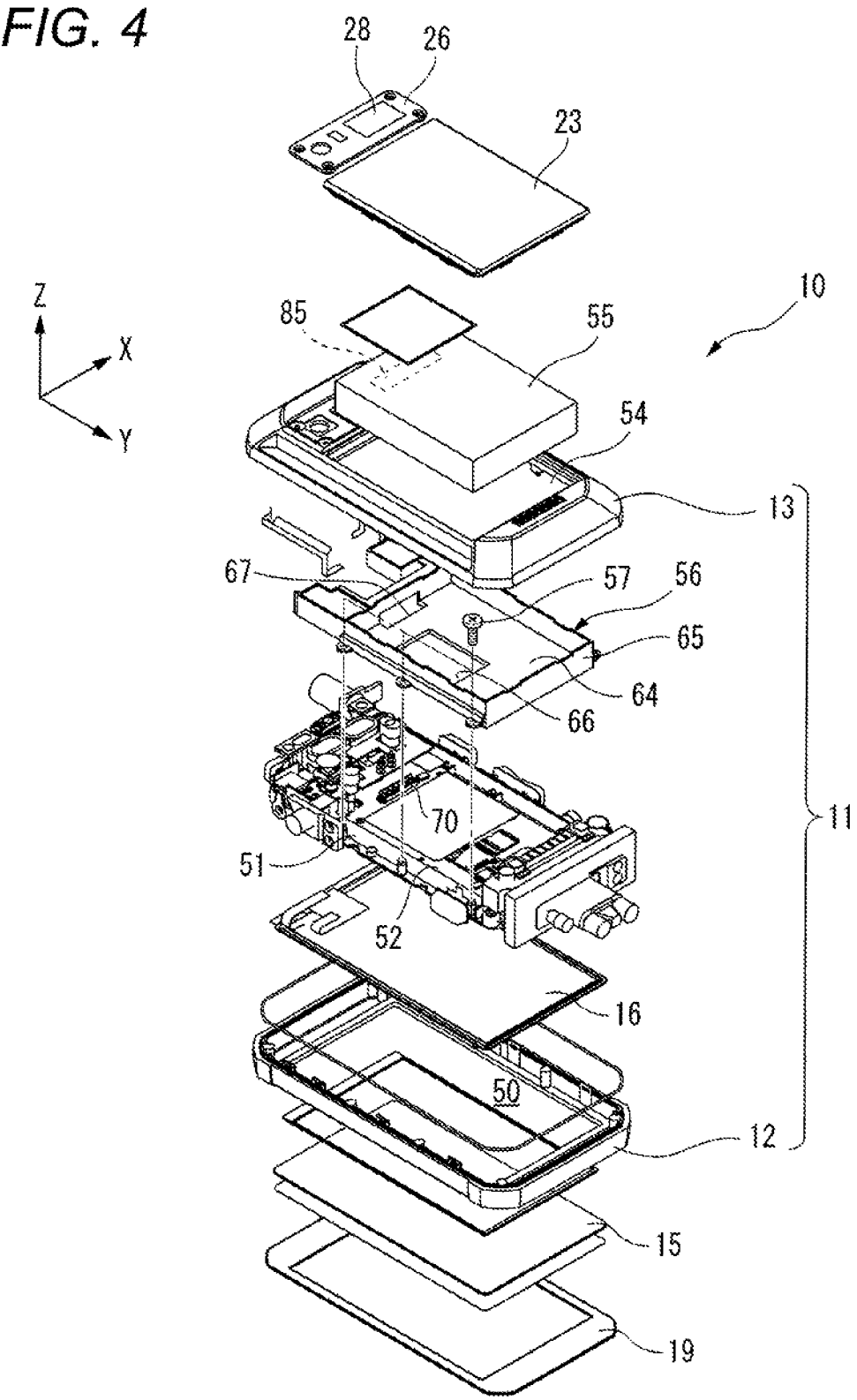
FIG. 4 is an exploded perspective view illustrating the portable terminal of FIG. 1.

As illustrated in FIG. 4, the portable terminal 10 includes a chassis 51 housed in the inside 50 (also see FIG., 3) of the casing 11, a circuit board 52 held in the chassis 51, and a fixing portion 53 (see FIG. 7) which fixes the circuit board 52 to the casing 11 so as to be movable a predetermined amount.

The portable terminal 10 also includes the display device 16 arranged on the circuit board 52, a battery housing portion 54 provided at a location along a thickness direction (Z-direction) of the circuit board 52, a battery pack 55 housed in the battery housing portion 54, and a restraining member 56 which restrains movement of the battery pack 55.

Moreover, the portable terminal 10 includes chassis buffer members 58 (see FIG. 14) respectively provided at plane angle portions 51A of the chassis 51, and a display device buffer member 59 (see FIG. 8) interposed between an end surface 16A of the display device 16 and the inner surface 12A of the casing 11 (front case 12).

Figure 5:
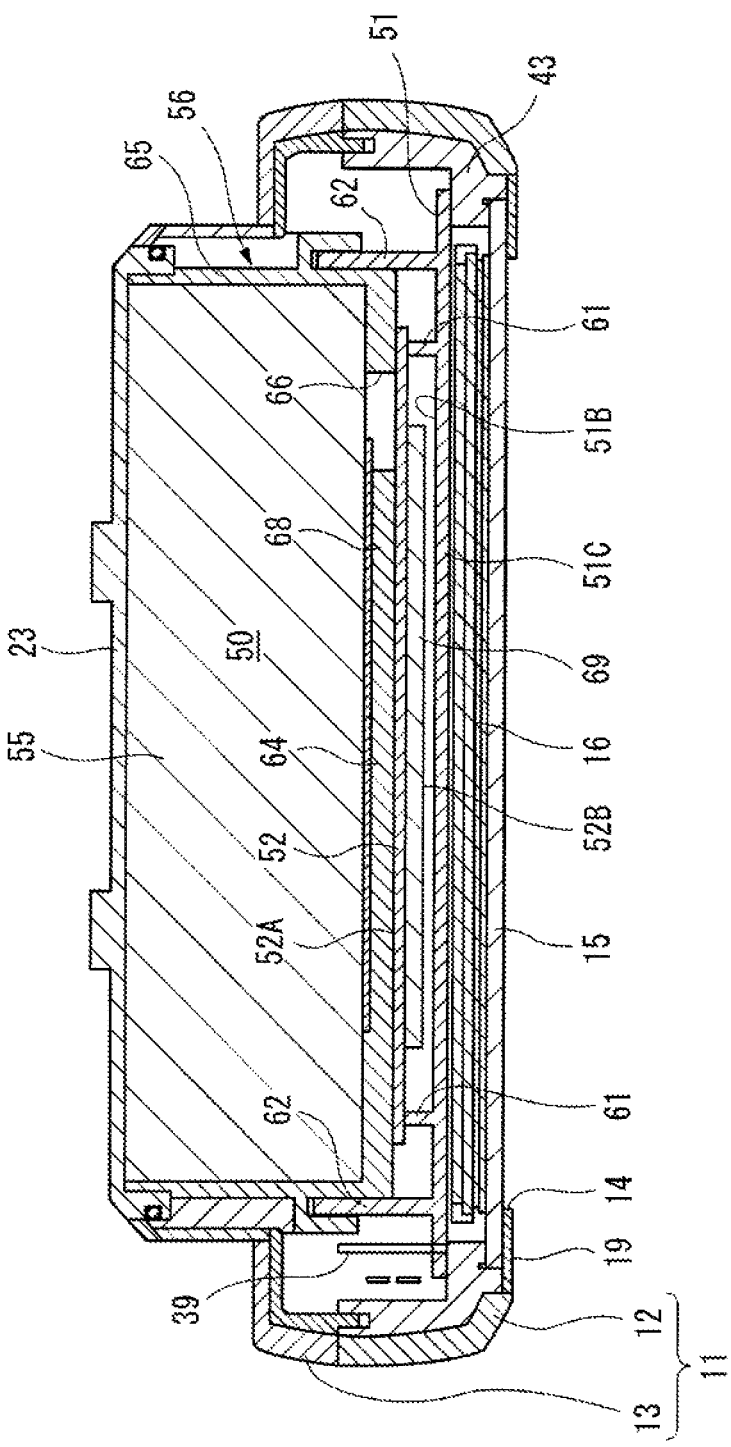
FIG. 5 is a cross-sectional view illustrating a state in which a restraining member is caught in a chassis of the first embodiment.

As illustrated in FIGS. 4 and 5, the chassis 51 put on the inner layer 43 of the front case 12 is housed in the inside 50 of the casing 11. Holding projections 61 and a chassis wall portion 62 are formed on a rear surface (surface at the side of the battery pack 55) 51B arranged to face the battery lid 23. The circuit board 52 is put on the holding projections 61. Thus, the circuit board 52 is hold by the chassis 51. Furthermore, the restraining member 56 is held by the chassis wall portion 62.

The display device 16 arranged on the side of a surface 51C of the chassis 51 is housed in the casing 11. The display device 16 arranged parallel to the circuit board 52 and covered with the operating panel 15 is exposed to the outside of the casing 11 through the opening portion 14.

In the circuit board 52, a rear surface 52A contacts a bottom portion 64 of the restraining member 56, an electronic component 68 is mounted so as to face a first relief opening 66 of the bottom portion 64, and an electronic component 69 is mounted on the side of a surface 52B of the circuit board 52. The circuit board 52 is also provided with a board-side connecting portion 70 arranged to face a second relief opening 67 of the restraining member 56.

Figure 6:
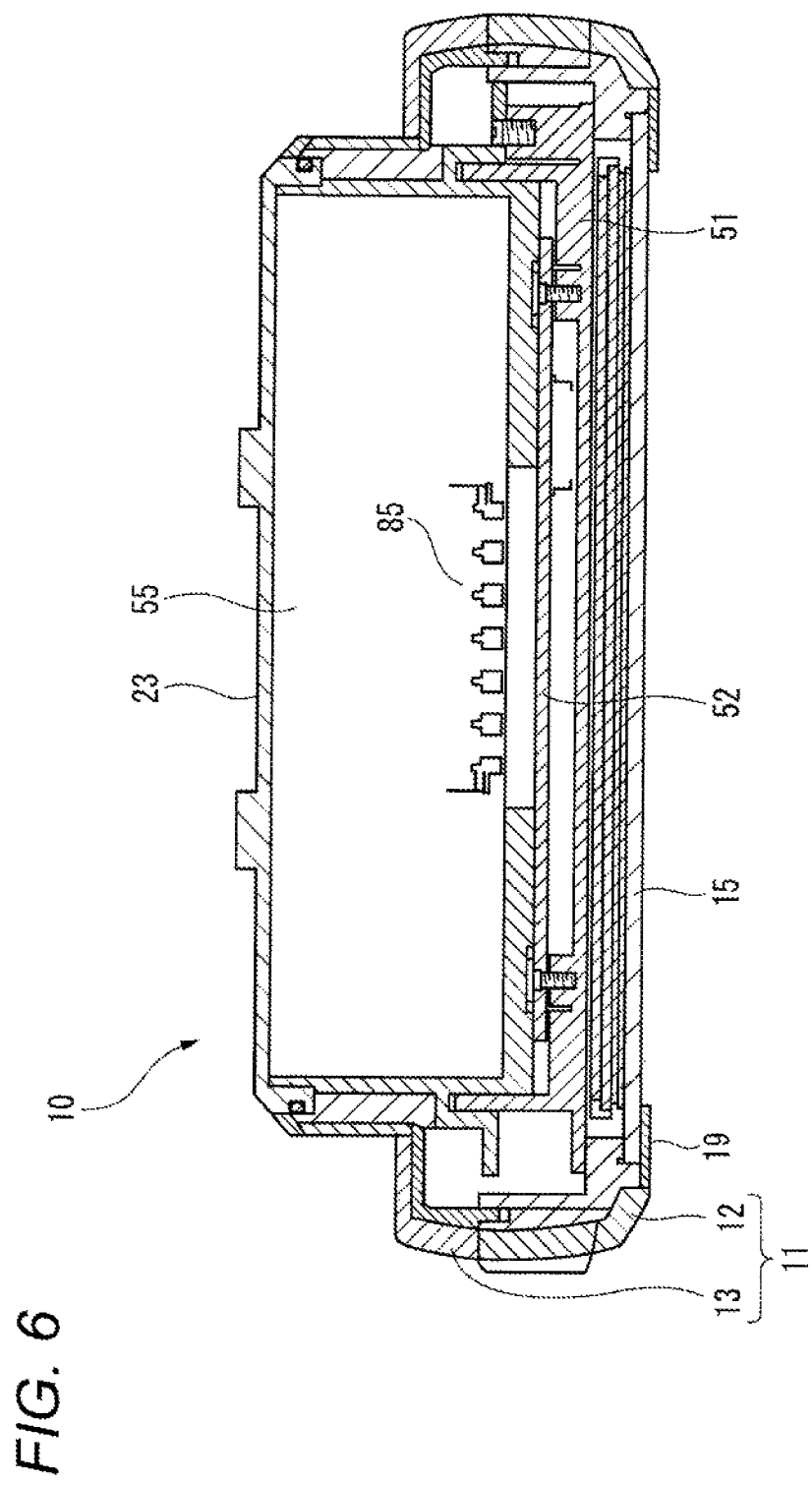
FIG. 6 is a cross-sectional view illustrating a state of in which a circuit board is attached to the chassis of the first embodiment.
Figure 7:
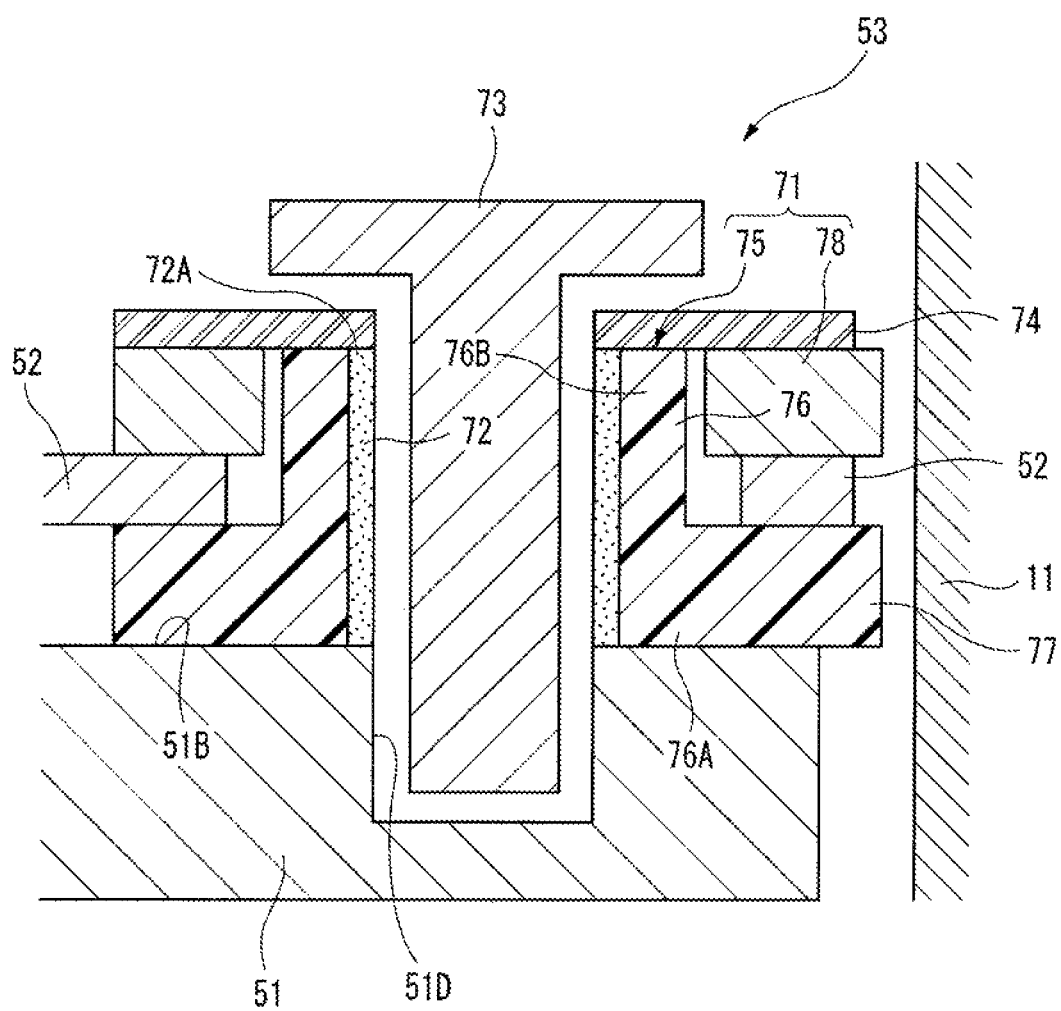
FIG. 7 is a cross-sectional view illustrating a fixing portion for attaching the circuit board to the chassis of the first embodiment.

As illustrated in FIGS. 6 and 7, the circuit board 52 is fixed to the casing 11 by the fixing portion 53 so as to be movable a predetermined amount. The fixing portion 53 includes a fixing bugger member 71 interposed between the circuit board 52 and the chassis 51, a collar 72 provided in the fixing butler member 71, a board fixing screw 73 for fixing the circuit board 52 to the chassis 51, and a washer 74 interposed between the board fixing screw 73 and the collar 72.

The fixing buffer member 71 includes a first buffer member 75 in which a cylindrical portion 76 is provided on an outer peripheral of the collar 72 and which a protrusion portion 77 protrudes outwardly from a bottom 76A of the cylindrical portion 76. The fixing buffer member 71 also includes a second buffer member 78 arranged to the side of a top-end 76B of the cylindrical portion 76. The protrusion portion 77 of the first buffer member 75 is arranged on the front surface 52B of the circuit board 52, while the second buffer member 78 is arranged on the rear surface 52A of the circuit board 52. The washer 74 is arranged on the first buffer member 75 and a top-end 72A of the collar 72. The board fixing screw 73 penetrating through the collar 72 is screwed into a screw hole 51D of the chassis 51. Thus, the circuit board 52 is fixed to the rear surface 51B of the chassis 51 with the board fixing screws 73 via the fixing buffer member 71. Accordingly, the circuit board 52 is fixed to the casing 11 (thus the chassis 51) by the fixing portion 53 so as to be movable a predetermined amount along each surface direction of the circuit board 52.

The protrusion portion 77 is interposed between the circuit board 52 and the chassis 51. The second buffer member 78 is interposed between the circuit board 52 and the washer 74. Thus, an impact applied onto the circuit board 52 from the chassis 51 due to the fall or the like of the portable terminal can be alleviated by the fixing buffer member 71.

Moreover, the board fixing screws 73 are made respectively penetrate through the fixing buffer members 71. Thus the cylindrical portion 76 can be interposed between the circuit board 52 and the board fixing screw 73. Accordingly, if a horizontal impact is applied to the circuit board 52, the application of an impact to the circuit board 52 through the board fixing screw 73 from the chassis 51 can be alleviated by the cylindrical portion 76.

Figure 8:
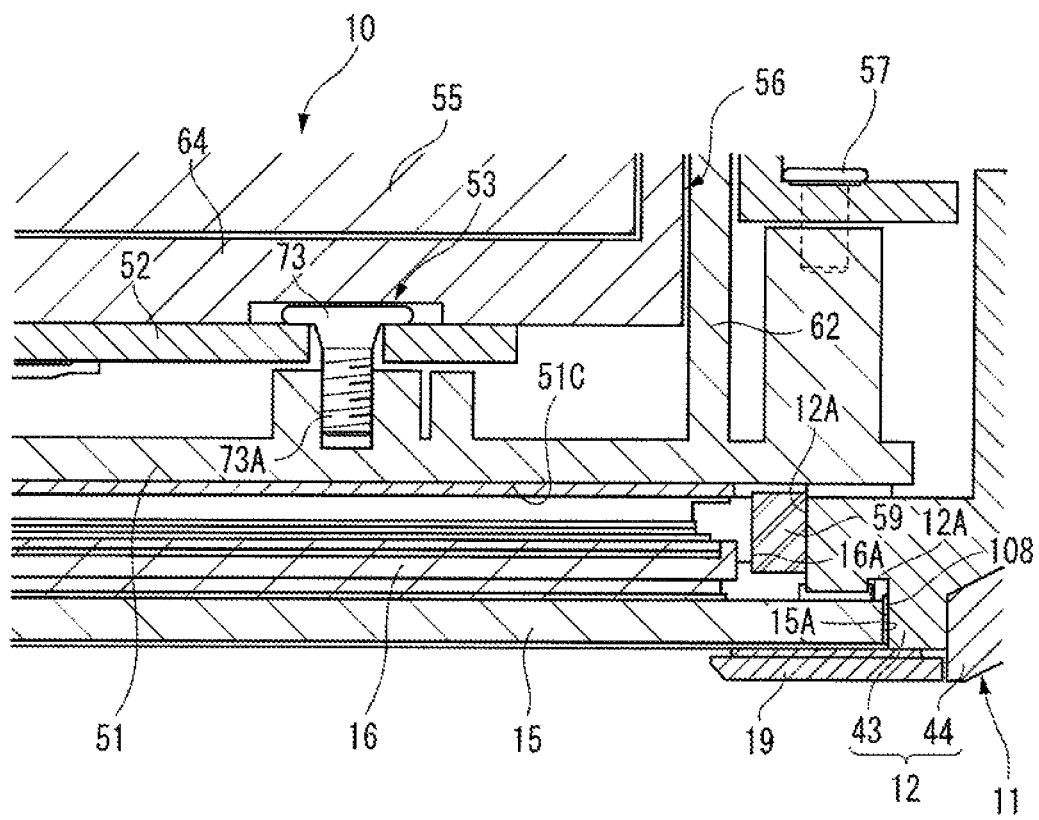
FIG. 8 is a cross-sectional view illustrating the relationship between a board fixing screw and a display device of FIG. 7.

As illustrated in FIG. 8, the display device 16 is arranged on a surface, i.e., the front surface 51C of the chassis 51, which is opposite to the battery pack 55. Furthermore, the portable terminal 10 is configured to prevent the top-end 73A of the board fixing screws 73 from touching the display device 16. Consequently, there is no risk of damaging the display device 16 by the board fixing screw 73. Moreover, the thickness of the portable terminal 10 can be reduced.

(Modification 1)

Figure 9:
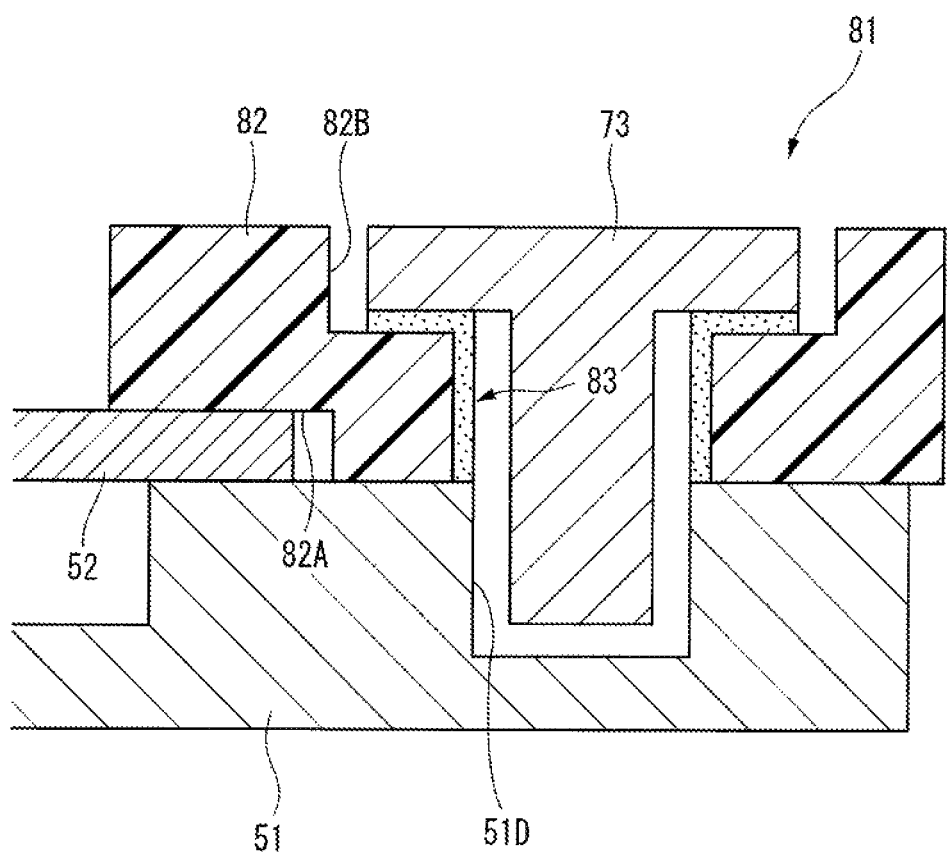
FIG. 9 is a cross-sectional view illustrating Modification 1 of the fixing portion of FIG. 7.

Modification 1 of the fixing portion 53 is described hereinafter with reference to FIG. 9.

A fixing portion 81 according to Modification 1 includes a fixing buffer member 82 for holding the circuit board 52 in the chassis 51, a collar 83 provided in a fixing buffer member 82, and board fixing screw 73 for fixing the circuit board 52 to the chassis 51. The fixing buffer member 82 is provided on the outer periphery of the collar 83. A lower concave portion 82A is formed on a lower part of the fixing buffer member 82, an upper concave portion 82B is formed on an upper part of the fixing buffer member 82.

A protrusion portion 83A of the collar 83 is arranged on the upper concave portion 82B. The circuit board 52 is arranged on the lower concave portion 82A. The board fixing screw 73 inserted into the collar 83 is screwed into the screw hole 51D of the chassis 51. Thus the circuit board 52 is fixed to the chassis 51 with the board fixing screw 73 via the fixing buffer member 82. Consequently, the circuit board 52 is fixed to the casing 11 by the fixing portion so as to be movable a predetermined amount along each surface direction of the circuit board 52.

The circuit board 52 is held in the chassis 51 by the fixing buffer member 82. Thus, an impact applied onto the circuit board 52 from the chassis 51 due to the fall or the like of the portable terminal can be alleviated by the fixing buffer member 82.

Moreover, the board fixing screws 73 are made to respectively penetrate through the fixing buffer members 82. Thus the fixing buffer member 82 can be interposed between the circuit board 52 and the board fixing screw 73. Accordingly, if a horizontal impact is applied to the circuit board 52, the application of an impact to the circuit board 52 through the board fixing screw 73 from the chassis 51 can be alleviated by the fixing buffer member 82.

(Modification 2)

Figure 10:
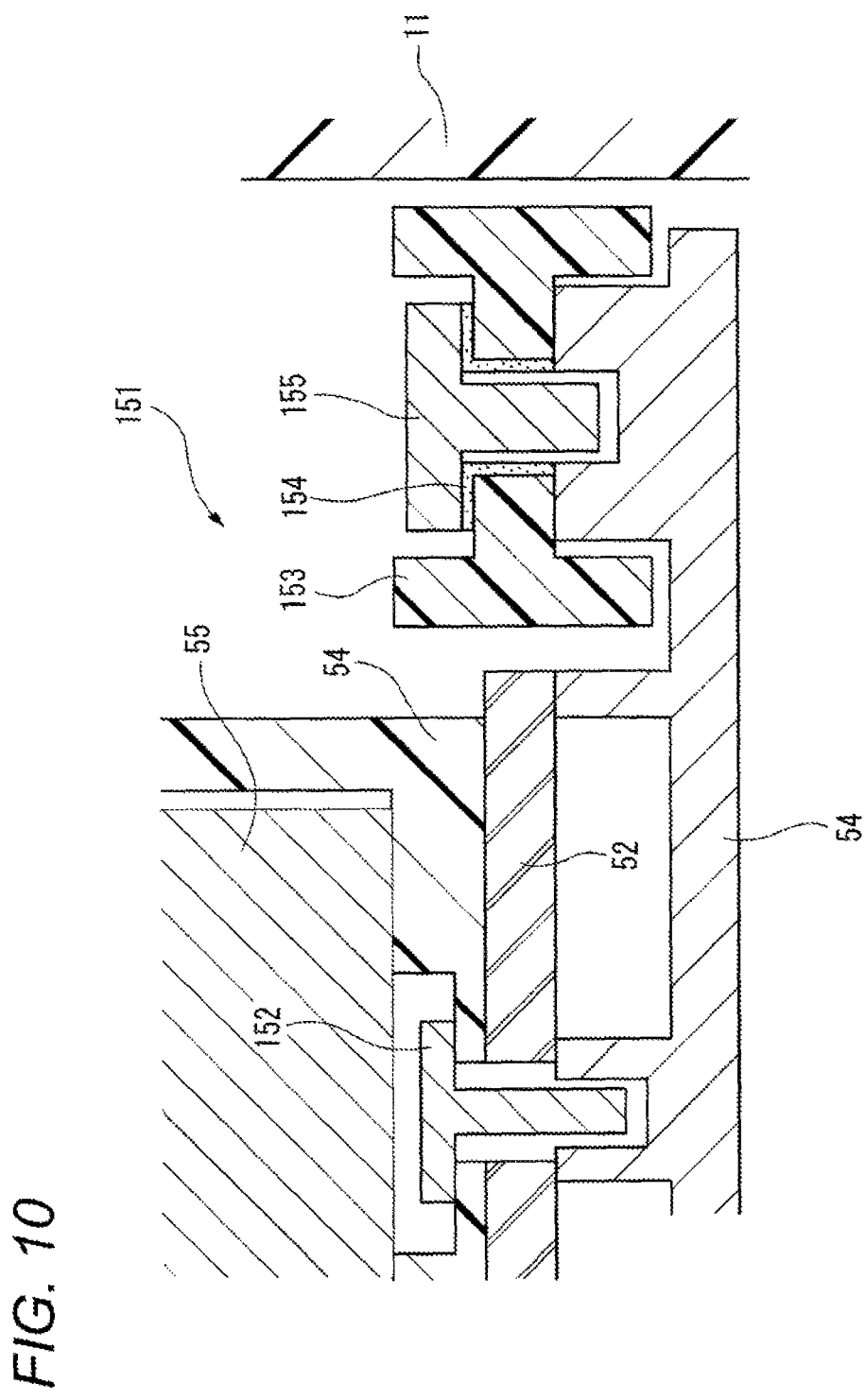
FIG. 10 is a cross-sectional view illustrating Modification 2 of the fixing portion of FIG. 7.

Modification 2 of the fixing portion 53 is described hereinafter with reference to FIG. 10.

A fixing portion 151 according to Modification 2 includes a board fixing screw 152 for fixing the circuit board 52 to the chassis 51 by rigid fixation, a fixing buffer member 153 for fixing the chassis 51 by floating fixation, a collar 154 and a chassis fixing screw 155. The circuit board 52 is fixed to the chassis 51 with the board fixing screw 152 together with the battery housing portion 54.

The chassis 51 is fixed to the casing 11 by floating fixation with the chassis fixing screw 155 via the fixing buffer member 153 and the collar 154.

The chassis 51 is fixed with the fixing buffer member 153 by floating fixation. Thus, an impact applied to the circuit board 52 can be alleviated by the fixing buffer member 153. Moreover, the chassis fixing screws 155 are made to respectively penetrate through the fixing buffer members 153. Thus, if a horizontal impact is applied to the circuit board 52, the application of an impact to the circuit board 52 can be alleviated by the fixing buffer member 153.

Figure 11:
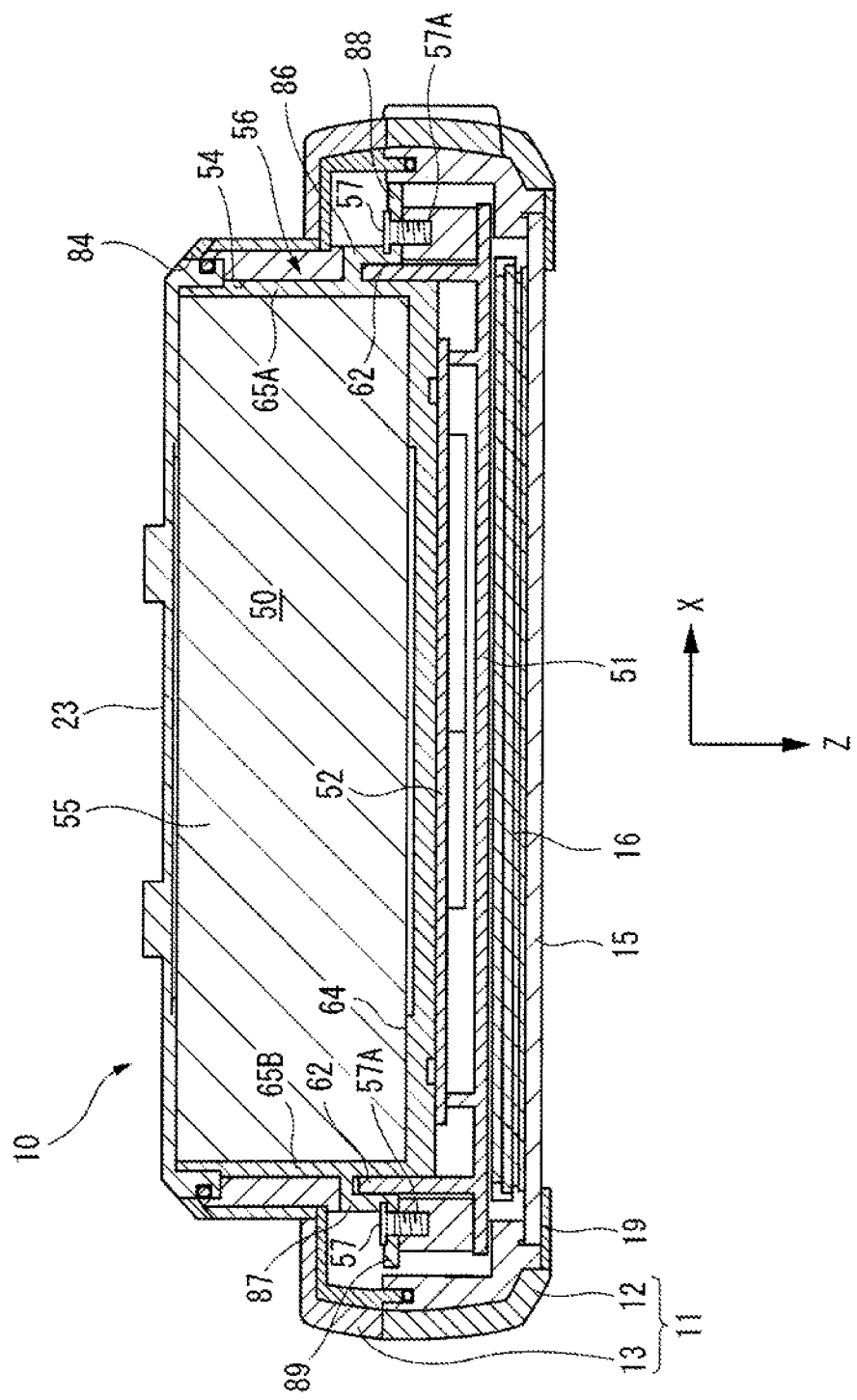
FIG. 11 is a cross-sectional view illustrating a restraining member fixing screw for attaching a restraining member to the chassis of the first embodiment.

As illustrated in FIGS. 4 and 11, the battery housing portion 54 is provided at a location along a thickness direction Z-direction) of the circuit board 52 in the casing 11. The battery housing portion 54 is communicated with a battery opening 84 of a rear case 13. The battery lid 23 is detachably attached to the battery opening 84. The battery pack 55 is housed in the battery housing portion 54. The battery pack 55 is formed like a rectangular parallelepiped. The battery pack 55 is housed in the battery housing portion 54 through the battery opening 84. As illustrated in FIGS. 4 and 6, a battery-side connecting portion 85 to be connected to the board-side connecting portion 70 is provided in the battery pack 55.

Figure 12:
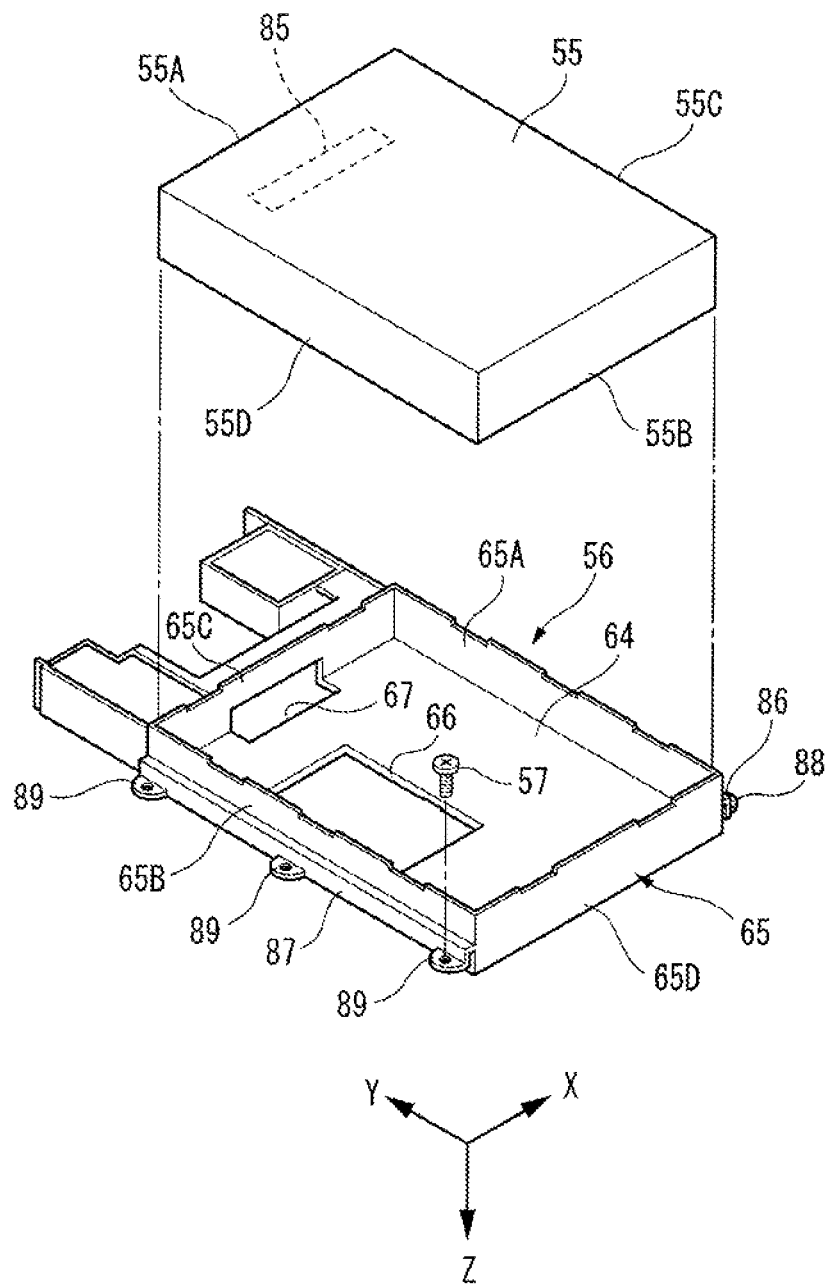
FIG. 12 is a perspective view illustrating a frame portion and a battery pack of FIG. 1.

As illustrated in FIGS. 11 and 12, the restraining member 56 for restraining movement of the battery pack 55 is included in the inside 50 of the casing 11. The restraining member 56 is a member for restraining movement of the battery pack 55 with respect to the circuit board 52 along each of surface directions (X-direction and Y-direction) of the circuit board 52. The restraining member 56 includes the bottom part 64 arranged along the circuit board 52, a flame portion 65 provided in the bottom part 64, a left fitting portion 86 and a right fitting portion 87 respectively provided in a left-side wall 65A and a right-side wall 65B of the frame portion 65, and a left attaching piece 88 and a right attaching piece 89 respectively provided in the left fitting portion 86 and the right fitting portion 87.

A first relief opening 66 for receiving the electronic component 68 on the circuit board 52 is formed in the bottom part 64. Moreover, a second relief opening 67 for receiving the board-side connecting portion 70 of the circuit board 52 is formed in the bottom part 64 and the frame portion 65 (upper wall 65C). The frame portion 65 includes the upper wall 65C contactable with the top surface 55A of the battery pack 55, a lower wall 65D contactable with the bottom surface 55B of the battery pack 55, the left-side wall 65A contactable with a left-side surface 55C of the battery pack 55, and a right-side wall 65B contactable with a right-side surface 55D of the battery pack 55. Thus, the battery pack 55 is housed in the name portion 65 of the restraining member 56. Consequently, the battery pack 55 is held by the restraining member 56.

The left fitting portion 86 is fit onto one of the chassis wall portions 62. The right fitting portion 87 is fit onto the other chassis wall portion 62. The restraining member fitting screws 57 are made to penetrate through the left attaching piece 88 and the right attaching piece 89, respectively and screwed into the chassis 51. Thus the restraining member 56 is fixed to the chassis 51 with the restraining member fixing screws 57.

In addition, the portable terminal is formed such that a tip-end 57A of each restraining member fixing screw 57 is not contacted with the display device 16. Consequently, there is no risk of damaging the display device 16 by the restraining member fixing screw 57. Moreover, the thickness of the portable terminal 10 can be reduced.

The restraining member 56 is fixed to the chassis 51 that holds the circuit board 52. Thus, the circuit board 52 and the restraining member 56 can be thrilled integrally with each other via the chassis 51. Consequently, if an impact due to the fall or the like of the portable terminal is applied thereto, the battery pack 55 can be made to follow the circuit board 52 mounted in the casing 11 so as to be in a floating state. The relative position between the circuit board 52 and the battery pack 55 can result be maintained.

(Modification 3)

Modifications 3 to 6 of the restraining member 56 are described hereinafter with reference to FIGS. 13A to 13D.

Figure 13:
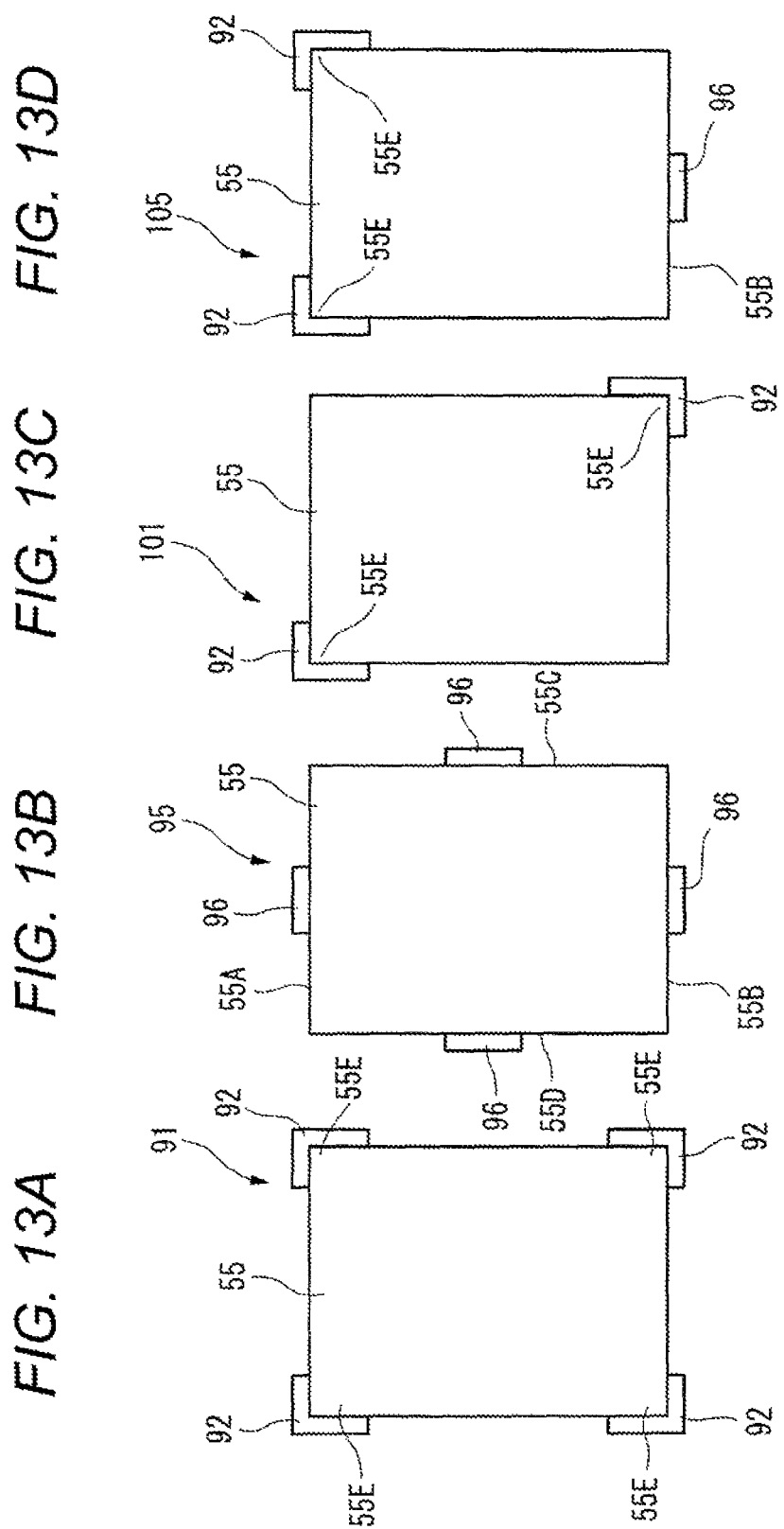
FIG. 13A is a plan view illustrating Modification 3 of the frame portion of FIG. 12.
FIG. 13B is a plan view illustrating. Modification 4 of the frame portion of FIG. 12.
FIG. 13C is a plan view illustrating Modification 5 of the frame portion of FIG. 12.
FIG 13D is a plan view illustrating Modification 6 of the frame portion of FIG. 12.

As illustrated in FIG. 13A, a regulating member 91 of Modification 3 includes plural corner frame walls 92 instead of the frame portion 65 of the embodiment. The other components of this modification are the same as the associated components of the restraining member 56 of the embodiment. The frame portion 65 is a flame wall for holding four corner portions 55E of the battery pack 55. The restraining member 91 of Modification 3 can obtain advantages similar to those of the restraining member 56 of the embodiment.

(Modification 4)

As illustrated in FIG. 13B, a restraining member 95 of Modification 4 includes plural central frame walls 96 instead of the frame portion 65 of the embodiment. The other components of this modification are the same as the associated components of the restraining member 56 of the embodiment The central frame walls 96 are frame walls each of which holds the center of an associated one of the top surface 55A, the bottom surface 55B, the left-side surface 55C, and the right-side surface 55D of the battery pack 55. The restraining member 95 of Modification 4 can obtain advantages similar to those of the restraining member 56 of the embodiment.

(Modification 5)

As illustrated in FIG. 13C, a restraining member 101 of Modification 5 includes a pair of corner frame walls 92 instead of the frame portion 65 of the embodiment. The other components of this modification are the same as the associated components of the restraining member 56 of the embodiment. The corner frame walls 92 are frame walls that hold a diagonal pair of corners 55E of the battery pack 55. The restraining member 101 of Modification 5 can obtain advantages similar to those of the restraining member 56 of the embodiment.

(Modification 6)

As illustrated in FIG. 13D, a restraining member 105 of Modification 6 includes a pair of corner wall walls 92 and a central frame wall 96, instead of the frame portion 65 of the embodiment. The other components of this modification are the same as the associated components of the restraining member 56 of the embodiment. The corner frame walls 92 are wall frames that hold an adjacent pair of the corner portions 55E of the battery pack 55. The single central frame wall 96 is a frame wall that holds the center of the bottom surface 55B of the battery pack 55. The restraining member 105 of Modification to can obtain advantages similar to those of the restraining member 56 of the embodiment.

Figure 14:
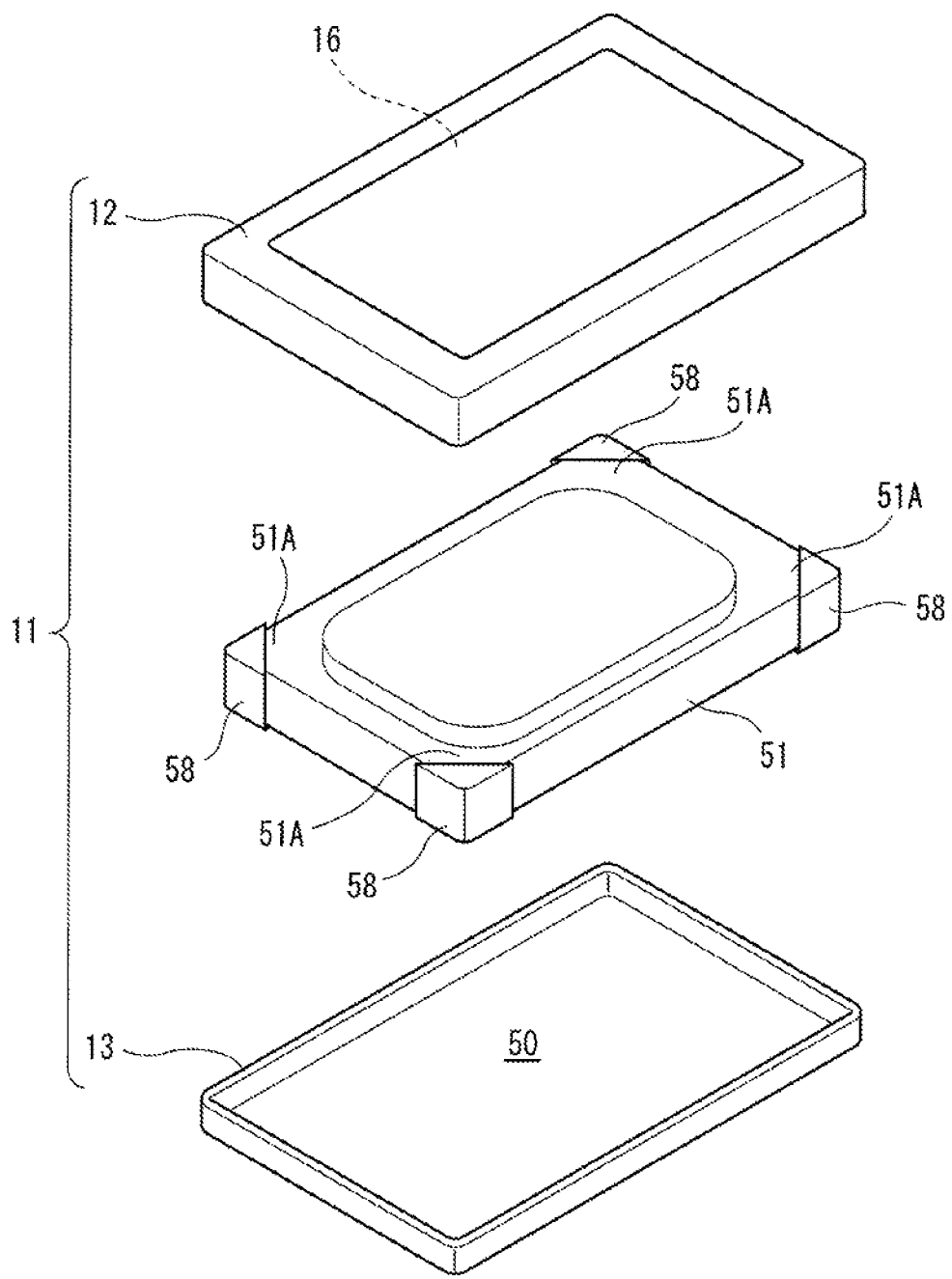
FIG. 14 is a cross-sectional view illustrating a state in which a chassis buffer member is attached to the chassis of the first embodiment.

As illustrated in FIG. 14, a chassis buffer member 58 is provided at each plane angle portion 51A of the chassis 51. The chassis buffer members 58 are contacted with the inner surface of the casing 11. Consequently, if an impact due to the fall or the like of the portable terminal is applied to the casing, influence on the circuit board 52 (see FIG. 11) mounted on the chassis 51 can be alleviated by the chassis buffer members 58. Furthermore, the shape of each chassis buffer member 58 can be minimized by providing the chassis buffer member 58 only at each plane angle portion 51A of the chassis 51.

Referring back to FIG. 8, a display device buffer member 59 is interposed between an end surface 16A of the display device 16 and the inner layer 43 (inner surface 12A) of the front case 12. If an impact due to the fall or the like of the portable terminal is applied to the casing, influence of the impact from the casing 11 to the display device 16 can be alleviated by the display buffer member 59 by interposing the display device buffer member 59 between the end surface 16A of the display device 16 and the inner surface 12A of the front case 12.

Furthermore, an operating panel buffer member 108 is interposed between the end surface 15A of the operating panel 15 and the inner layer 43 (inner surface 12A) of the front case 12. If an impact due to the fall or the like of the portable terminal is applied to the casing, influence of the impact from the casing 11 to the operating panel 15 can be alleviated by the operating panel buffer member 108 by interposing the operating panel buffer member 108 between the end surface 15A of the operating panel 15 and the inner surface 12A of the front case 12.

As described above, the circuit board 52 is fixed to the casing 11 by the fixing portion 53 so as to be movable a predetermined amount in surface directions of the circuit board 52. Consequently, the circuit board 52 can be fixed to the casing 11 so as to be in a floating state. Thus, if an impact due to the fall or the like of the portable terminal is applied thereto, there is no risk of damaging the circuit board 52.

In addition, the movement of the battery pack 55 with respect to the circuit board 52 along the surface directions of the circuit board 52 the circuit board 52 can be restrained by the restraining member 56. Thus, if an impact due to the fall or the like of the portable terminal is applied thereto, the relative position between the circuit board 52 and the battery pack 55 is maintained. Consequently, there are no risks of the damage of the board-side connecting portion 70 and the battery-side connecting portion 85 (see FIG. 4) and the disconnection therebetween. Thus the connection of the battery pack 55 to the circuit board 52 can be assured.

Figure 15:
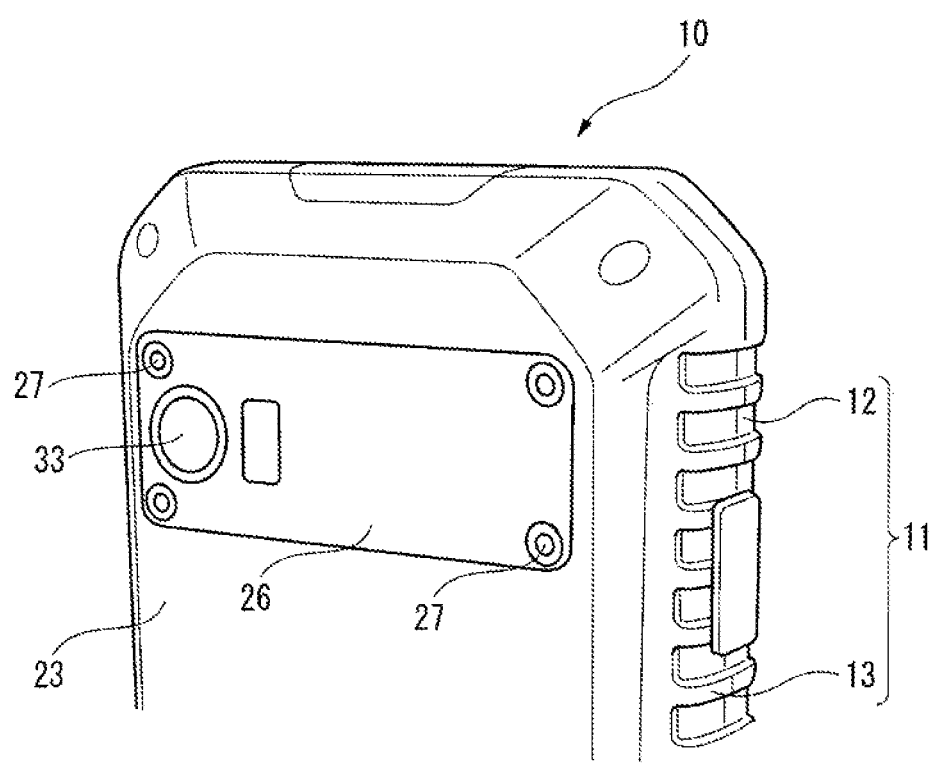
FIG. 15 is a perspective view illustrating a state in which a gadget lid is attached to the portable terminal of the first embodiment.
Figure 16:
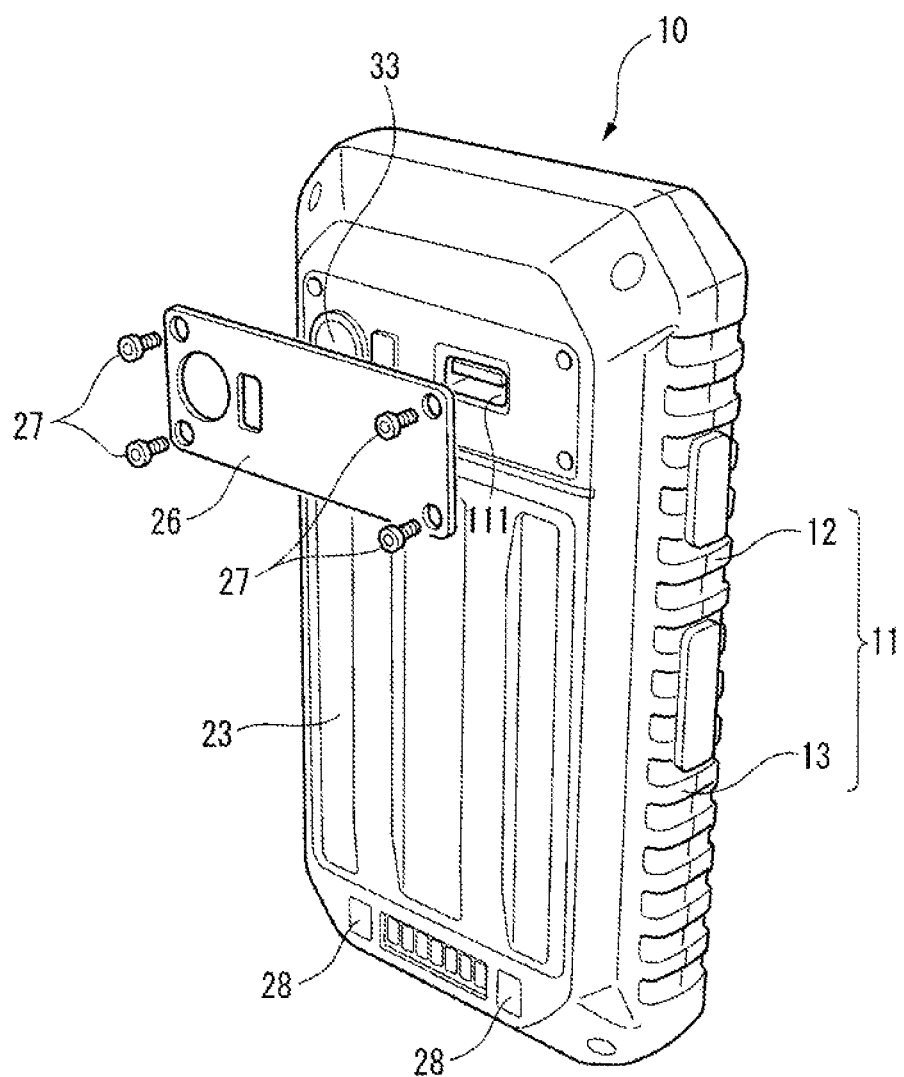
FIG. 16 is a perspective view illustrating a state in which a gadget lid is removed from the portable terminal of the first embodiment.

As illustrated in FIGS. 15 and 16, the gadget's lid 26 is attached detachably to the casing 11 (rear case 13) with bolts 27. Thus, the gadget's lid 26 can be removed according to a user's intended purpose, so that a desired module (gadget or additional function circuit) can be attached to the portable terminal as an option. The desired module is connected to a USB connector (electrical signal connector) 111 and fixed to the casing 11 utilizing the bolts 27 which fix the gadget's lid 26. For example, a card reader for reading magnetism from a magnetic card can be cited as the desired module.

Figure 17:
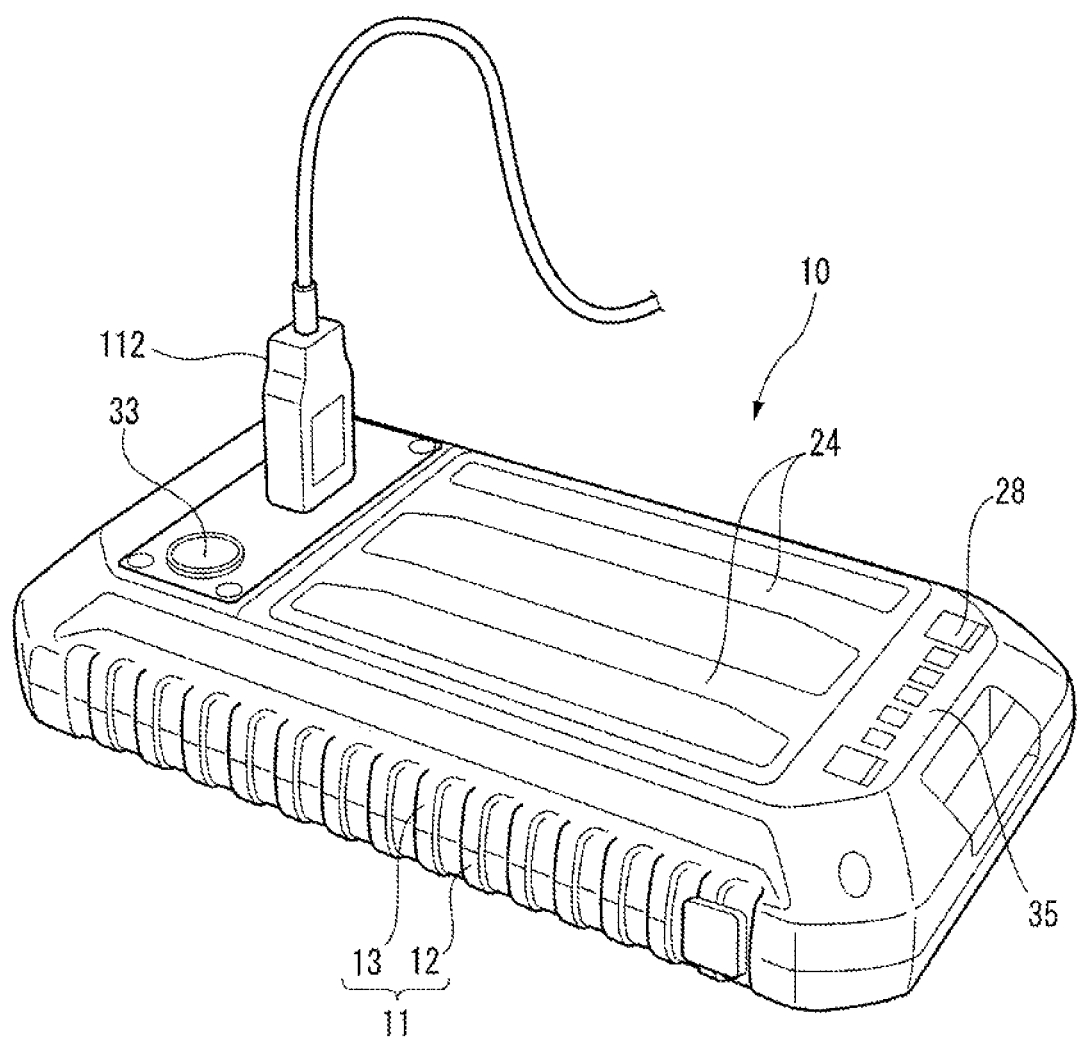
FIG. 17 is a perspective view illustrating a state in which a universal serial bus (USB) terminal is connected to the portable terminal of the first embodiment.

As illustrated in FIGS. 16 and 17, the USB connector (electrical signal connector) 111 can be exposed by removing the gadget's lid 26 from the battery lid 23. Thus an USB terminal 112 can be connected to the USB connector 111 by removing the gadget's lid 26.

Figure 18:
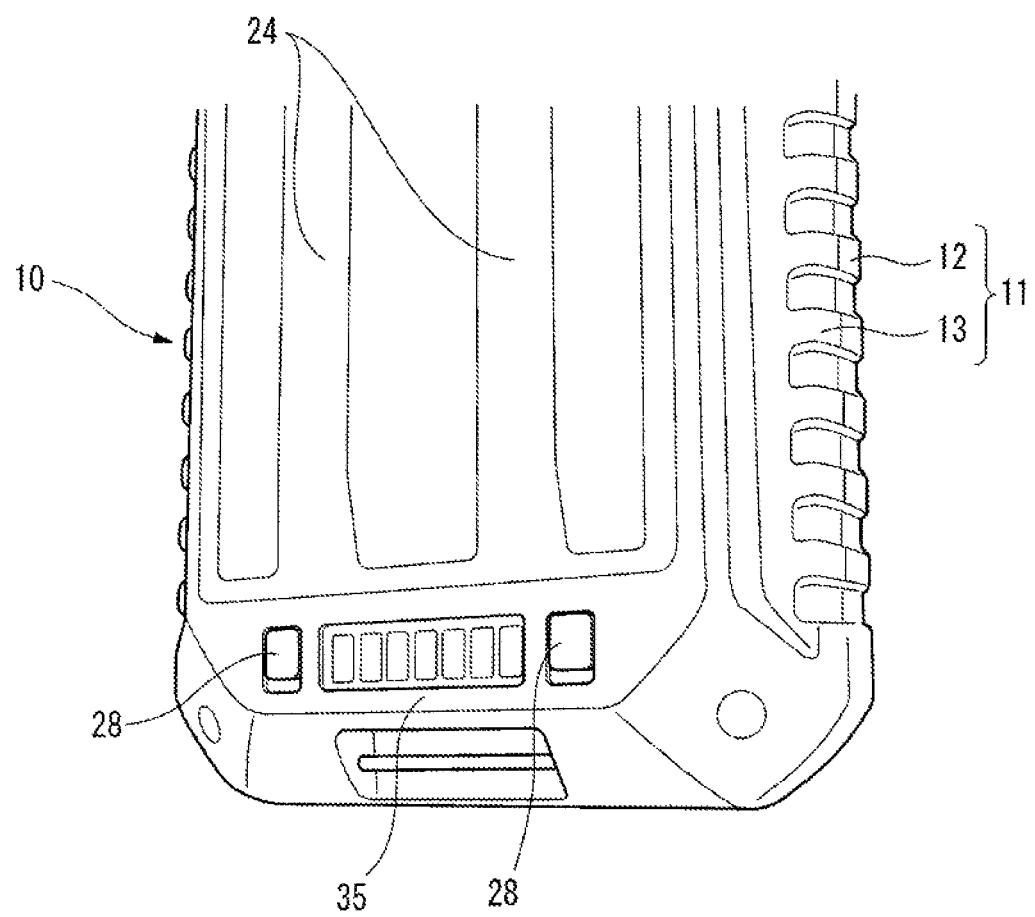
FIG. 18 is a perspective view illustrating an unlocked state of an operating switch of an electrical signal connector of the first embodiment.
Figure 19:
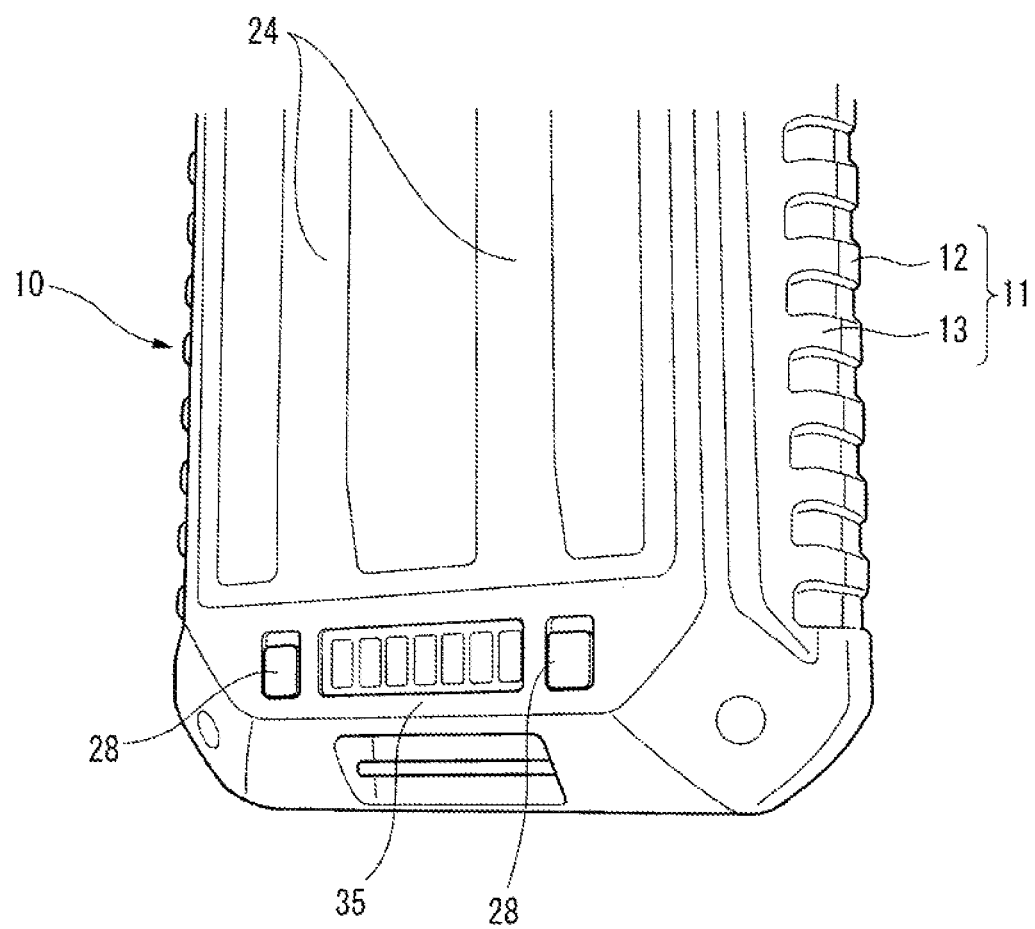
FIG. 19 is a perspective view illustrating a locked state of the switch of FIG. 7.

As illustrated in FIGS. 18 and 19, the electrical signal connector 35 is provided under the battery lid 23. The operating switches 28 are provided on both of the right and left sides of the electrical signal switch 35, respectively. FIG. 18 illustrates a state in which the operating switches 28 are arranged in an unlocked condition. FIG. 19 illustrates a state in which the operating switches 28 are arranged in a locked condition.

Figure 20:
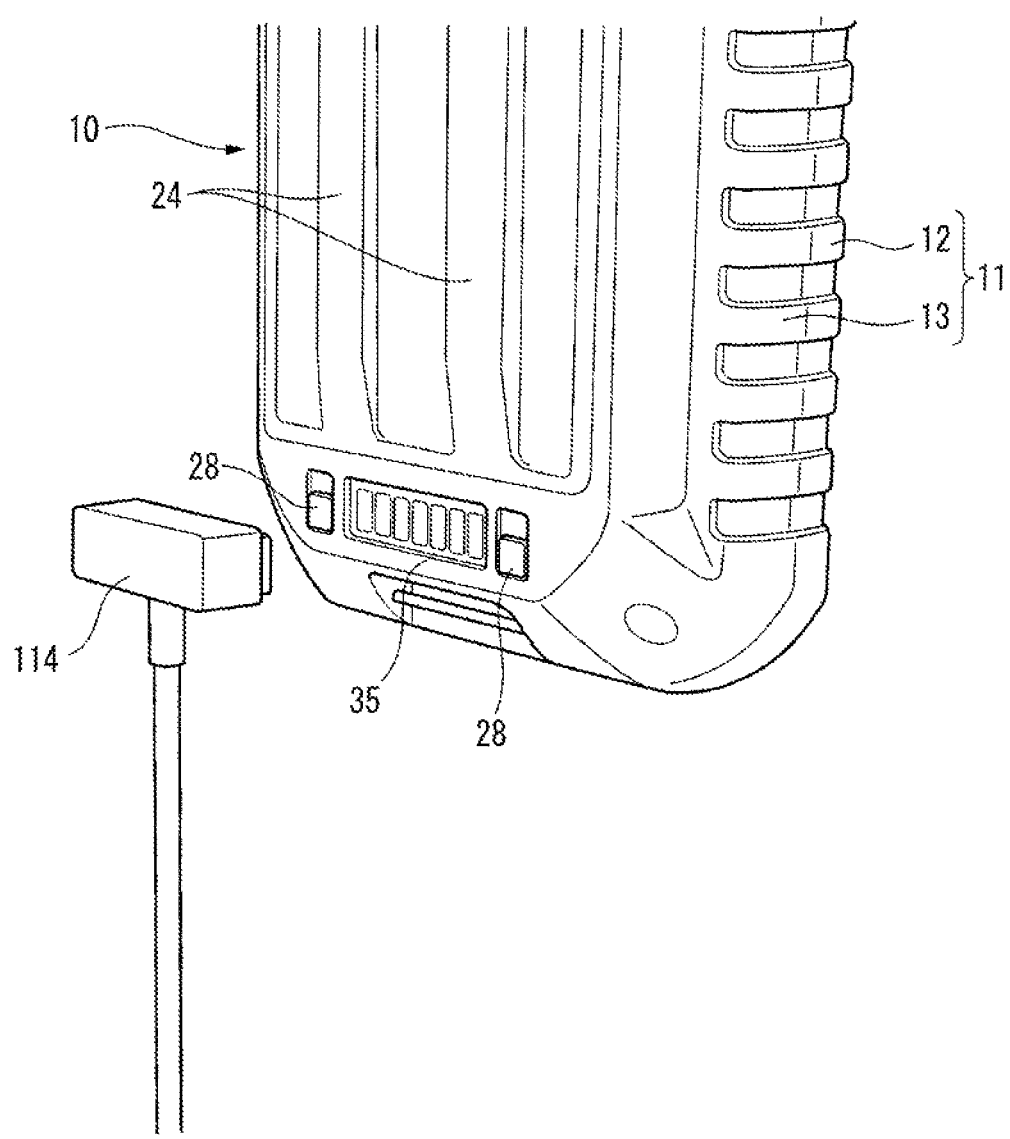
FIG. 20 is a perspective view illustrating a state of connecting a module to the electrical signal connector of FIG, 19.
Figure 21A:
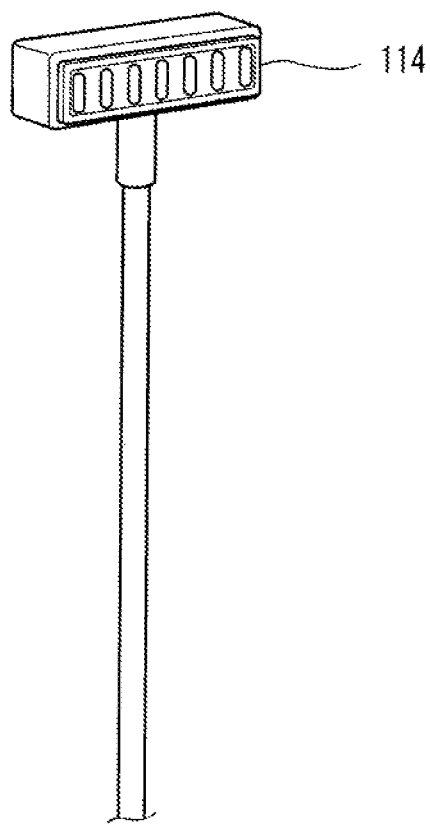
FIG. 21A is a perspective view illustrating the module of FIG. 19.
Figure 21B:
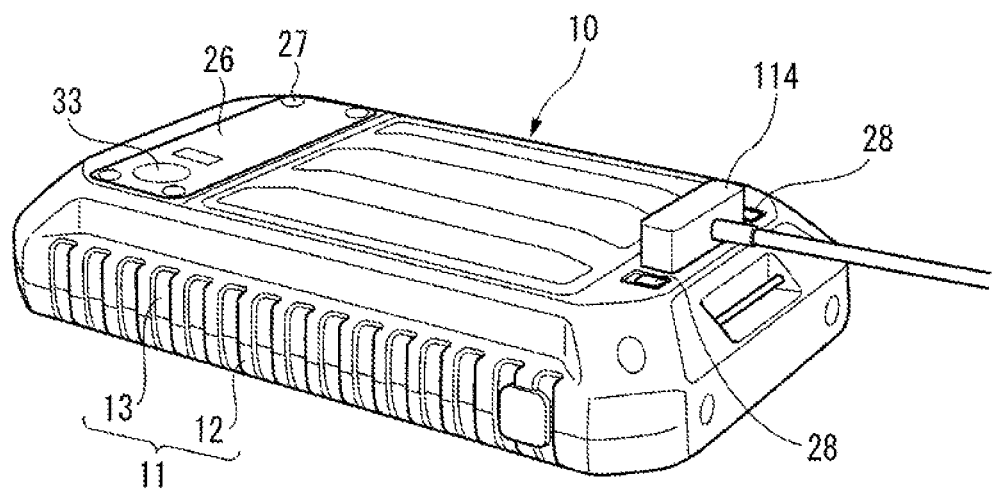
FIG. 21B is a perspective view illustrating a state in which the module of FIG. 21A is connected to the electrical signal connector.

As illustrated in FIGS. 20 and 21, a module (gadget or additional function circuit) 114 is attracted by a magnet. Thus, the module 114 can be connected to the electrical signal connector 35. The module 114 can be attached to the portable terminal as an option according to a user's intended purpose. For example, a card reader for reading magnetism from a magnetic card can be cited as the desired module.

Figure 22:
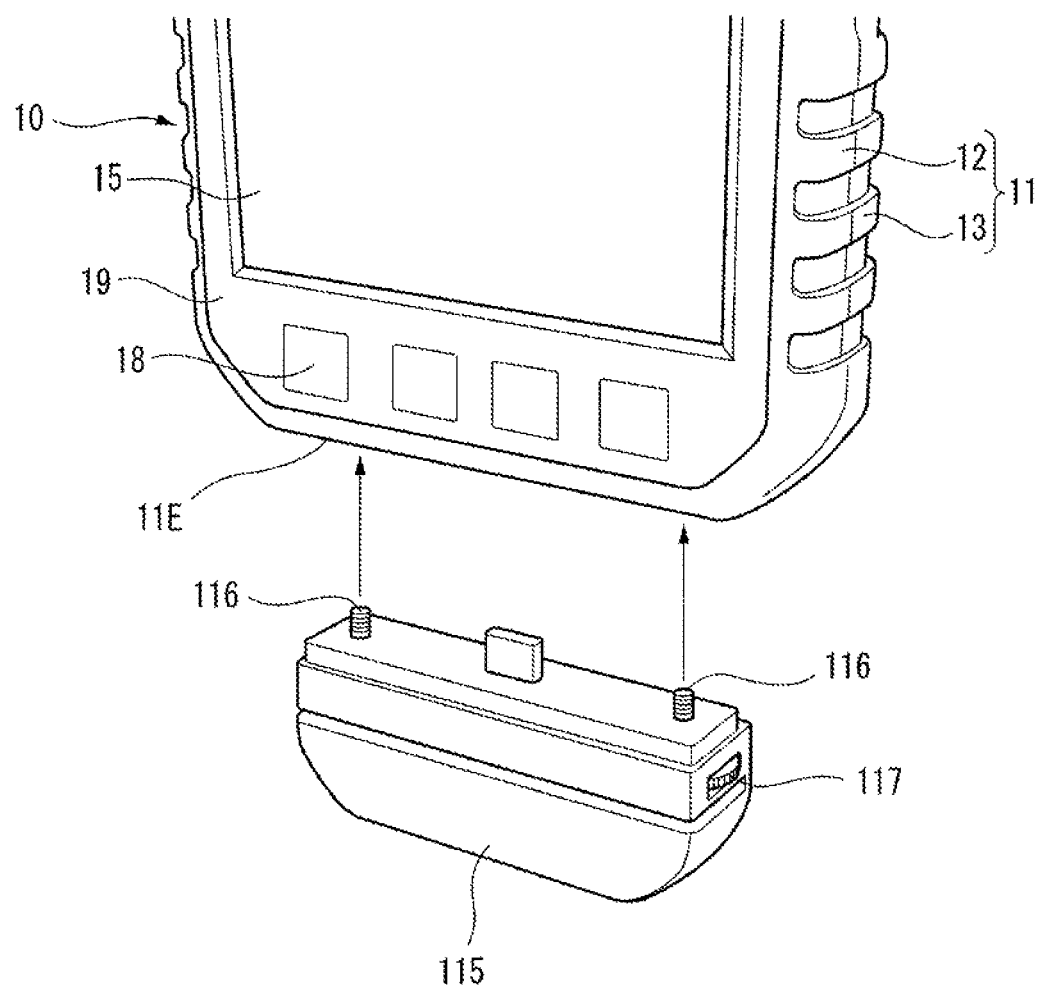
FIG. 22 is a perspective view illustrating a state of attaching a lateral card reader to a bottom part of the portable terminal of the first embodiment.
Figure 23:
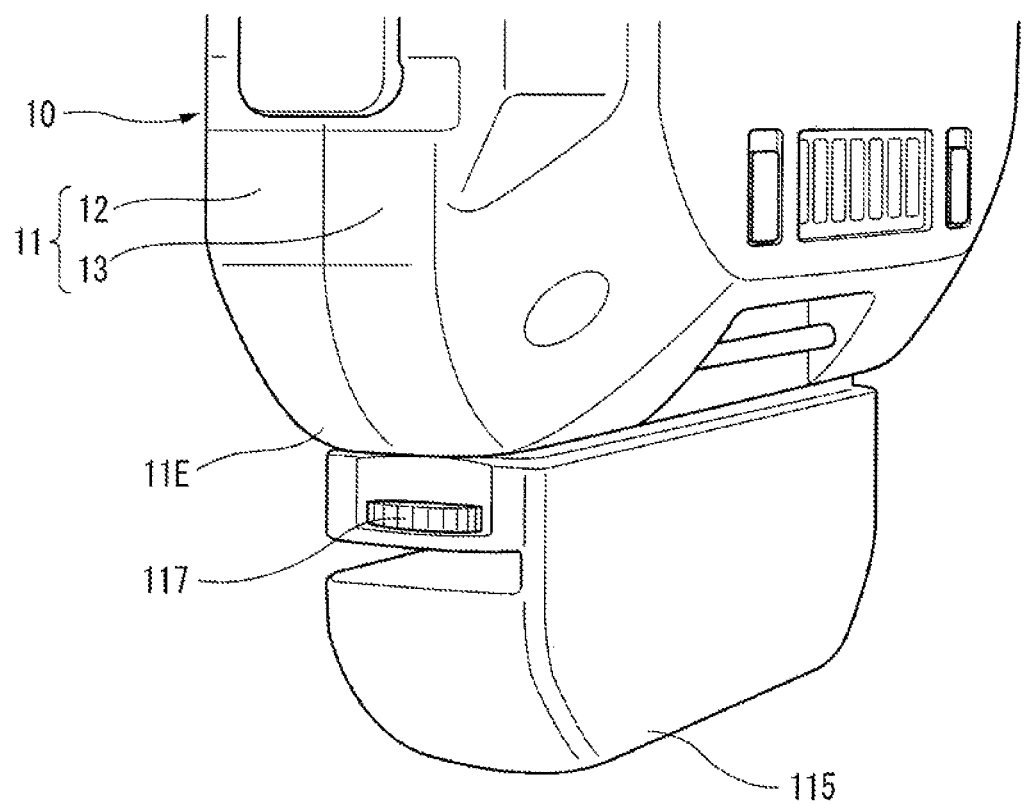
FIG. 23 is a perspective view illustrating a state viewed from obliquely backward, in which the lateral card reader is connected to the portable terminal of FIG. 22;.
Figure 24:
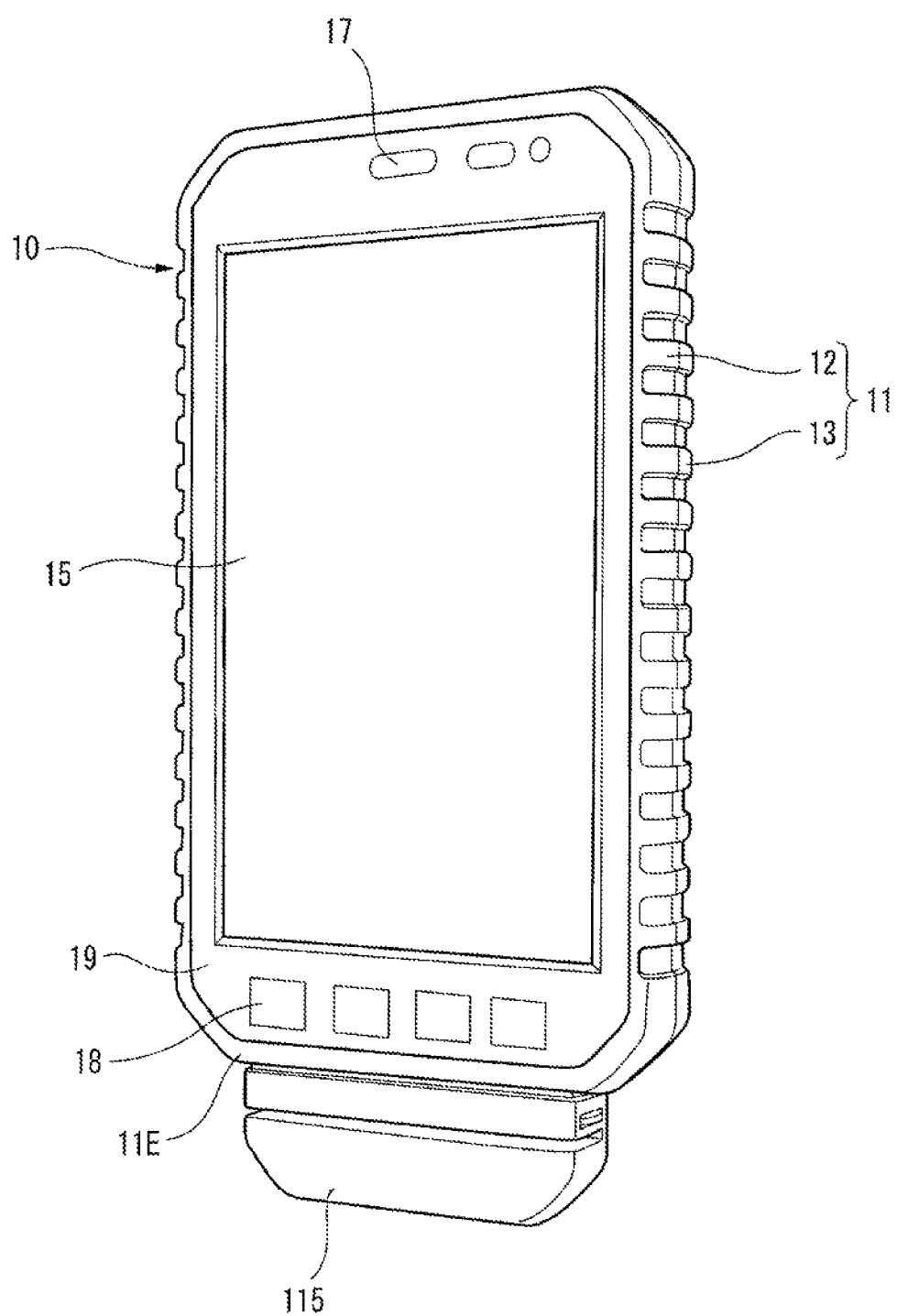
FIG. 24 is a perspective view illustrating a state viewed horn obliquely forward, in which the lateral card reader is attached to the portable terminal of FIG. 23.
Figure 25:
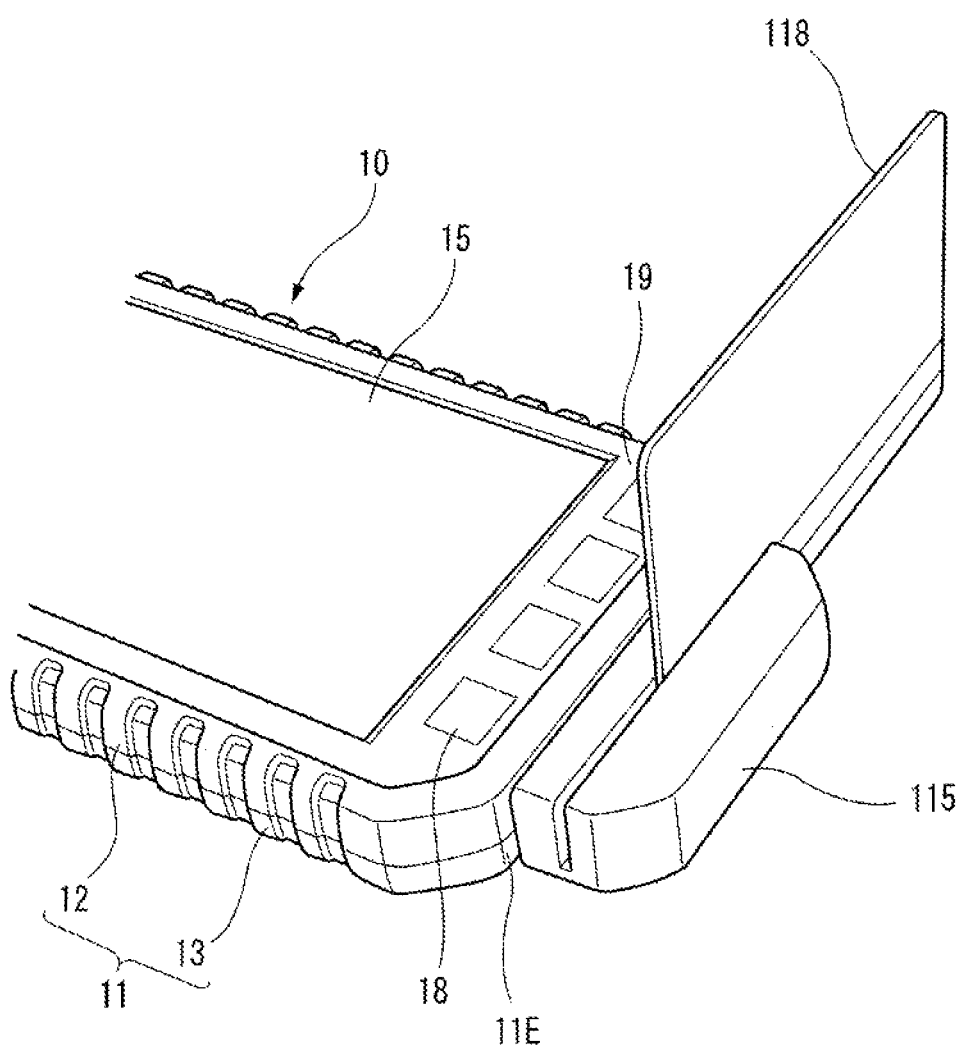
FIG. 25 is a perspective view illustrating a state of reading, by the lateral card reader of FIG. 23, information recorded on a card;.

As illustrated in FIG. 22, the lateral card leader 115 is attached to the bottom part 11E of the casing 11 with bolts 116. Each bolt 116 is provided with a bath 117. As illustrated in FIGS. 23 and 24, each bolt 116 is screwed into a screw hole 36 (see FIG. 2) of the bottom part 11E by operating the knob 117. Thus, a card reader 115 is attached to the bottom part 11E. As illustrated in FIG. 25, information recorded on a card 118 can be read by the card reader 115.

Figure 26:
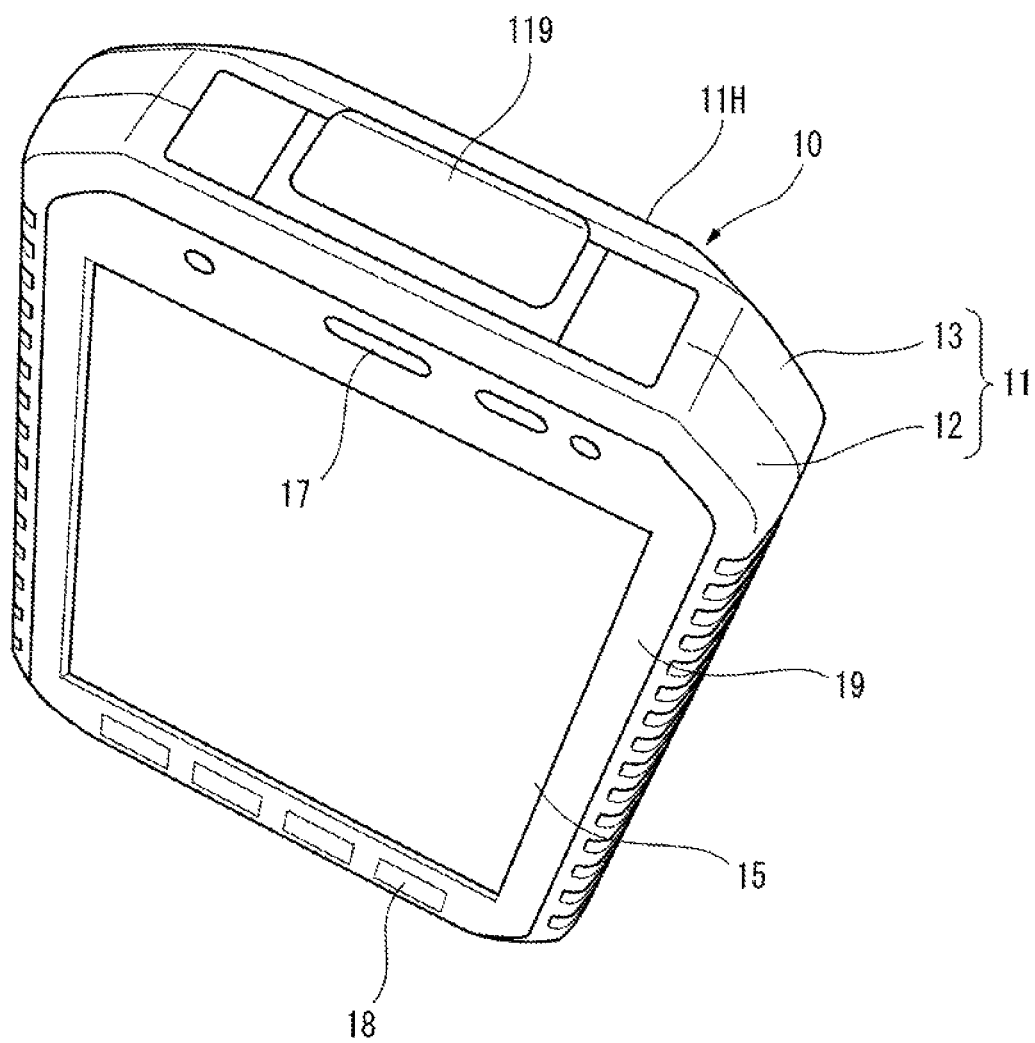
FIG. 26 is a perspective view illustrating a barcoded lid of a top part of the casing of the first embodiment.
Figure 27:
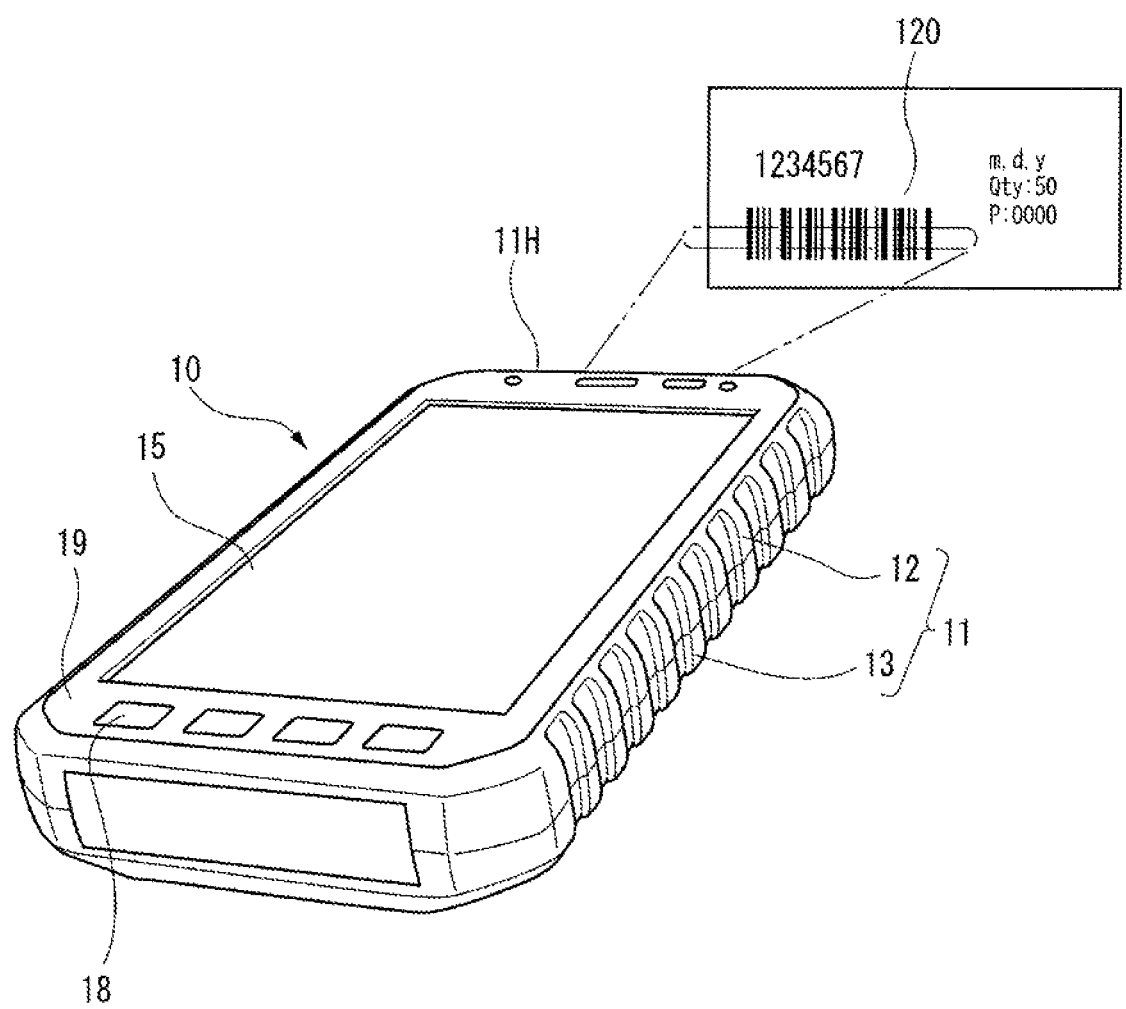
FIG. 27 is a perspective view illustrating a state of removing the barcoded lid of FIG. 26 and reading a barcode.

As illustrated in FIGS. 26 and 27, a barcoded lid 119 for a barcode reader is provided detachably on a top part 11H of the casing 11A barcode 120 can be read by removing the barcoded lid 119 from the top part 11H of the casing 11.

Figure 28:
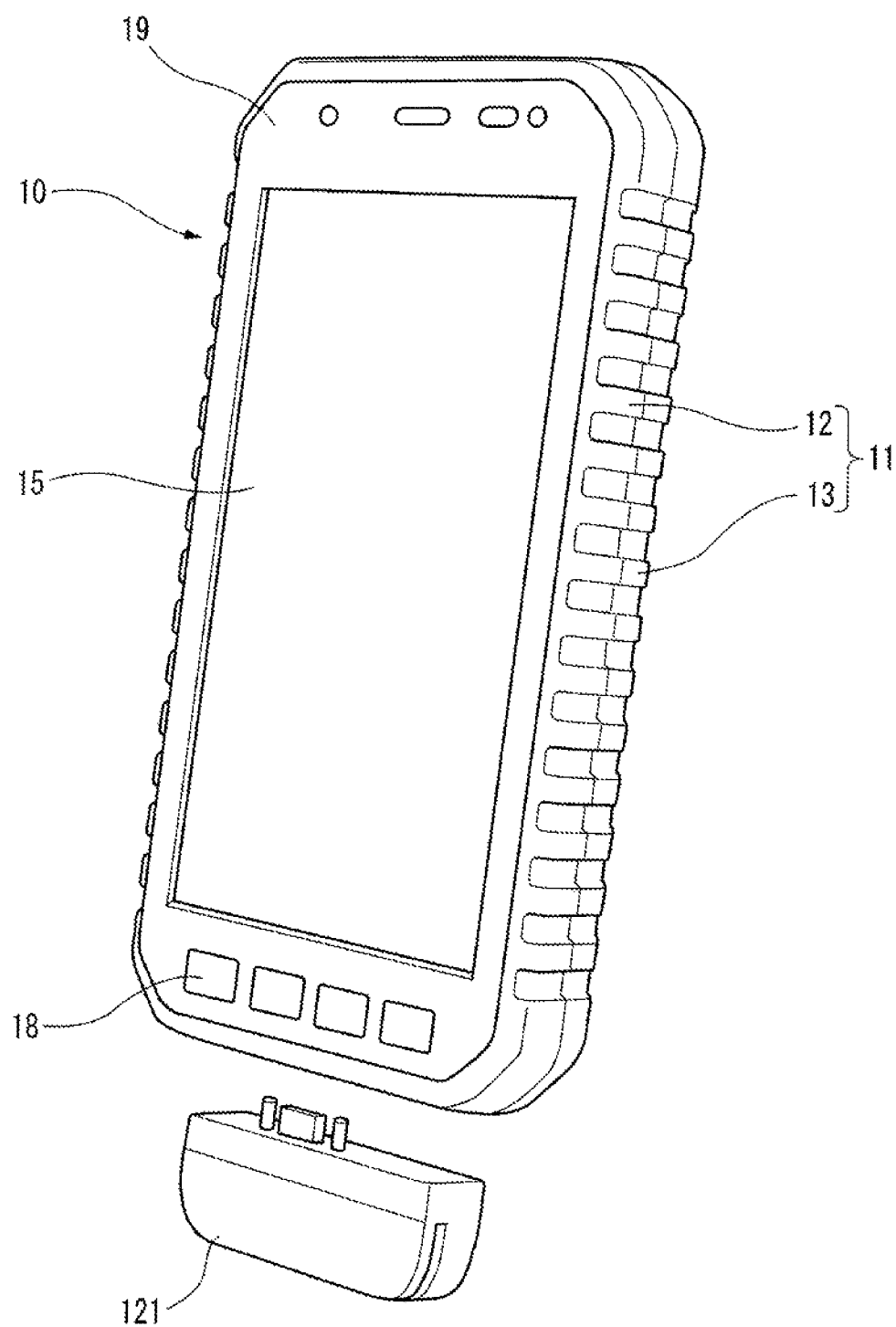
FIG. 28 is a perspective view illustrating a state of attaching a vertical card reader to the bottom part of the portable terminal of the first embodiment.
Figure 29:
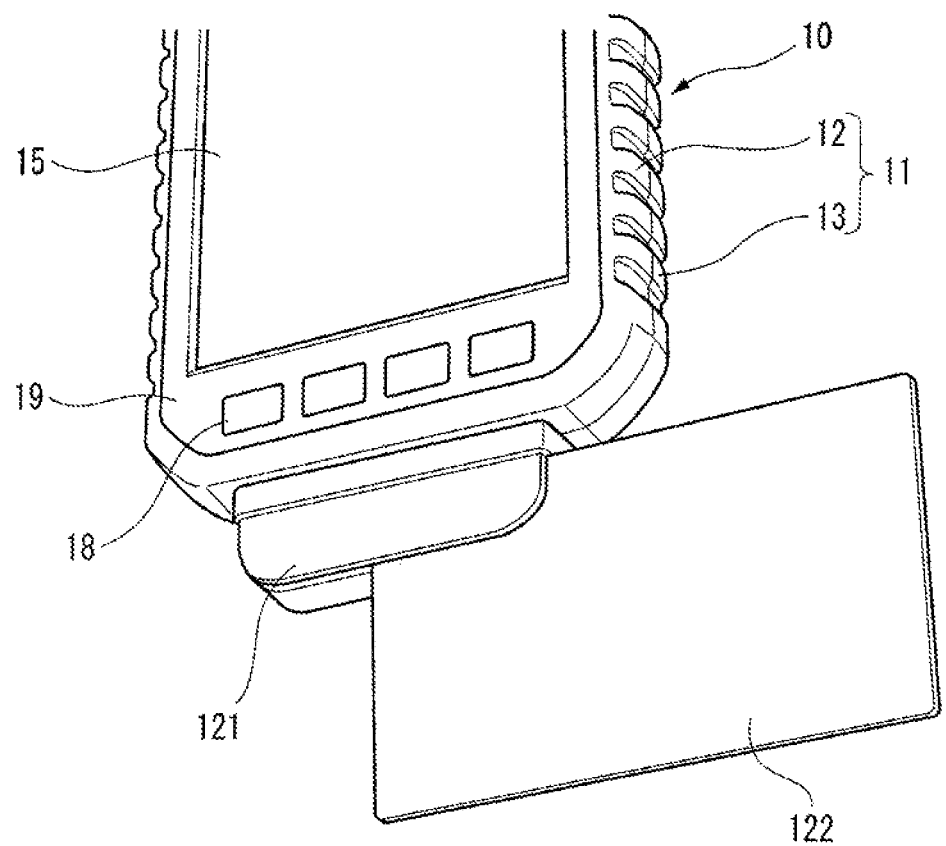
FIG. 29 is a perspective view illustrating a state of reading information recorded on a card by the vertical card reader of FIG. 28.

As illustrated in FIGS. 28 and 29, a longitudinal card reader 121 is attached to the bottom part 11E of the casing 11. Information recorded on a card 122 can be read by the card reader 121 attached to the bottom part 11E.

Figure 30:
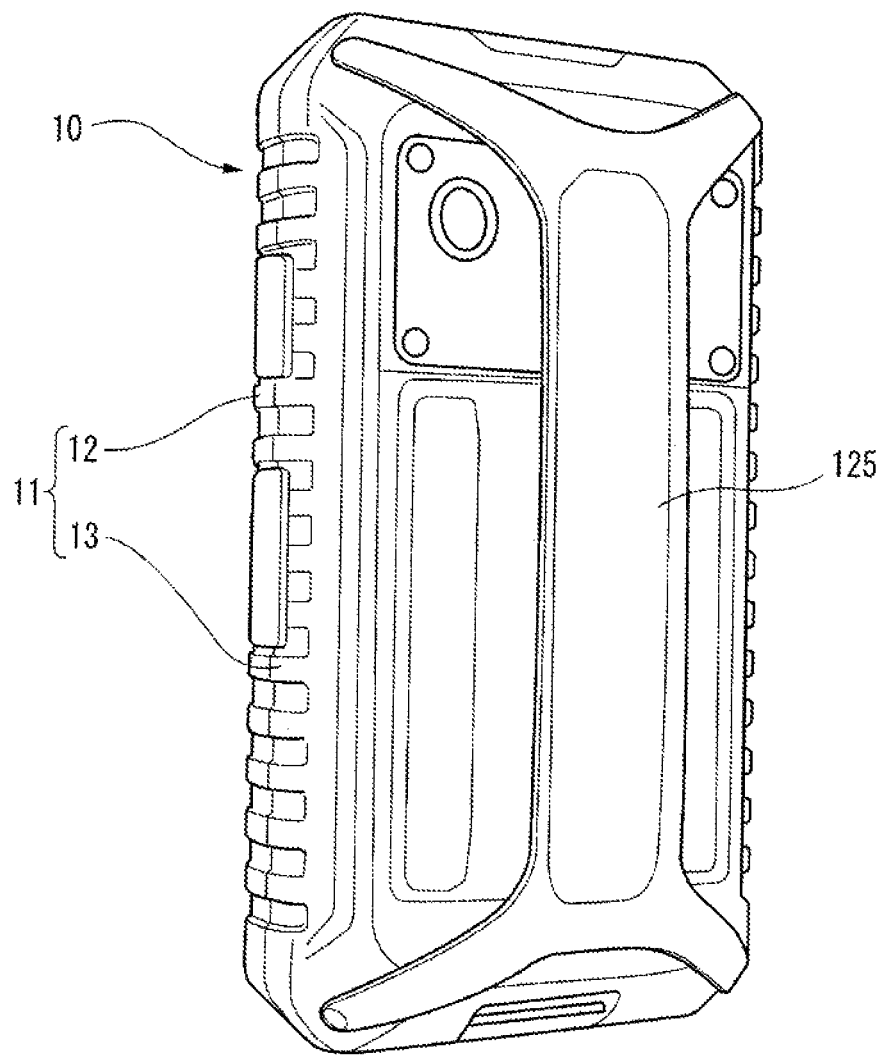
FIG. 30 is a perspective view illustrating a state in which a holder is attached to the casing of the first embodiment.
Figure 31A:
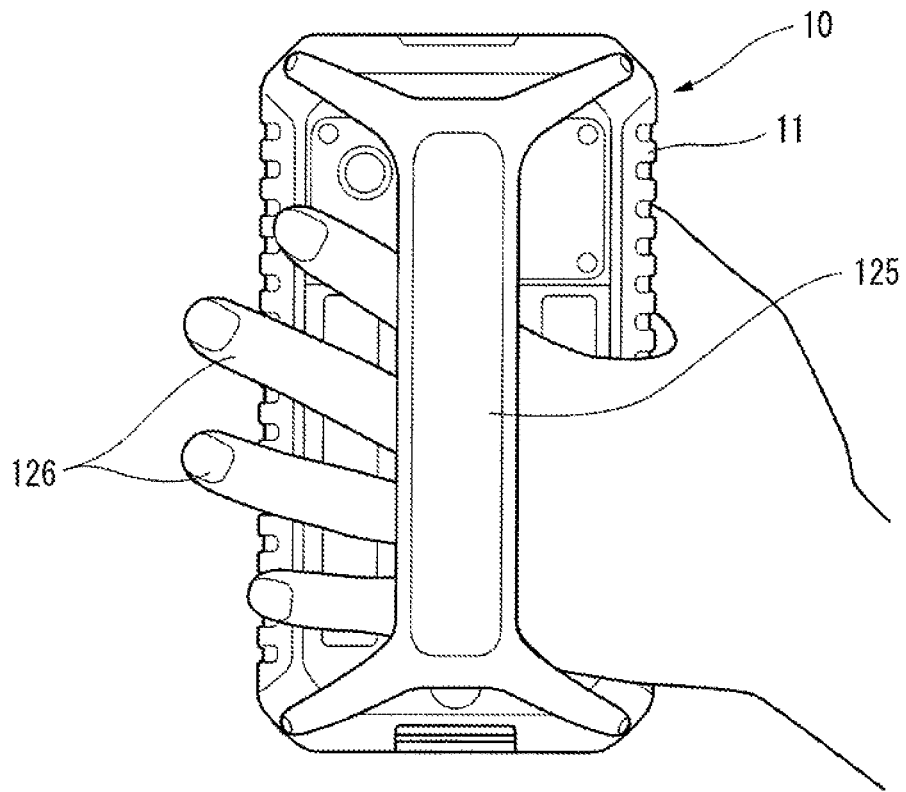
FIG. 31A is a plan view illustrating a state in which fingers are hooked sideways on the holder of FIG. 30.
Figure 31B:
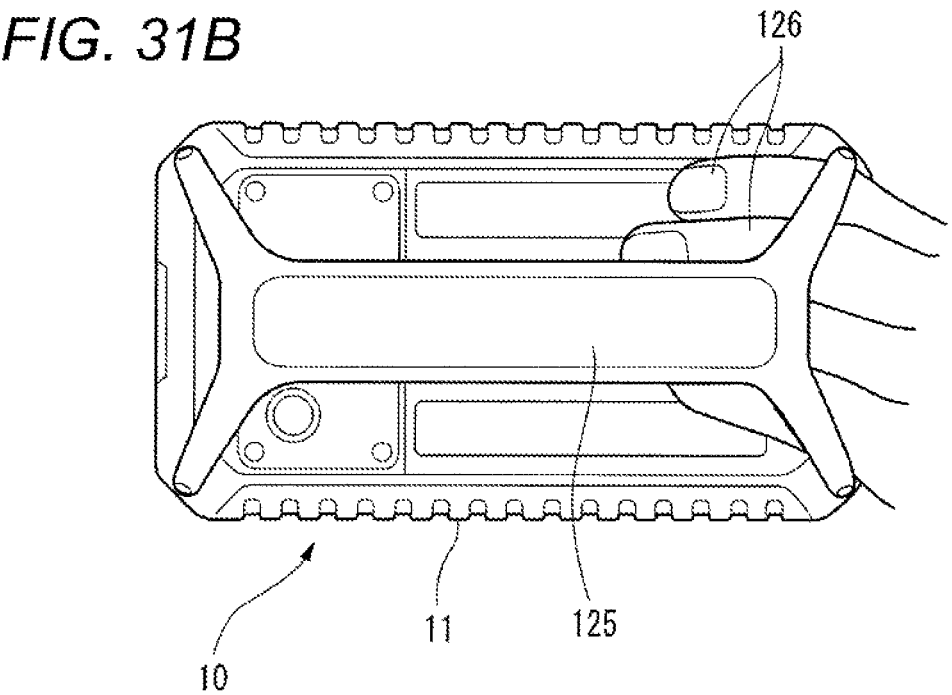
FIG. 31B is a plan view illustrating a state in which fingers are hooked longitudinally on the holder of FIG. 30.

As illustrated in FIGS. 30, 31A and 31B, a holder 125 is attached to the rear case 13 of the casing 11. The portable terminal 10 can appropriately be held by inserting a finger 126 into the holder 125. Thus, a user can stably hold the portable terminal 10 by hand.

Figure 32:
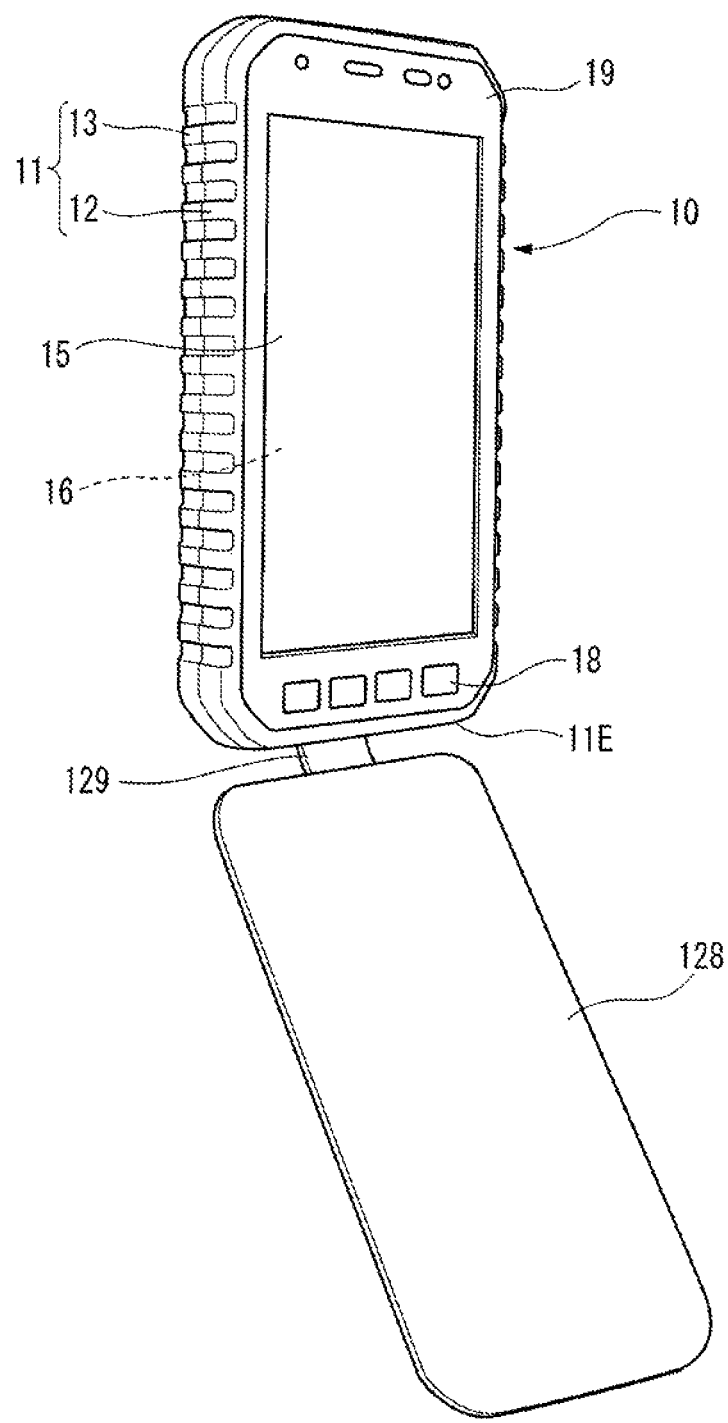
FIG. 32 is a plan view illustrating a state in which a liquid crystal display (LCD) cover is attached to a bottom part of the casing of the first embodiment.
Figure 33:
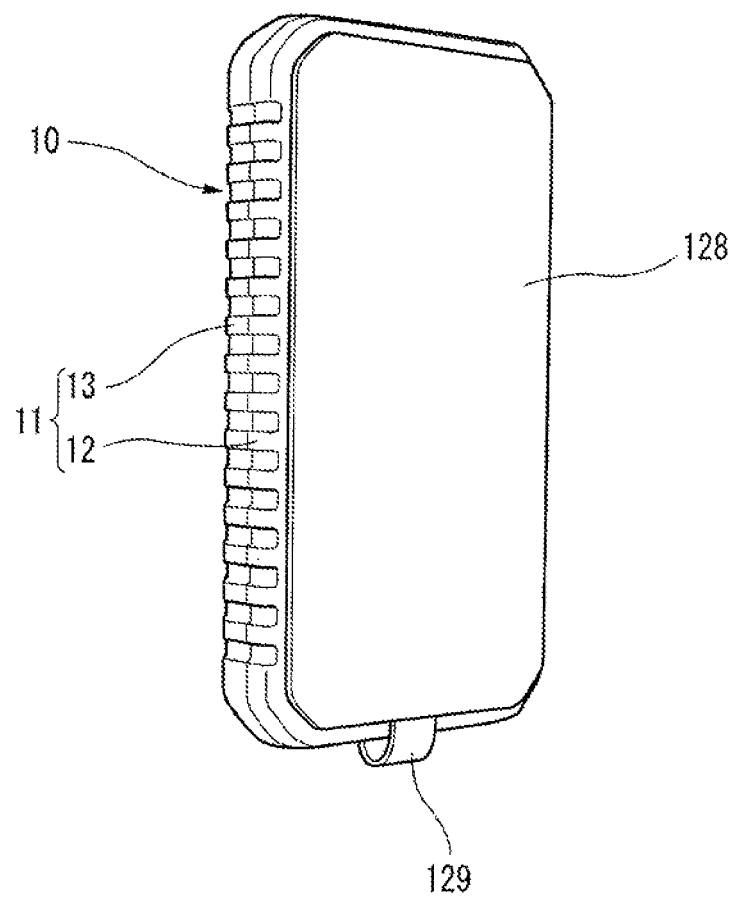
FIG. 33 is a plan view illustrating a state in which a display device is covered with the LCD cover of FIG. 32.

As illustrated in FIGS. 32 and 33, an LCD cover 128 is attached to the bottom part 11E of the casing 11 via a flexible hinge 129. The display device 16 can be covered with the LCD cover 128.

Figure 34:
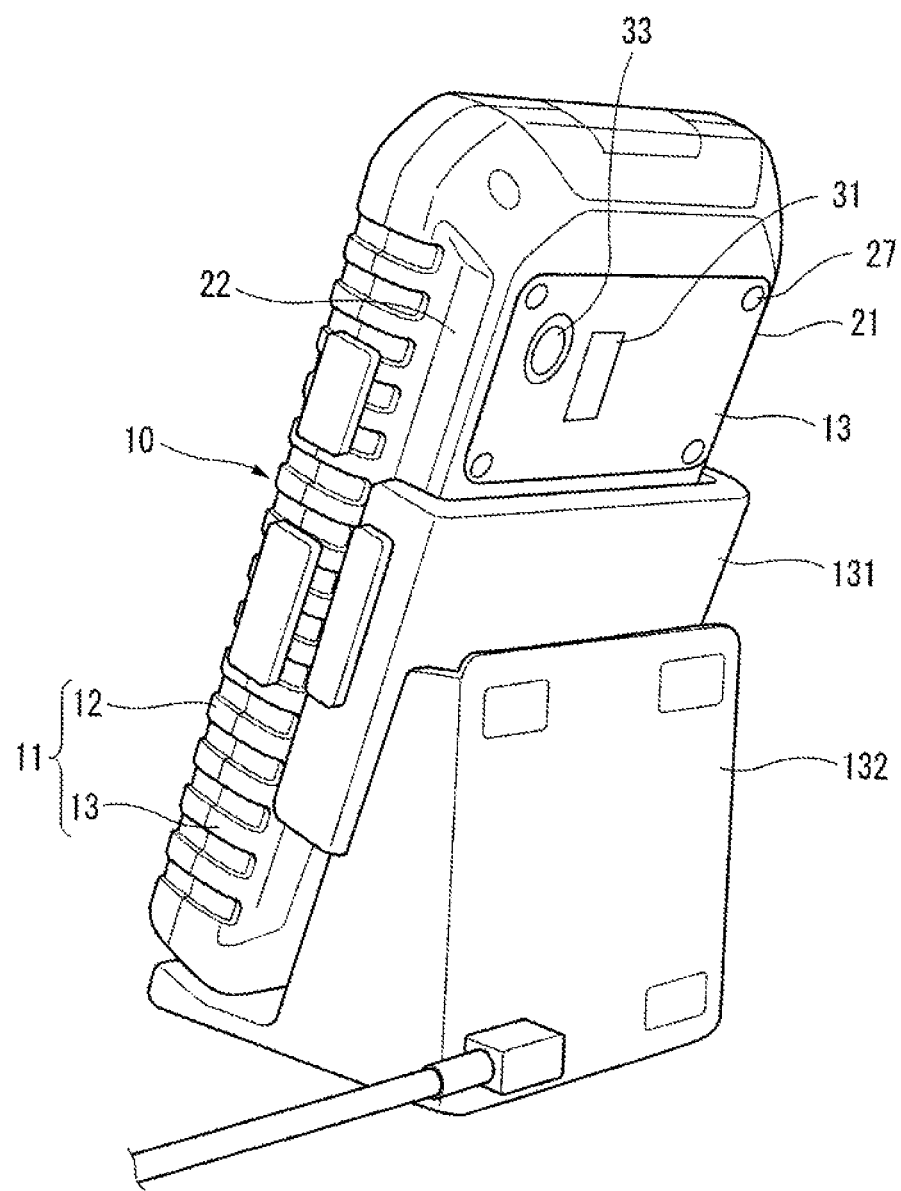
FIG. 34 is an obliquely rear perspective view illustrating a state in which the portable terminal of the first embodiment is put on a charging stand.
Figure 35:
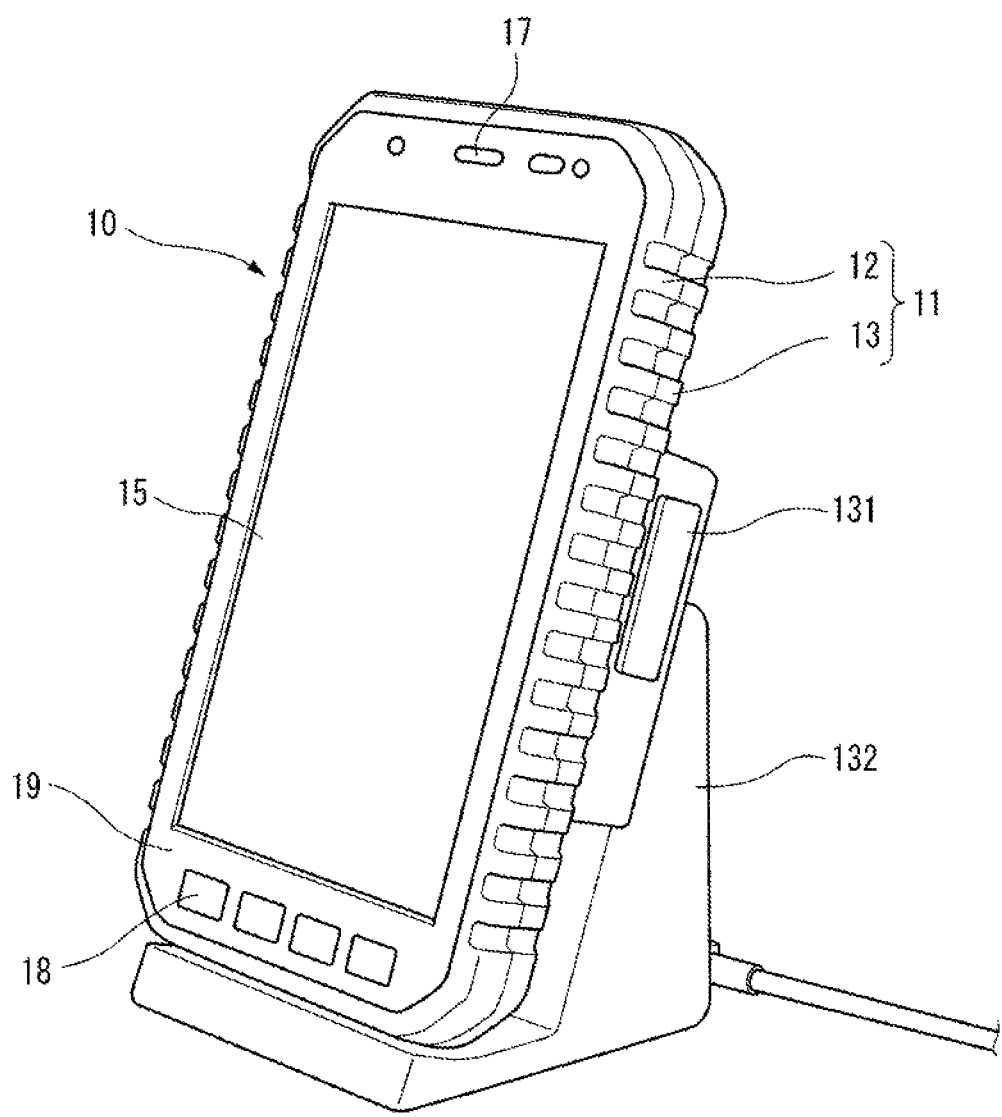
FIG. 35 is a frontward perspective view illustrating a state in which the portable terminal is put on the charging stand of FIG. 34.

As illustrated in FIGS. 34 and 35, a belt holder 131 is attached to the casing 11, utilizing a left-side recess 21 and a right-side recess 22 of the casing 11 for the rear case 13). In a state in which the belt holder 131 is attached to the casing 11, the portable terminal 10 can be placed on a charging stand 132.

Figure 36:
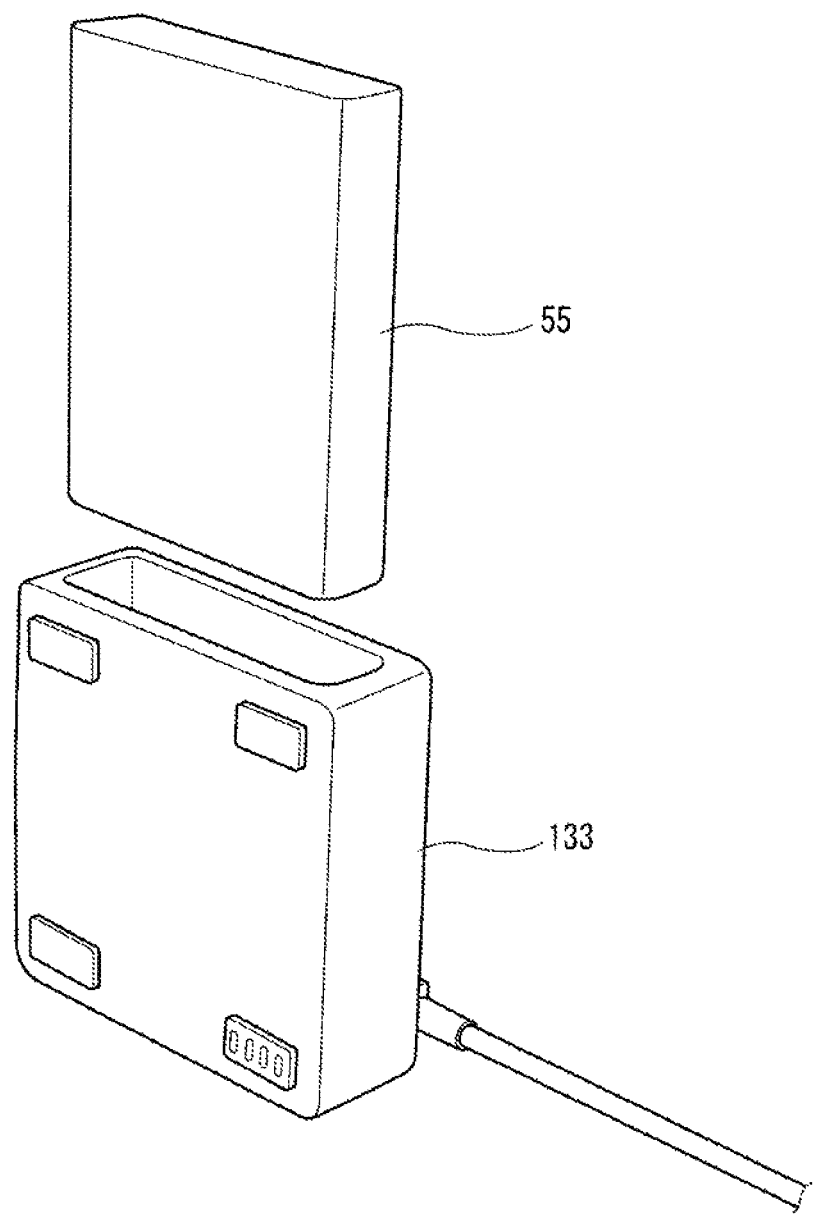
FIG. 36 is a perspective view illustrating a state of charging a battery pack of the first embodiment by a charger.
Figure 37A:
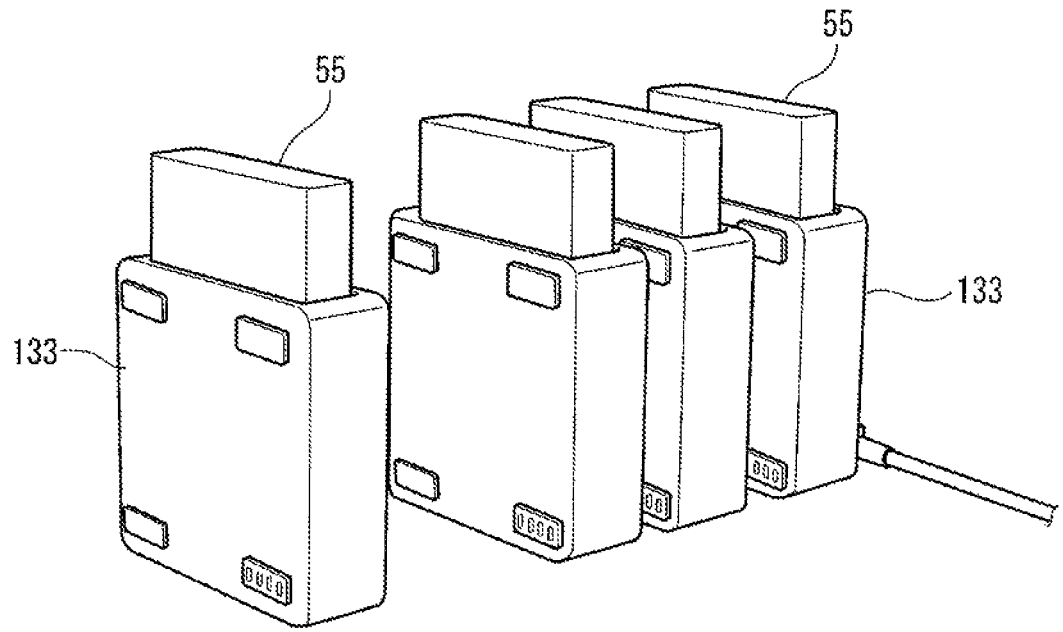
FIG. 37A is a perspective view illustrating a state of continuously connecting the chargers each of FIG. 36.
Figure 37B:
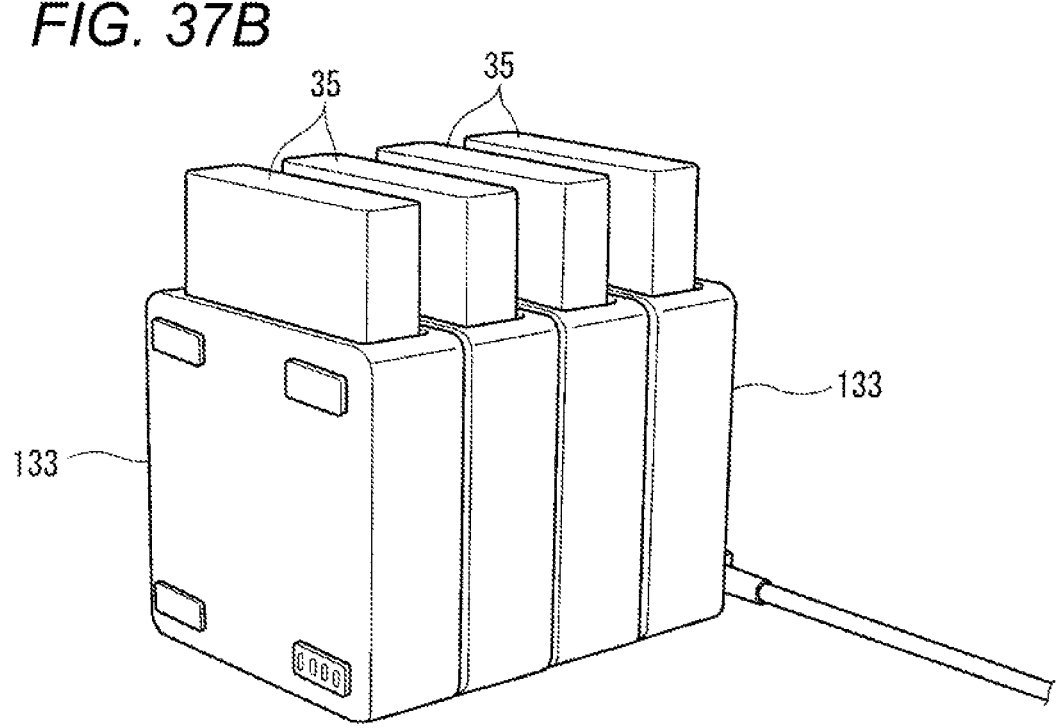
FIG. 37B is a perspective view illustrating a state in which the chargers each of FIG. 36 are continuously connected.
Figure 38A:
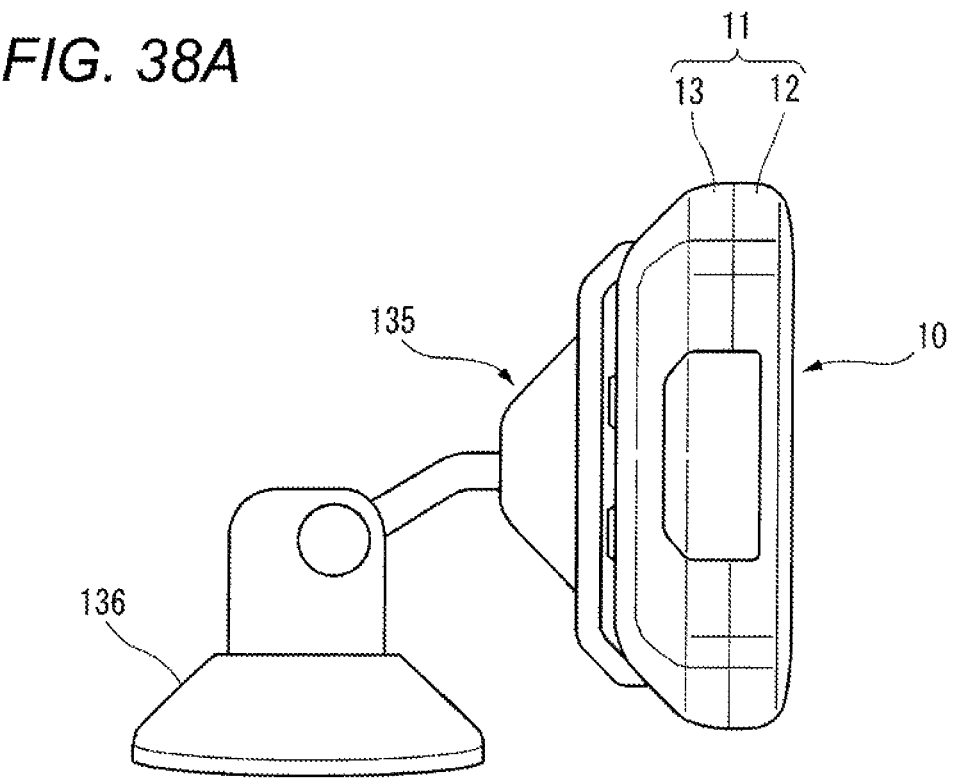
FIG. 38A is a side view illustrating a state in which an in-car holder is attached to the portable terminal of the first embodiment.
Figure 38B:
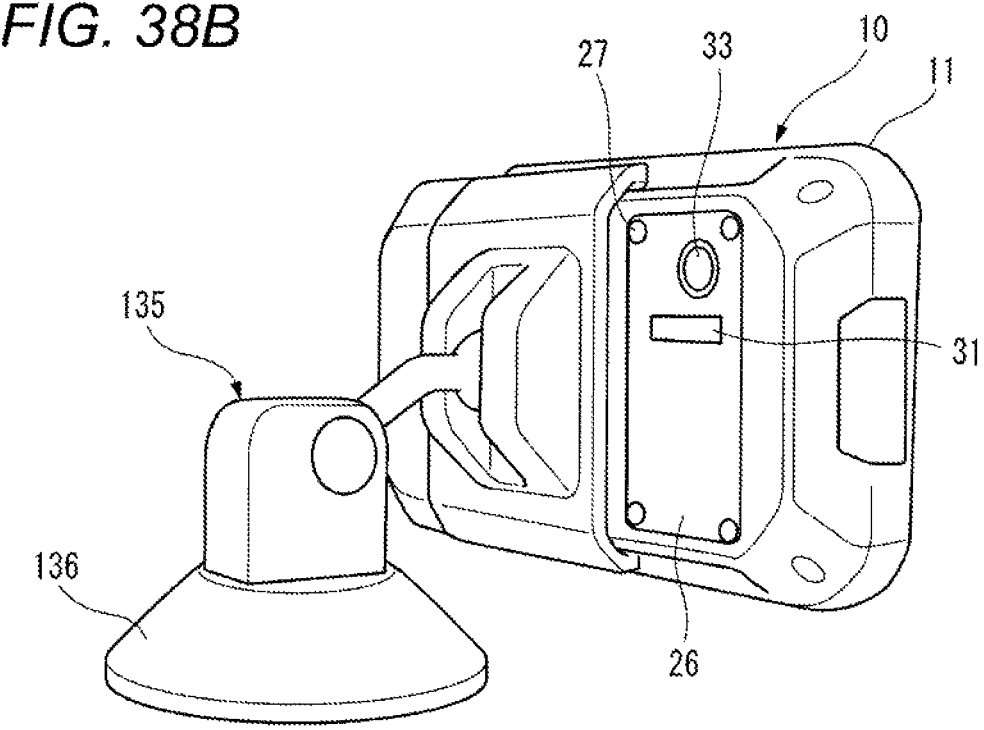
FIG. 38B is a rear perspective view illustrating a state in which the in-car holder is attached to the portable terminal of FIG. 38A.
Figure 39A:
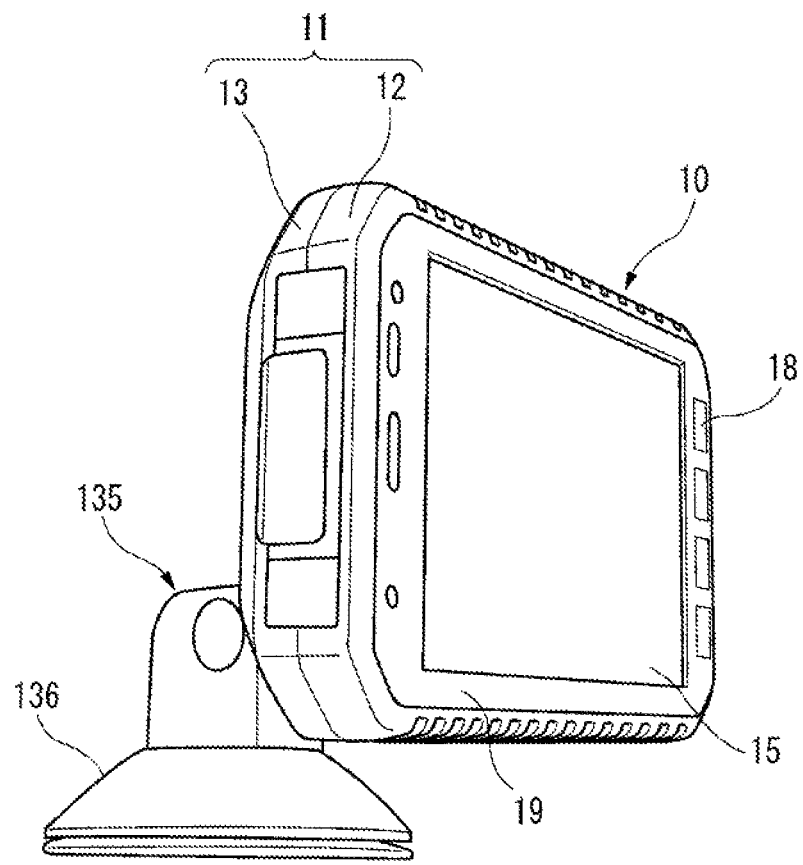
FIG. 39A is a forward side view illustrating a state in which an in-car holder is attached to the portable terminal of the first embodiment.
Figure 39B:
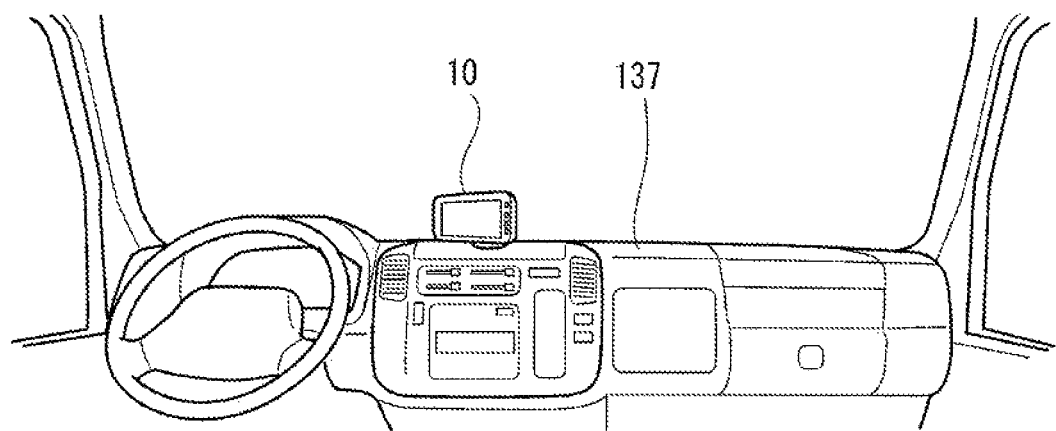
FIG. 39B is a plan view illustrating a state in which the in-car holder of FIG. 39A is attached to a vehicle.

As illustrated in FIGS. 36. 37A and 37B, plural chargers 133 each for charging the battery pack 55 can continuously be connected.

As illustrated in FIGS. 38A, 38B, 39A and 39B, an in-car holder 135 can be attached to the rear case 13 of the portable terminal 10. A suction portion 136 of the in-car holder 135 is attached to an instrument panel 137 of a vehicle. Thus, the portable terminal 10 can be attached in front of a driver.

Figure 40:
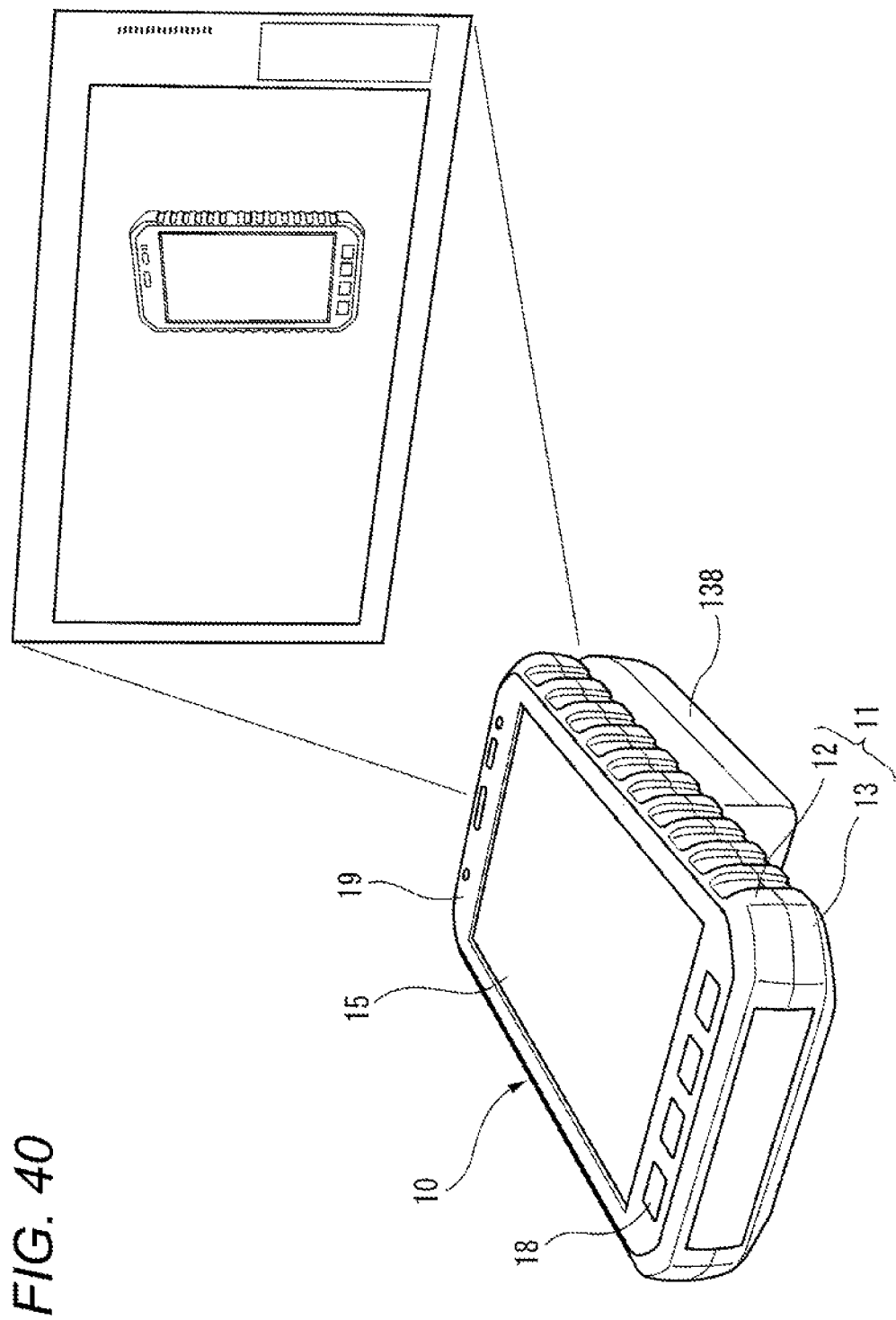
FIG. 40 is a state in which a longitudinal projector is attached to the portable terminal of the first embodiment.
Figure 41:
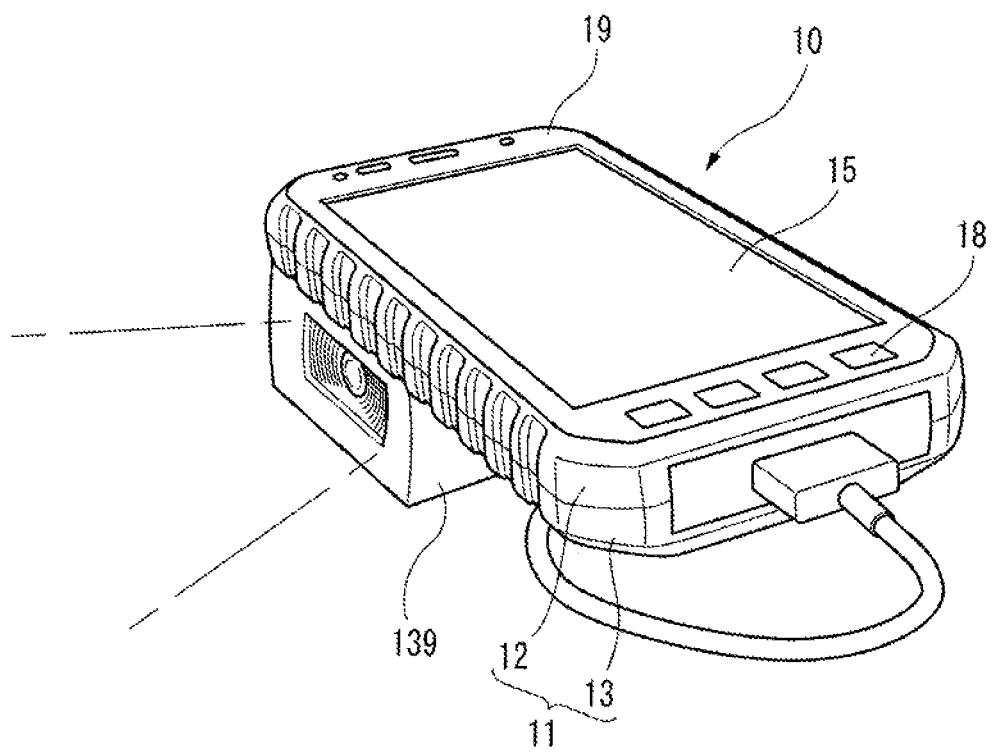
FIG. 41 is a state in which a lateral projector is attached to the portable terminal of the first embodiment.

As illustrated in FIGS. 40 and 41, a longitudinal projector 138 or a lateral projector 139 can be attached to the casing 11 by removing the gadget's lid 26 (see FIG. 15) from the casing 11 (rear case 13).

Figure 42:
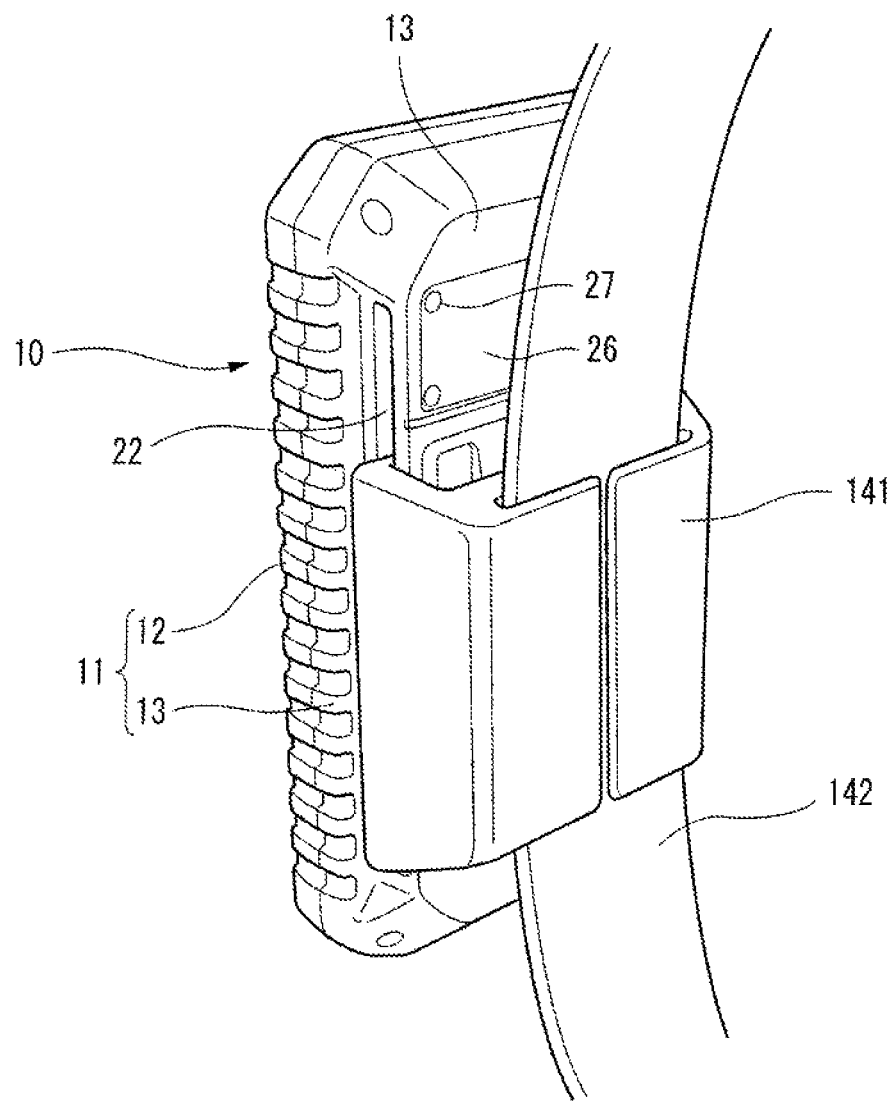
FIG. 42 is a state in which a belt is attached to a belt holder of the terminal of the first embodiment.
Figure 43A:
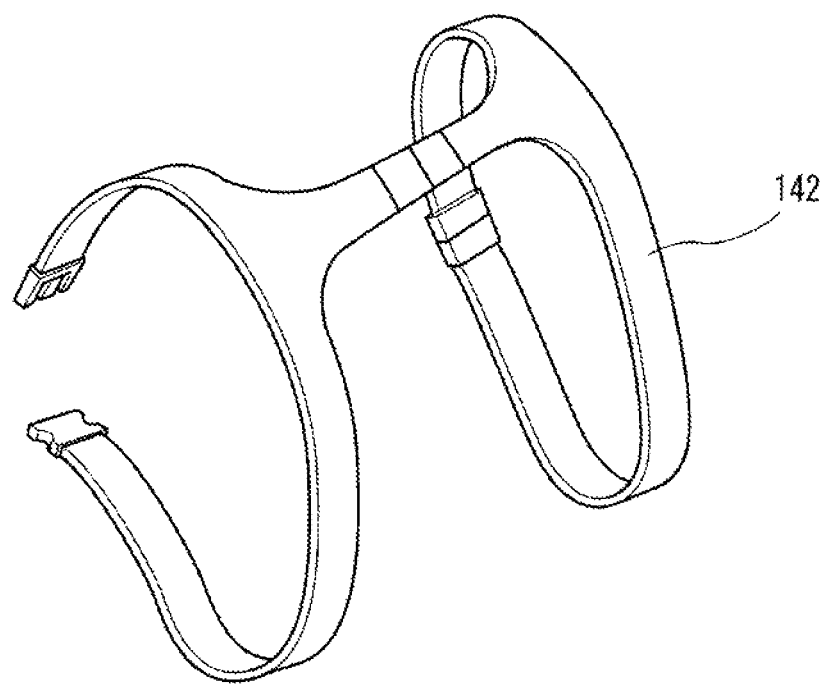
FIG. 43A is a perspective view illustrating a state in which the belt of FIG. 42 is modified as a shoulder holster.
Figure 43B:
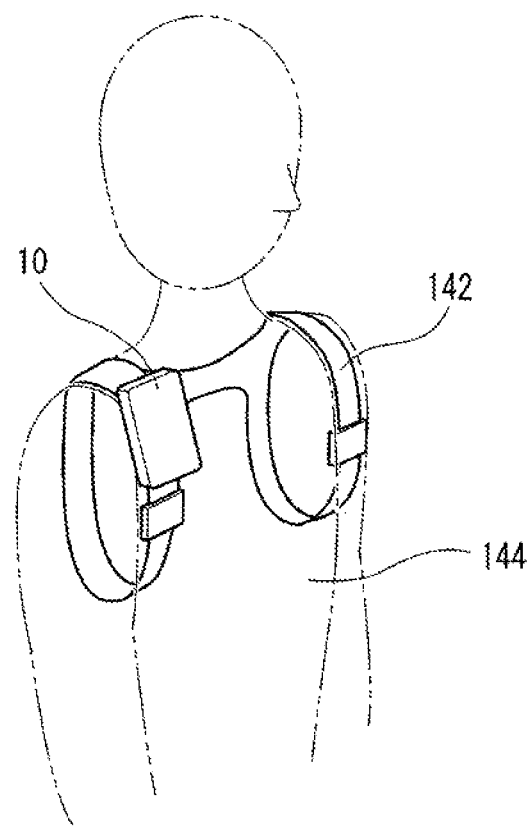
FIG. 43B is a perspective view illustrating a state in which the belt of FIG. 43A is mounted on both shoulders of a user.
Figure 44:
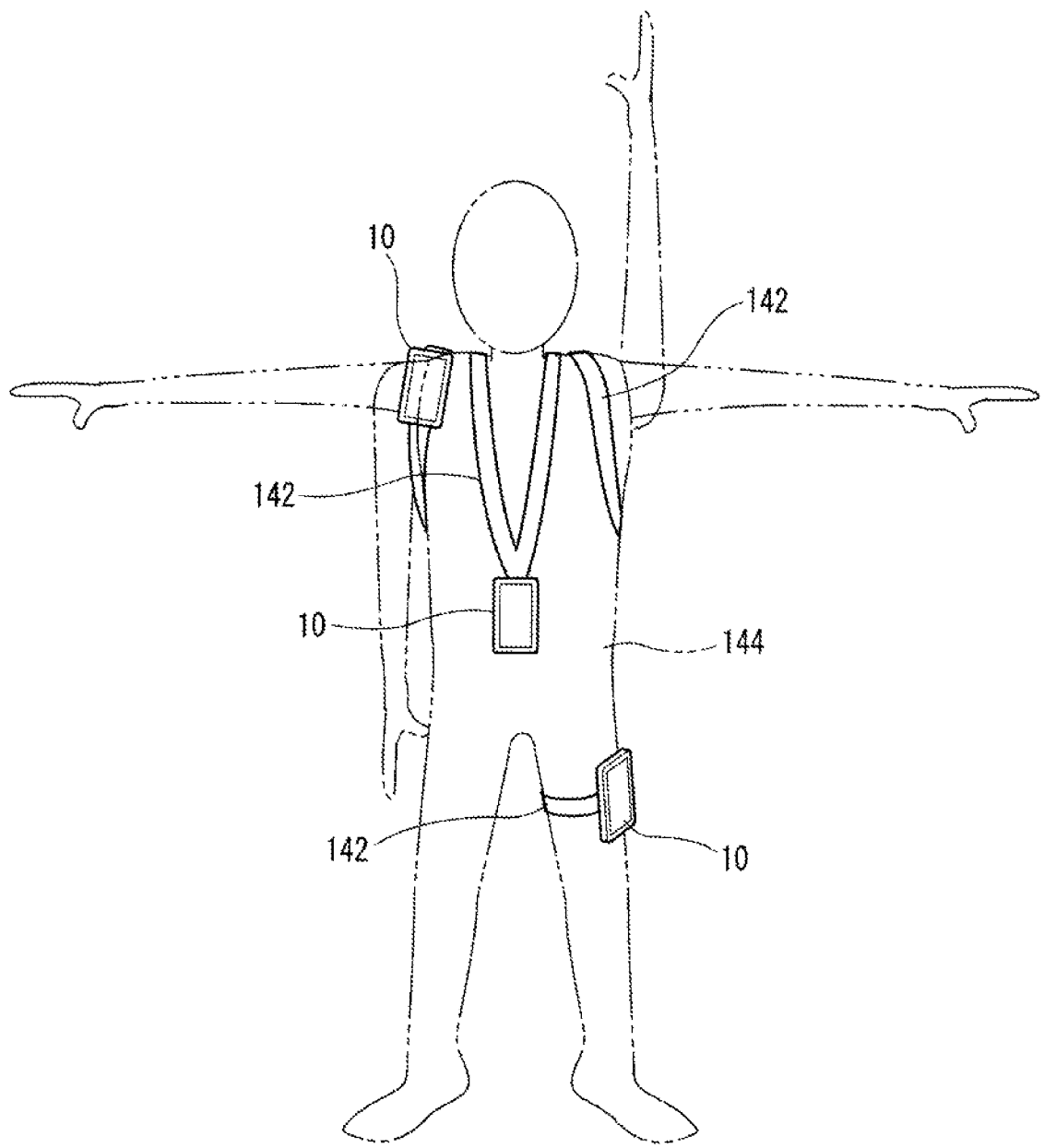
FIG. 44 is a front view illustrating a state in which the belt of FIG. 41 is modified as a neck strap and a leg holster in addition to the shoulder holster.
Figure 45:
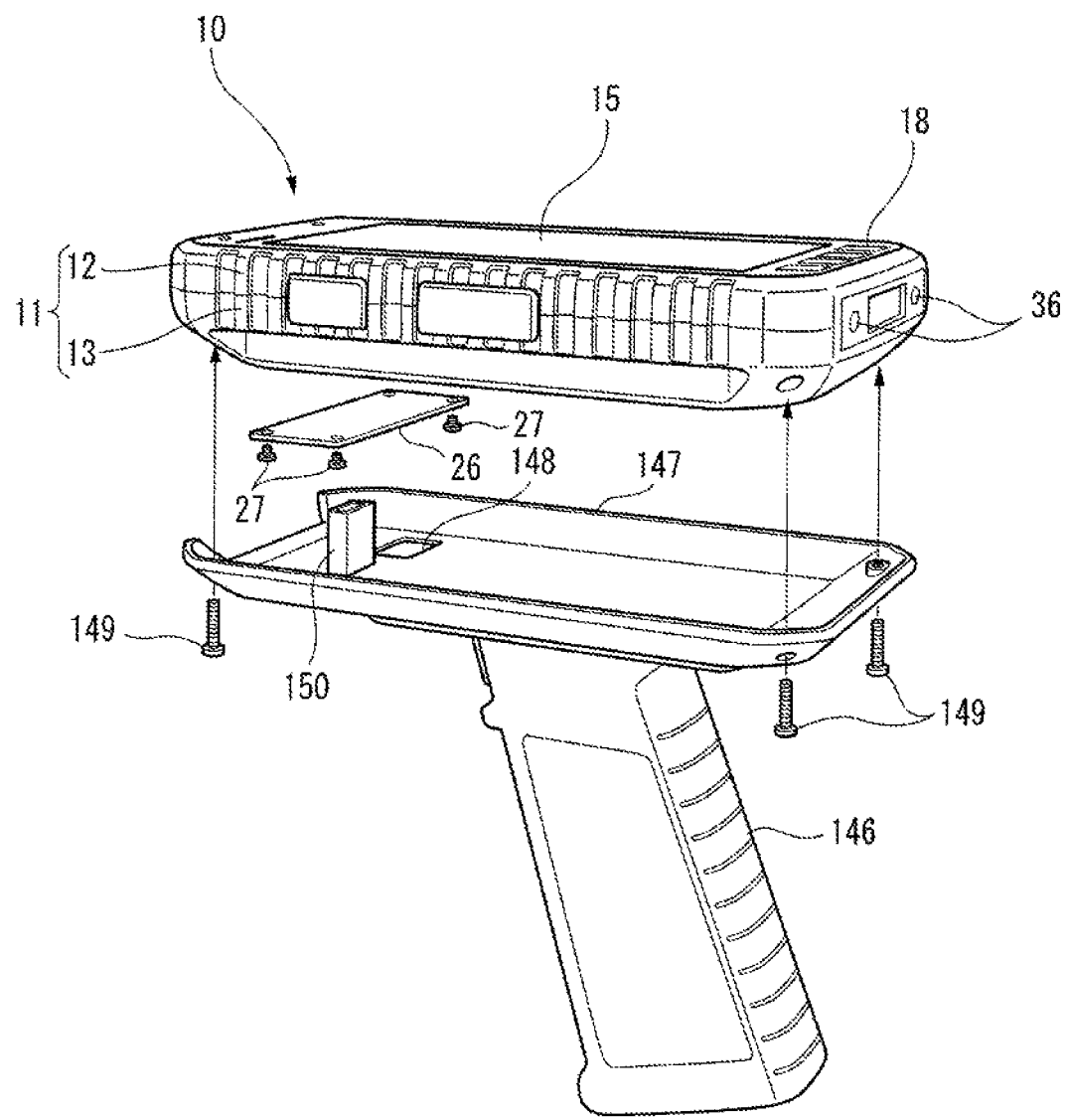
FIG. 45 is a perspective view illustrating a handgrip to be attached to the portable terminal of the first embodiment.

As illustrated in FIG. 42, a belt holder 141 is attached to the casing 11, utilizing the left-side recess 21 (see FIG. 3) of the casing 11 (rear case 13) and the right-side recess 22. Then, a belt 142 is attached to the belt holder 141. As illustrated in FIGS. 43A and 43B, the belt 142 is mounted on both shoulders of a user 144 as a shoulder holster. Thus, the portable terminal 10 can be attached to the neighborhood of the user's left shoulder. Accordingly, the user 111 can talk over the portable terminal 10 without holding the portable terminal 10 by hand. As illustrated in FIG. 44, the user can wear the belt 142 as a neck strap, other than the shoulder holster, or can attach the belt 142 to his leg as a leg holster.

As illustrated in FIGS. 45, 46A, 46B, 46C, and 46D, a butt 147 of a handgrip 146 can be attached to the rear case 13 with plural fixing screws 149 by removing the gadget's lid 26 from the casing 11 (rear case 13). The USB connector (electrical signal connector) 111 (see FIG. 16) is exposed by removing the gadget's lid 26 from the rear case 13. A grip terminal 150 of the handgrip 146 is connected to the exposed USB connector 111. An opening 148 is opened in the butt 147.

As illustrated in FIG. 46D, the camera lens 31 and the camera light 33 can be exposed by forming the opening portion 148 in the butt 147.

For example, the barcode 120 illustrated in FIG. 27 can easily he read by gripping the handgrip 146.

Next, a second embodiment is described hereinafter with reference to FIGS. 47 to 51A, and 51B.

Incidentally, each of members of the second embodiment, which are the same or similar to those of the portable terminal 10 according to the first embodiment, are designated with reference numeral used to designate the associated member of the first embodiment. Thus, a description of such members is omitted.

(Second Embodiment)

Figure 47:
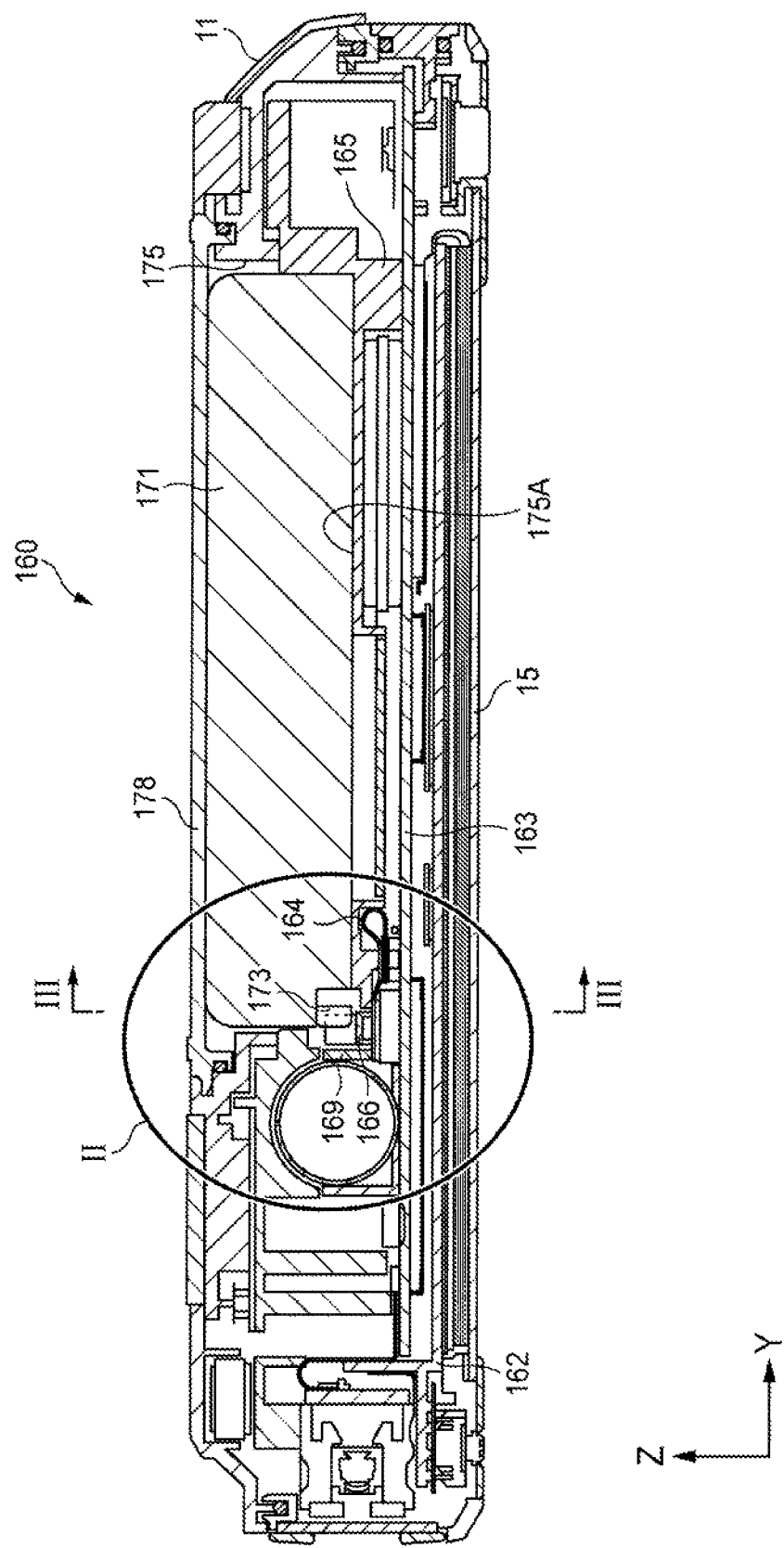
FIG. 47 is a perspective view illustrating a portable terminal of a second embodiment according to the invention.

As illustrated in FIG. 47, a portable terminal 160 according to the second embodiment includes a chassis 162 configured to be movable to the casing 11, a circuit board 163 supported by the chassis 162, and a board-side connecting portion 166 connected to the circuit board 163 via a wiring member 164.

The chassis 162 is housed in the casing 11 and supposed to be movable with respect to the casing 11. The circuit board 163 in a state of being supported by the chassis 162 is housed in the casing 11 and arranged to be movable with respect to the casing 11. Thus, if the circuit board 163 is moved by an impact, the circuit board 163 can be protected by the chassis 162 by supporting the circuit board 163 in the chassis 162.

Figure 48:
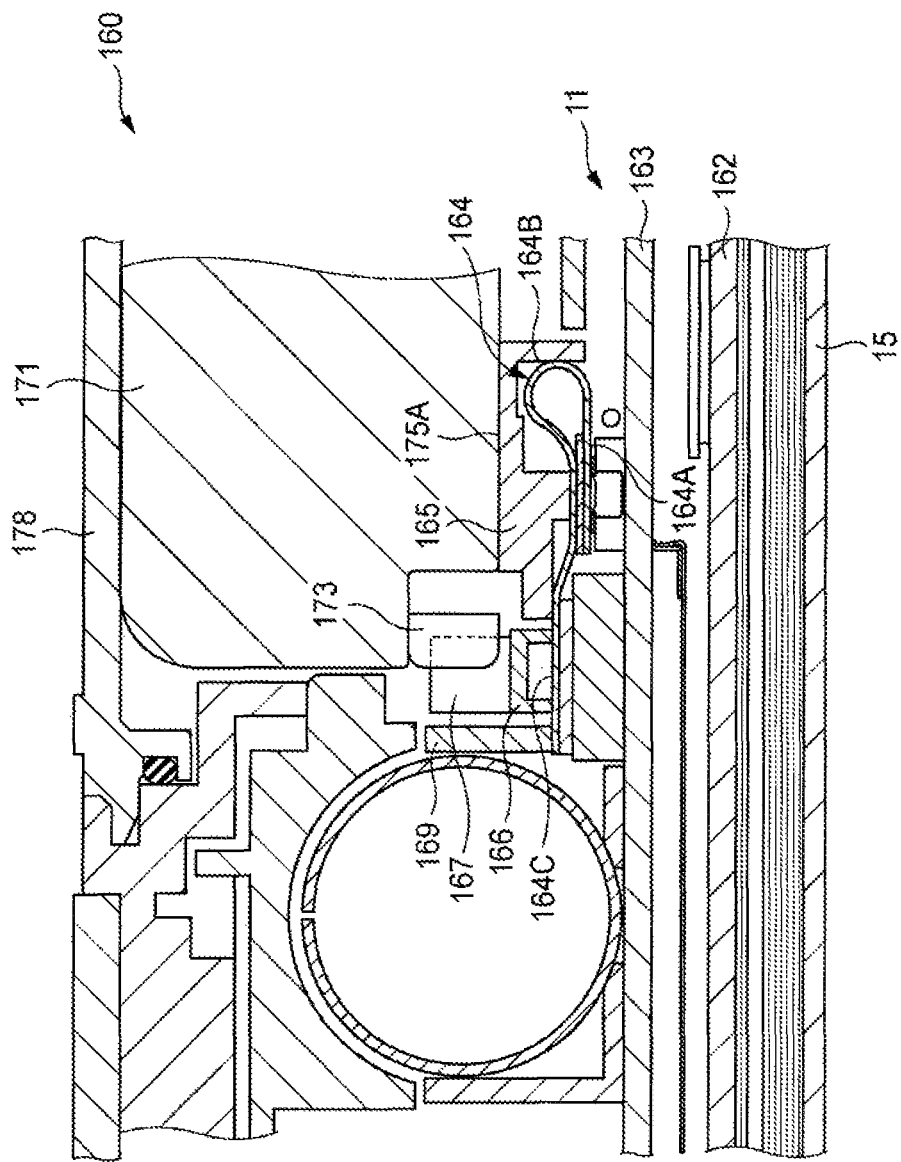
FIG. 48 is an enlarged view illustrating part II of FIG. 47.

As illustrated in FIG. 48, the board-side connecting portion 166 is connected to the circuit board 163 via the wiring member 164. A flexible (i.e., elastically deformable) printed board or a cable through which an electrical signal passes is used as the wiring member 164. The wiring member 164 is connected to the circuit board 163 at a base-end portion 164A. The wiring member 164 is folded upwardly at a central portion 164B. Thus, a leading end portion 164C of the wiring member 164 is arranged below the board-side connecting portion 166. The board-side connecting portion 166 is connected to a surface of the leading end portion 164C.

Figure 49:
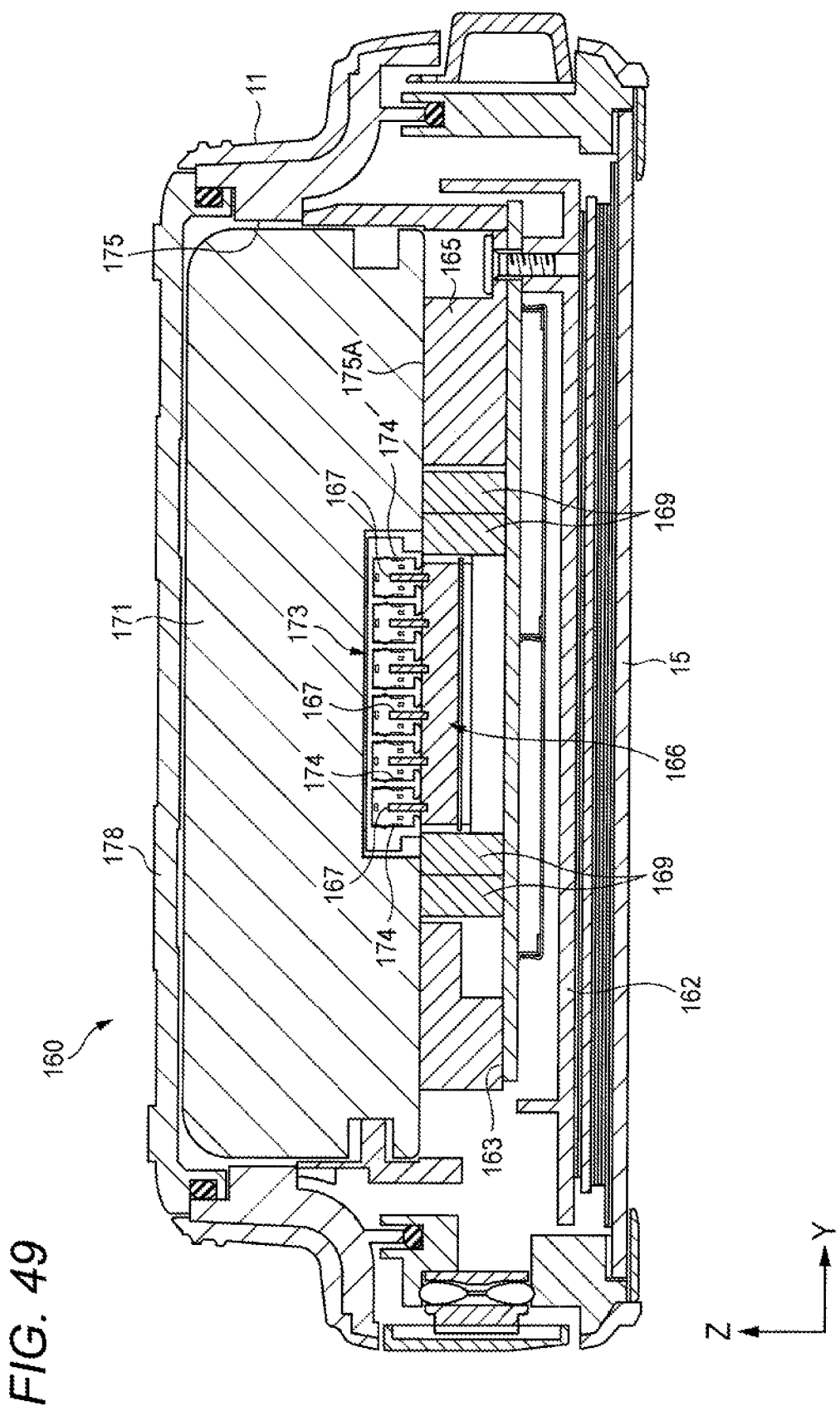
FIG. 49 is a cross-sectional view taken on line HI-III of FIG. 47.
Figure 50:
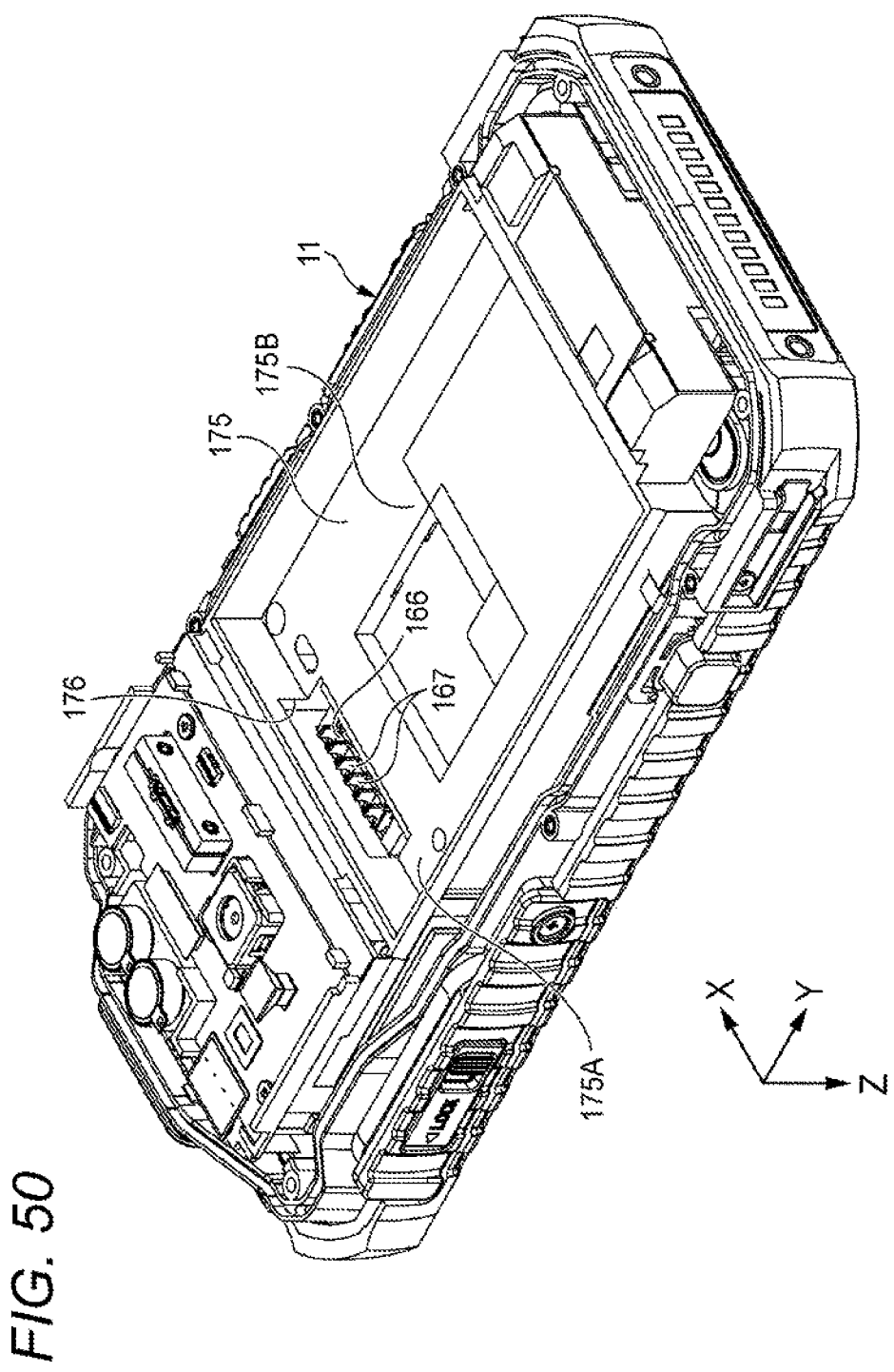
FIG. 50 is a perspective view illustrating a state in which a battery lid is removed from the portable terminal of the second embodiment according to the invention.

As illustrated in FIGS. 49 and 50, the board-side connecting portion 166 is what is called a sinking-comb-like connector which is held at the side of the chassis 162 and which includes plural electrically-conductive plate members 167. Plural electrically-conductive plate members 167 are arranged along the thickness direction. (X-axis direction) of the electrically-conductive plate member 167 at predetermined intervals. Buffer members 169 are provided around the board-side connecting portion 166. Thus the board-side connecting portion 166 is protected by the buffer members 169. A battery-side connecting portion 173 of a battery pack 171 is connected to the board-side connecting portion 166.

Figure 51A:
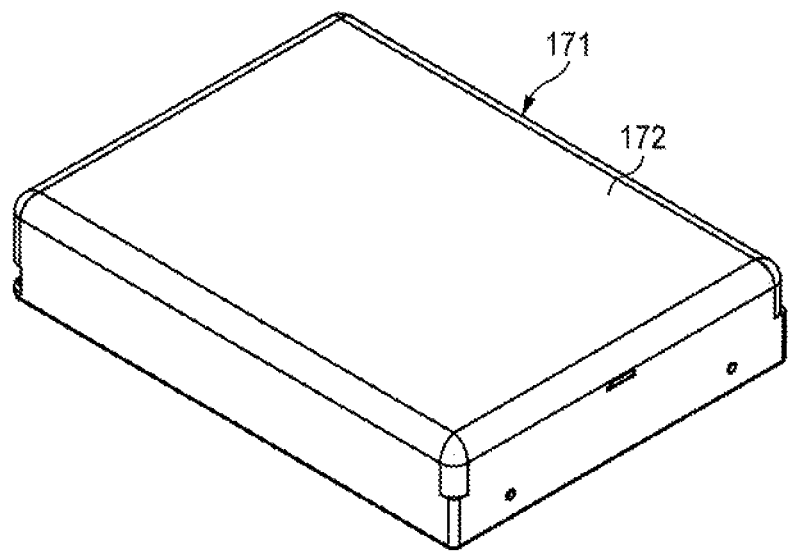
FIG. 51A is a perspective view illustrating a state of a battery pack of the second embodiment, which is viewed from above.
Figure 51B:
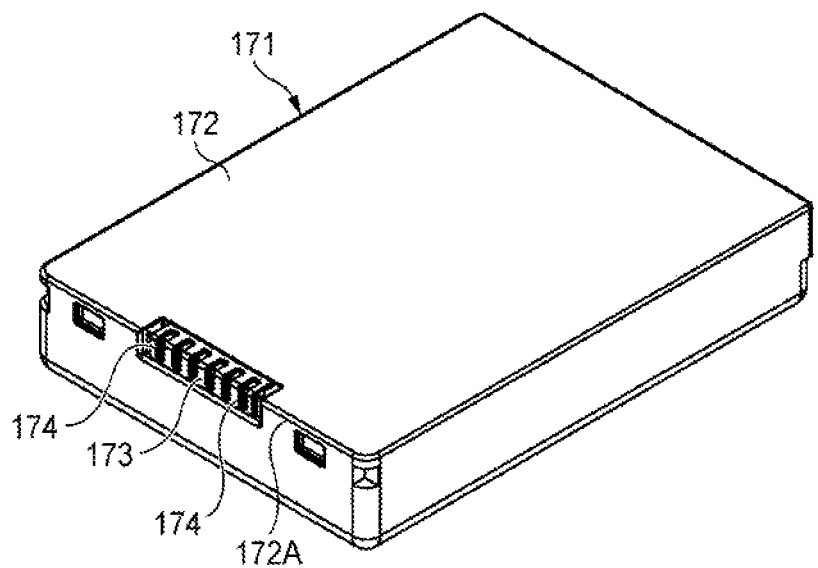
FIG. 51B is a perspective view illustrating a state of the battery pack of the second embodiment, which is viewed from a rear-surface-side.

As illustrated in FIGS. 51A and 51B, the battery pack 171 is such that a pack body 172 is formed substantially like a rectangular parallelepiped, and that the battery-side connecting portion 173 is provided on a lower edge line 172A of the pack body 172. The battery-side connecting portion 173 is a sinking-comb-like contact which includes plural spring contacts 174 (see FIG. 49) arranged in a width direction of the electrically-conductive plate member 167 such that the spring contacts 174 individually support each electrically-conductive plate members 167 by sandwiching.

Referring back to FIG. 50, a battery housing portion 175 is provided in the casing 11. The battery housing portion 175 is formed to be able to house the battery pack 171 (see Ms. 51A and 51B), so that the board-side connecting portion 166 (plural electrically-conductive members 167) is exposed from an opening part 176 of a concave corner portion 175A.

Turning back to FIGS. 47 and 49, the battery pack 171 is pushed against a bottom surface 175B of the battery housing portion 175 by a battery lid 178. The casing 11, the battery pack 171, and the battery lid 178 are formed integrally with one another. The bottom surface 175B of the battery housing portion 175 is formed by a surface of a sub-chassis 165.

Because the casing II, the battery pack 171, and the battery lid 178 are formed integrally with one another, the board-side connecting portion 166 can be positioned at a location corresponding to the battery-side connecting portion 173 of the battery pack 171 by holding the board-side connecting portion 166 at the side of the casing 11. Consequently, when the battery pack 171 is housed in the battery housing portion 175 in the casing 11, the battery-side connecting portion 173 can be connected to the board-side connecting portion 166.

Moreover, in a state in which the battery-side connecting portion 173 is connected to the board-side connecting portion 166, the spring contacts 174 of the battery-side connecting portion 173 are individually supported by the plural electrically-conductive plate members 167 by sandwiching in a thickness direction of the electrically-conductive plate member. Thus the electrically-conductive plate members 167 are supported by the spring contacts 174 in the thickness direction by sandwiching. Consequently, the battery-side connecting portion 173 can reliably be connected to each electrically-conductive plate member 167.

According to the portable terminal 160 of the second embodiment, the chassis 162 and the circuit board 163 are movably housed in the casing 11. The board-side connecting portion 166 is connected to the circuit board 163 via the wiring member 164. In addition, the battery-side connecting portion 173 of the battery pack 171 is connected to the board-side connecting portion 166. The battery pack 171 is pushed against the bottom surface 175B of the battery housing portion 175 by the battery lid 178. The casing 11, the battery pack 171 and the battery lid 178 are formed integrally with one another.

If an impact is applied to the portable terminal 160 in this state, the impact can be absorbed by moving the chassis 162 and the circuit board 163 in a three-dimensional direction with respect to the casing 11, the battery pack 171 and the battery lid 178.

Here, the board-side connecting portion 166 is connected to the circuit board 163 via the wiring member 164. The wiring member 164 is a flexible printed board that is elastically deformable. Consequently, the movement of the circuit board 163 is absorbed by the deformation of the wiring member 164. Accordingly, the state of connecting the board-side connecting portion 166 to the battery-side connecting portion 173 can be maintained.

(Modification)

Figure 52:
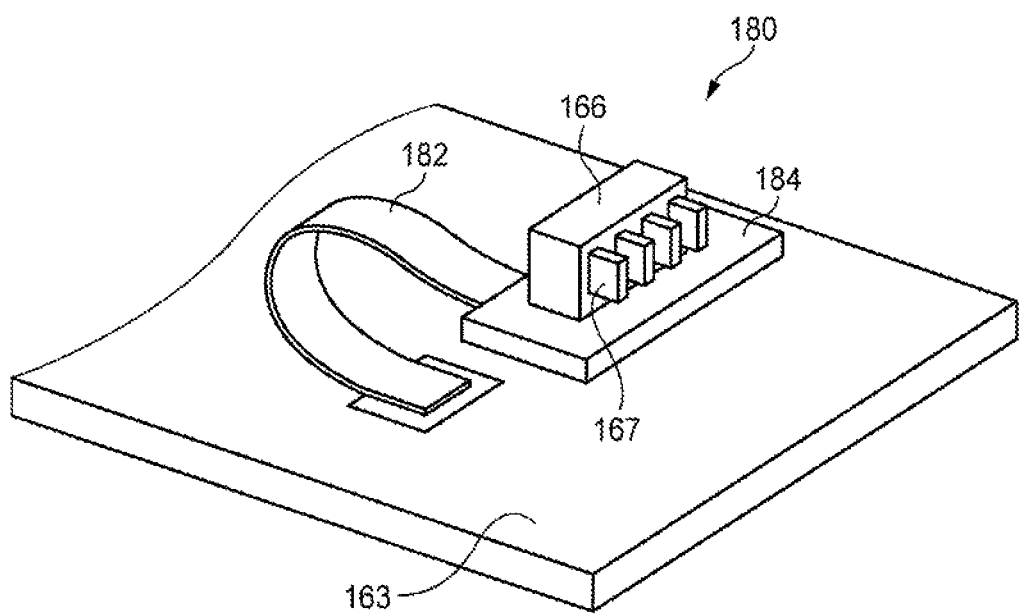
FIG. 52 is a perspective view illustrating a modification of the second embodiment.

A modification of the second embodiment is described hereinafter with reference to FIG. 52.

A portable terminal 180 according to the modification is such that a floating circuit board 184 is connected to the circuit board 163 via a wiring member 182, and that the board-side connecting portion 166 is mounted on the floating circuit board 184.

A flexible printed board which has flexibility (that is, which is elastically deformable) is used as the wiring member 182. Similarly to the second embodiment, the board-side connecting portion 166 is held at the side of the casing 11.

The portable terminal 180 according to the modification can obtain advantages similar to those of portable terminal 160 according to the second embodiment. That is, according to the portable terminal 180, if an impact is applied to the portable terminal 180, the impact can be absorbed by moving the chassis 162 and the circuit board 163 in a three-dimensional direction with respect to the casing 11, the battery pack 171 and the battery lid 178.

Moreover, the movement of the circuit board 163 is absorbed by the deformation of the wiring member 182. Thus, the state of connecting the board-side connecting portion 166 to the battery-side connecting portion 173 (see FIG. 51B) can be maintained.

The portable terminal according to the invention is not limited to the above embodiments. Appropriate changes and modifications can be made.

For example, in the first embodiment, an example of providing the restraining member 56 in the chassis 51 has been described. However, the portable terminal according to the invention is not limited thereto. The restraining member 56 can be provided directly on the circuit board 52. Even in the case of providing the restraining member 56 directly on the circuit board 52, advantages similar to those of the embodiment can be obtained.

Further, in the first embodiment, an example of providing the bottom part 64 in the restraining member 56 has been described. However, the invention is not limited thereto. Even in the ease of not providing the bottom part 64 in the restraining member 56 advantages similar to those of the embodiment can be obtained.

Moreover, in the second embodiment, an example has been described, in which the board-side connecting portion 166 includes plural electrically-conductive plate members 167, and which the spring contacts 174 of the battery-side connecting portion 173 are contacted with the plural electrically-conductive plate members 167. However, the invention is not limited thereto. For example, a combination of a casing, spring contacts, and a battery pad can be employed, in which, similarly to an ordinary mobile phone, a spring contact is provided in the casing, and a contact pad of a battery pad is pushed against the spring contact.

Shapes and configurations of the portable terminals, the casings, the front cases, the rear cases, the display devices, the chassis, the circuit boards, the fixing portions, the battery housing portions the battery packs, the restraining members, the restraining member fixing screws the chassis butler members, the display device buffer members, the board-side connecting portions, the fixing buffer members, the board fixing screws, the battery openings, and the battery-side connecting portions used in the first embodiment and the second embodiment are not limited to exemplified ones. Appropriate changes can be made.

The invention is appropriately applied to a portable terminal in which a circuit board is provided in a casing, and a battery-side connecting portion of a battery pack is connected to a board-side connecting portion of the circuit board by housing the battery pack in a battery housing portion.

This application claims priority from Japanese Patent Application No. 2013-026765 filed on Feb. 14, 2013 and Japanese Patent Application No. 2013-109981 filed on May 24, 2013, the entire contents of which are incorporated herein by reference.

What is claimed is:

1. A portable terminal comprising:
   a casing;
   a circuit board housed in the casing;
   a display device arranged parallel to the circuit board in the casing and exposed on an outside of the casing;
   a fixing portion which fixes the circuit board to the casing to allow the circuit board to move within a given range along a surface direction of the circuit board;
   a battery housing portion provided at a position in the casing located along a thickness direction of the circuit board;
   a battery pack housed in the battery housing portion through a battery opening provided in the casing;
   a board-side connecting portion provided at the circuit board;
   a battery-side connecting portion provided at the battery pack and connected to the board-side connecting portion; and a restraining member which restrains a movement of the battery pack with respect to the circuit board along a surface direction of the circuit board.

2. The portable terminal according to claim 1, further comprising:
a chassis which holds the circuit board,
wherein the restraining member is fixed to the chassis.

3. The portable terminal according to claim 2,
wherein the chassis comprises a first surface and a second surface opposite to the first surface, the first surface being closer to the battery pack than the second surface,
wherein said portable terminal further comprises:
a board fixing screw which is screwed to the chassis and which fixes the circuit board to the first surface of the chassis; and
a restraining member fixing screw which is screwed to the chassis and which fixes the restraining member to the first surface of the chassis,
wherein the display device is arranged on the second surface of the chassis, and
wherein a tip end of one of the board fixing screw and the restraining member fixing screw does not contact the display device.

4. The portable terminal according to claim 3, further comprising:
a fixing buffer member interposed between the circuit board and the chassis,
wherein the fixing buffer member is penetrated by the board fixing screw.

5. The portable terminal according to claim 1, further comprising:
a chassis which holds the circuit board; and
a chassis buffer member which is provided at a plane angle portion and which contacts an inner surface of the casing.

6. The portable terminal according to claim 1,
wherein the casing is formed by two-color molding so as to expose a hard resin on an inner surface of the casing and so as to expose a soft resin to an outer surface of the casing, and
wherein a display device buffer member is interposed between an end surface of the display device and the inner surface of the casing.

* * * * *